(12) United States Patent
Takada

(10) Patent No.: US 10,416,412 B2
(45) Date of Patent: *Sep. 17, 2019

(54) ZOOM IMAGE PICKUP APPARATUS

(71) Applicant: OLYMPUS CORPORATION, Hachioji-shi, Tokyo (JP)

(72) Inventor: Keisuke Takada, Kokubunji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/674,430

(22) Filed: Aug. 10, 2017

(65) Prior Publication Data
US 2017/0336594 A1 Nov. 23, 2017

Related U.S. Application Data

(63) Continuation of application No. PCT/JP2015/053642, filed on Feb. 10, 2015.

(51) Int. Cl.
G02B 15/14 (2006.01)
G02B 7/10 (2006.01)
G02B 15/173 (2006.01)

(52) U.S. Cl.
CPC .............. *G02B 7/10* (2013.01); *G02B 15/14* (2013.01); *G02B 15/173* (2013.01)

(58) Field of Classification Search
CPC .......... G02B 7/10; G02B 15/10; G02B 15/06; G02B 15/173; G02B 15/177; G02B 15/14; G02B 13/0045; G02B 9/60; G02B 9/14; G02B 9/34; G02B 15/16

See application file for complete search history.

(56) References Cited

U.S. PATENT DOCUMENTS

| | | | |
|---|---|---|---|
| 4,999,007 | A | 3/1991 | Aoki et al. |
| 5,371,566 | A | 12/1994 | Asakura |
| 5,933,282 | A | 8/1999 | Tomioka et al. |
| 7,714,885 | B2 | 5/2010 | Yazawa et al. |
| 8,164,836 | B2 | 4/2012 | Uzawa et al. |
| 8,339,714 | B2 | 12/2012 | Tochigi et al. |
| 8,573,788 | B2 | 11/2013 | Sugawara et al. |

(Continued)

FOREIGN PATENT DOCUMENTS

| | | |
|---|---|---|
| JP | 01191820 A | 8/1989 |
| JP | 05257054 A | 10/1993 |

(Continued)

OTHER PUBLICATIONS

International Preliminary Report on Patentability (IPRP) (and English translation thereof) dated Aug. 24, 2017 issued in counterpart International Application No. PCT/JP2015/053642.

(Continued)

*Primary Examiner* — Alicia M Harrington
(74) *Attorney, Agent, or Firm* — Holtz, Holtz & Volek

(57) ABSTRACT

A zoom image pickup apparatus includes a mount portion, a zoom lens which forms an image of light incident from the mount portion, and an image pickup element which is disposed at an image forming position. The zoom lens includes a plurality of lens unit, and a focusing lens unit, and the following conditional expressions (1) and (2) are satisfied:

$$1.5 < f_{Lt}/f_{Lw} \quad (1), \text{ and}$$

$$|(y_{w7d} - y_{w7d})/y_{w7d}| \times 100 < 0.66 \quad (2).$$

22 Claims, 31 Drawing Sheets

(56) References Cited

U.S. PATENT DOCUMENTS

| | | | |
|---|---|---|---|
| 8,582,212 | B2 | 11/2013 | Ogata et al. |
| 8,767,310 | B2 | 7/2014 | Ogata et al. |
| 8,964,302 | B2 | 2/2015 | Kawamura et al. |
| 9,146,388 | B2 | 9/2015 | Kimura |
| 2003/0169333 | A1 | 9/2003 | Yazawa et al. |
| 2010/0238562 | A1* | 9/2010 | Take ............... G02B 15/173 359/684 |
| 2012/0063003 | A1* | 3/2012 | Li ..................... G02B 15/173 359/687 |
| 2012/0092777 | A1* | 4/2012 | Tochigi ............ G02B 15/173 359/684 |
| 2013/0286276 | A1* | 10/2013 | Kawamura ......... G02B 15/14 348/345 |
| 2013/0300868 | A1* | 11/2013 | Yamamoto ........ G02B 15/173 348/143 |
| 2014/0300782 | A1* | 10/2014 | Kimura ............. G02B 15/163 348/240.3 |
| 2017/0336593 | A1 | 11/2017 | Takada |

FOREIGN PATENT DOCUMENTS

| | | | |
|---|---|---|---|
| JP | 09325273 | A | 12/1997 |
| JP | 11125770 | A | 5/1999 |
| JP | 2002136477 | A | 5/2002 |
| JP | 2011076040 | A | 4/2011 |
| JP | 2011221554 | A | 11/2011 |
| JP | 2012027262 | A | 2/2012 |
| JP | 2012083601 | A | 4/2012 |
| JP | 2013024965 | A | 2/2013 |
| JP | 2013231827 | A | 11/2013 |
| JP | 2014203027 | A | 10/2014 |
| WO | 2010137238 | A1 | 12/2010 |

OTHER PUBLICATIONS

International Search Report (ISR) and Written Opinion dated May 12, 2015 issued in International Application No. PCT/JP2015/053642.

U.S. Appl. No. 15/674,418; Title: "Zoom Image Pickup Apparatus"; First named inventor: Keisuke Takada; Date Filed: Aug. 10, 2017.

Office Action (Non-Final Rejection) dated Aug. 8, 2018 issued in U.S. Appl. No. 15/674,418.

International Search Report (ISR) and Written Opinion dated May 12, 2015 issued in International Application No. PCT/JP2015/053640.

International Preliminary Report on Patentability (IPRP) (and English translation thereof) dated Aug. 24, 2017 issued in International Application No. PCT/JP2015/053640.

* cited by examiner

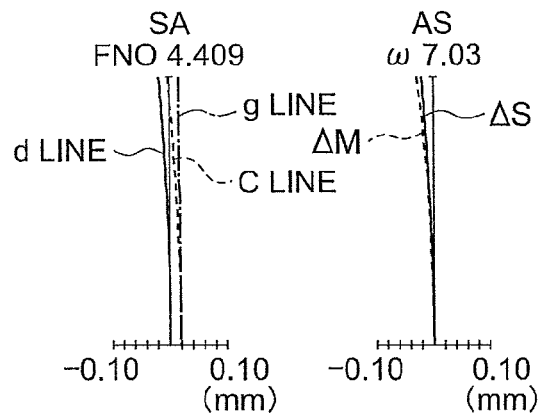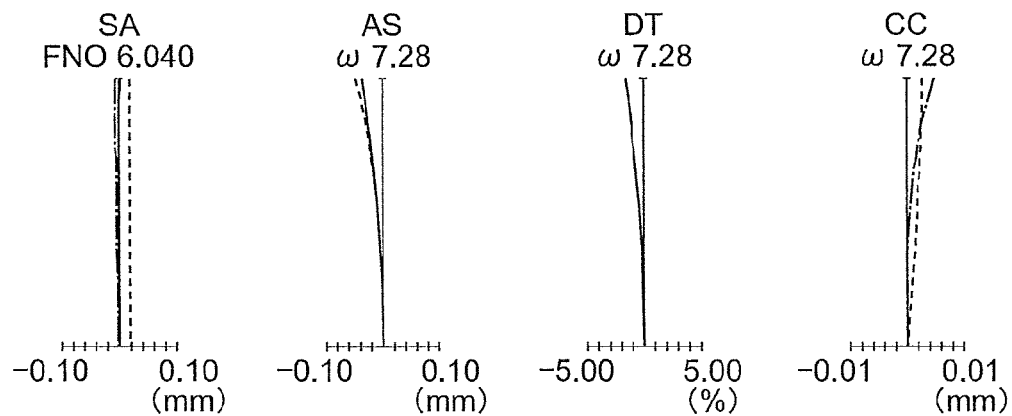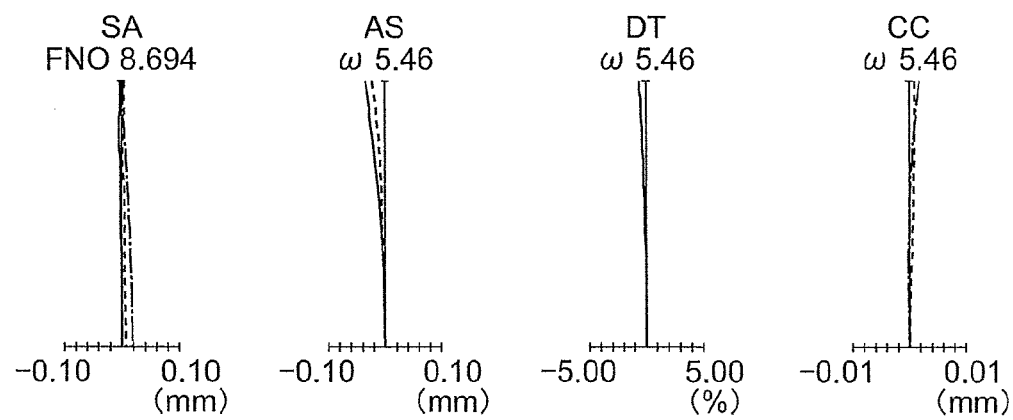

SA
FNO 2.491
-0.10    0.10
(mm)

AS
ω 6.83
-0.10    0.10
(mm)

DT
ω 6.83
-5.00    5.00
(%)

CC
ω 6.83
-0.01    0.01
(mm)

SA
FNO 3.362
-0.10    0.10
(mm)

AS
ω 7.17
-0.10    0.10
(mm)

DT
ω 7.17
-5.00    5.00
(%)

CC
ω 7.17
-0.01    0.01
(mm)

SA
FNO 4.911
-0.10    0.10
(mm)

AS
ω 5.25
-0.10    0.10
(mm)

DT
ω 5.25
-5.00    5.00
(%)

CC
ω 5.25
-0.01    0.01
(mm)

SA
FNO 2.391
-0.10   0.10
(mm)

AS
ω 7.04
-0.10   0.10
(mm)

DT
ω 7.04
-5.00   5.00
(%)

CC
ω 7.04
-0.01   0.01
(mm)

SA
FNO 3.228
-0.10   0.10
(mm)

AS
ω 7.41
-0.10   0.10
(mm)

DT
ω 7.41
-5.00   5.00
(%)

CC
ω 7.41
-0.01   0.01
(mm)

SA
FNO 4.716
-0.10   0.10
(mm)

AS
ω 5.45
-0.10   0.10
(mm)

DT
ω 5.45
-5.00   5.00
(%)

CC
ω 5.45
-0.01   0.01
(mm)

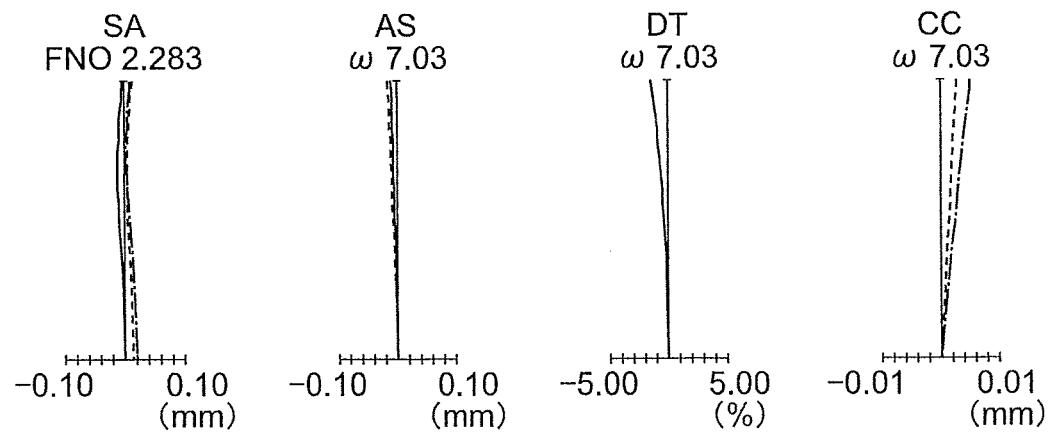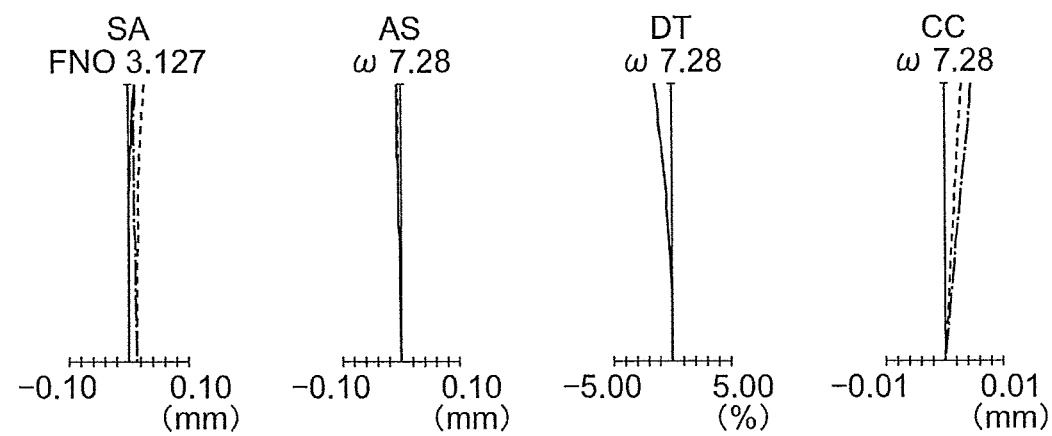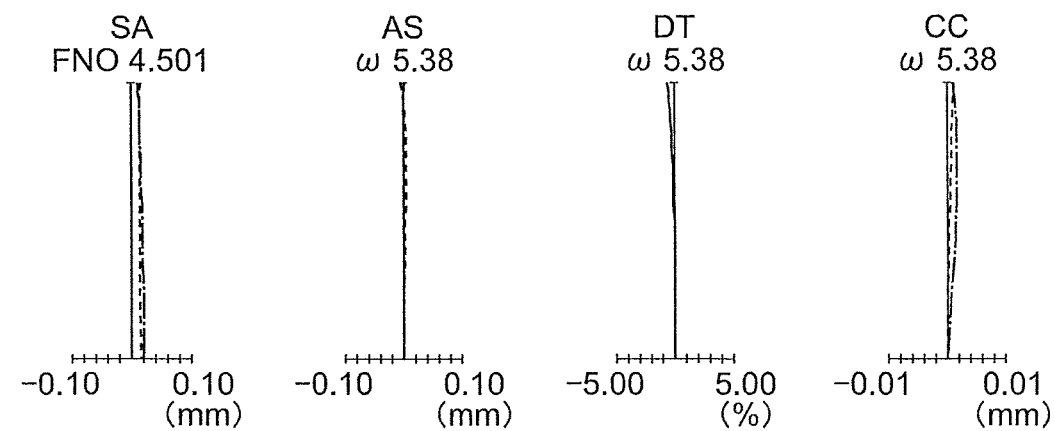

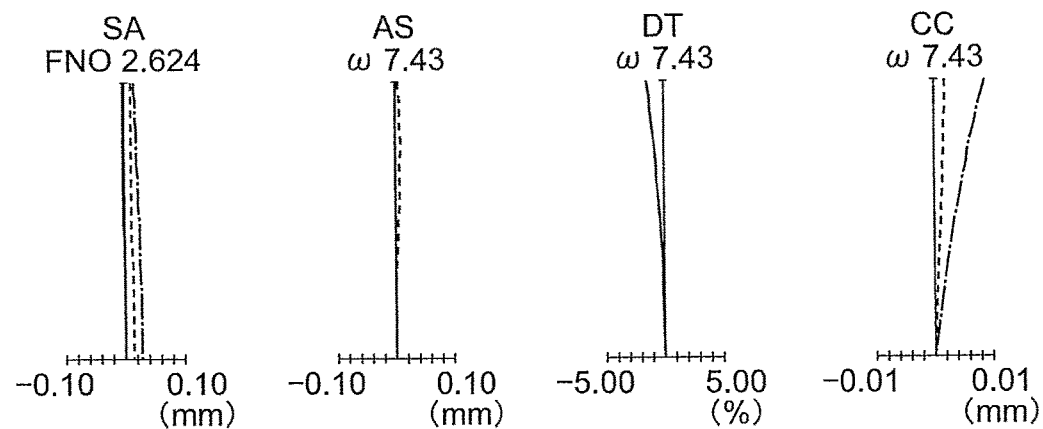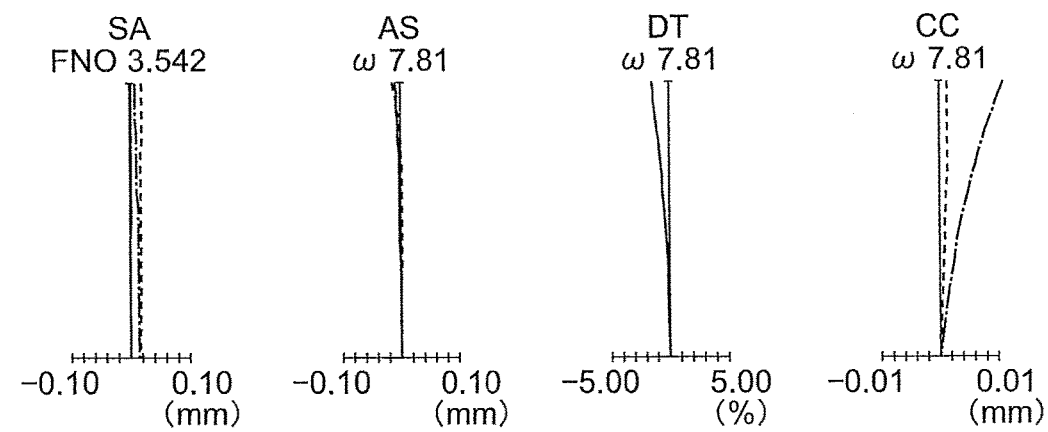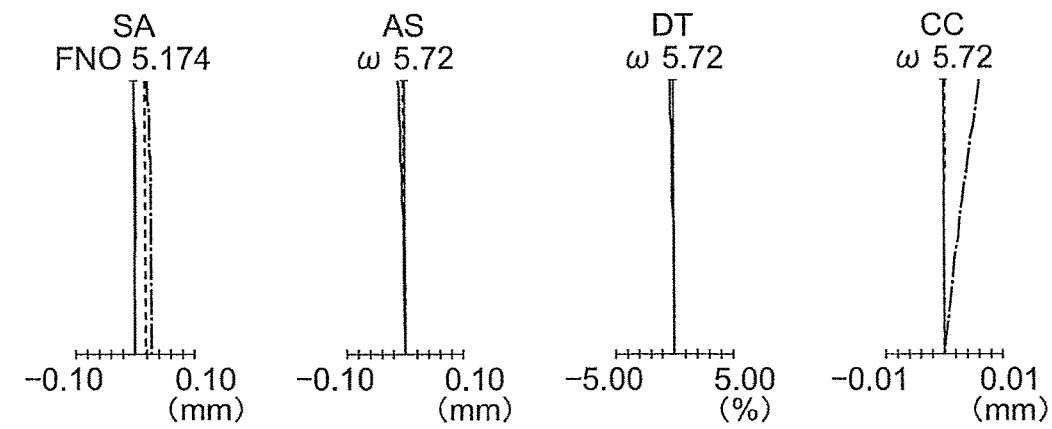

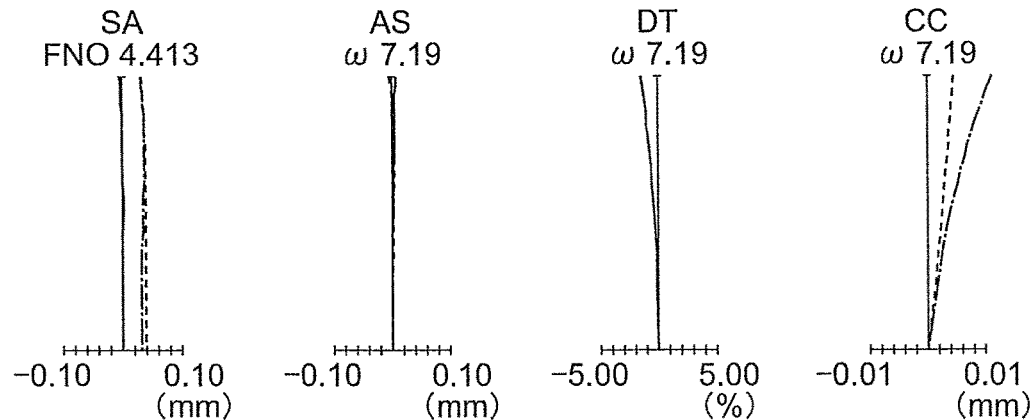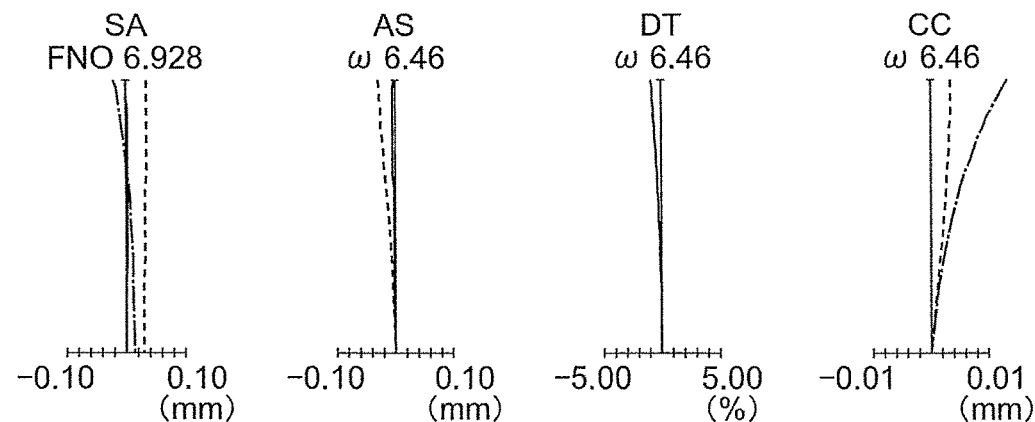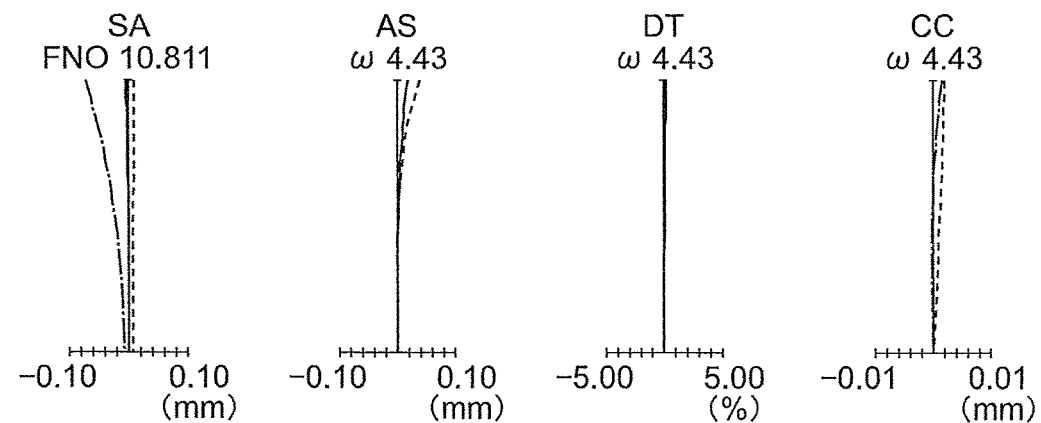

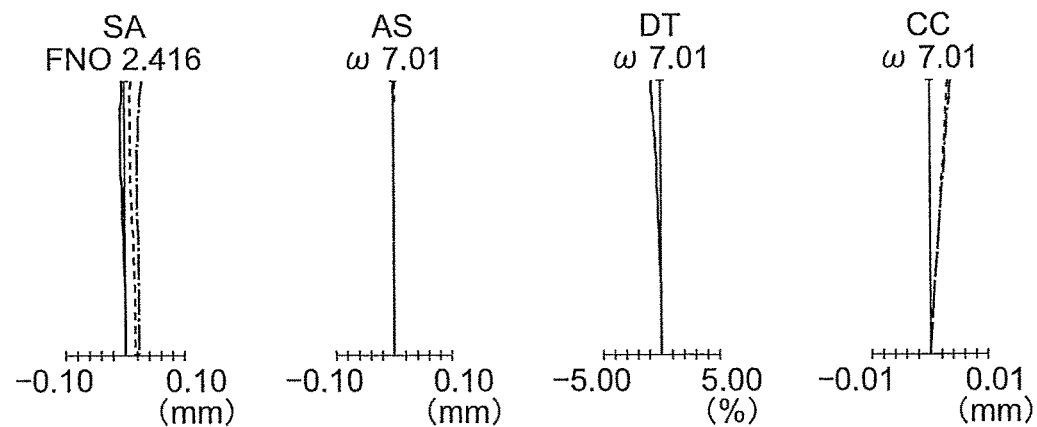
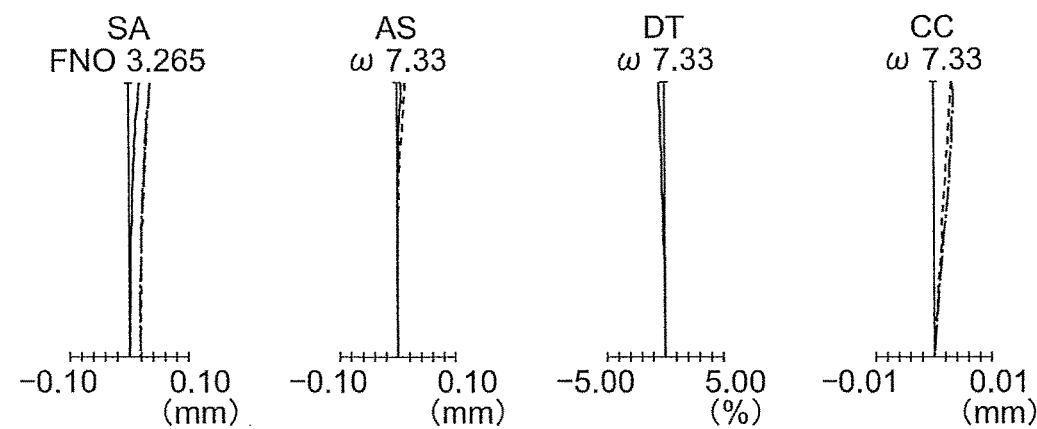
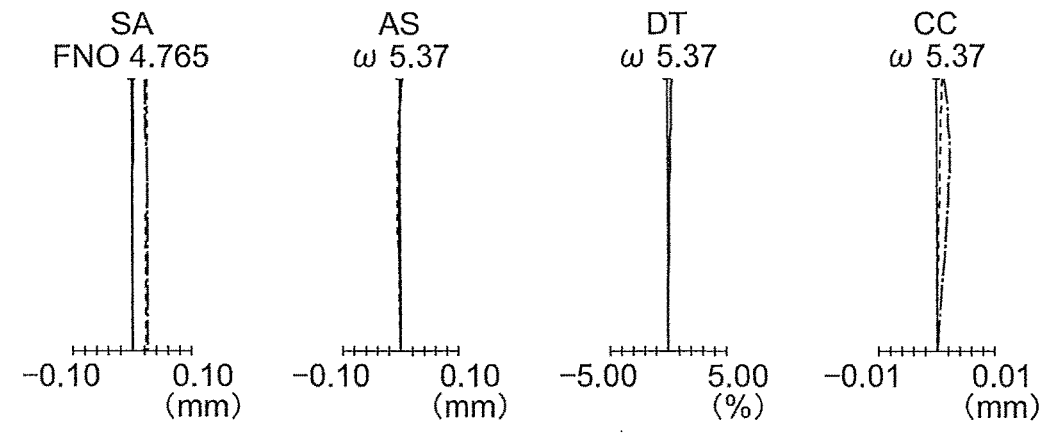

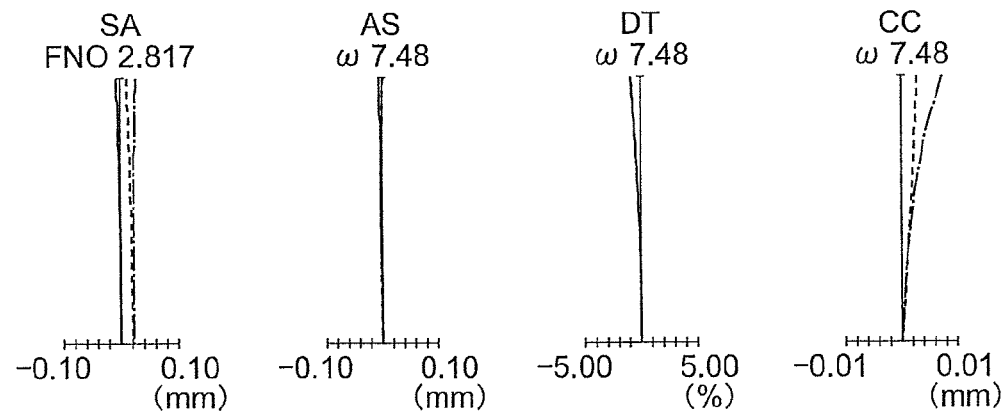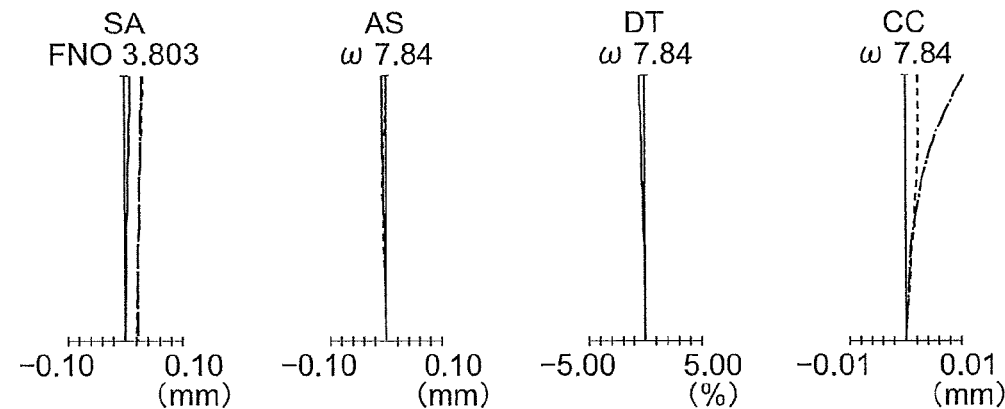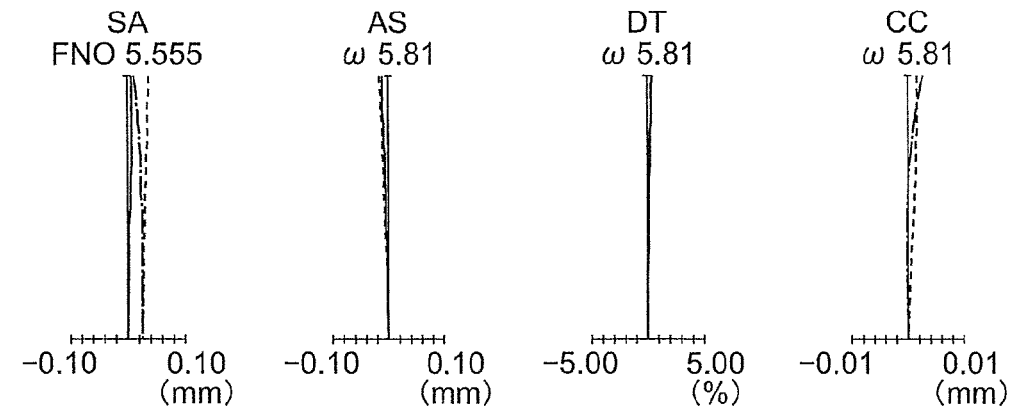

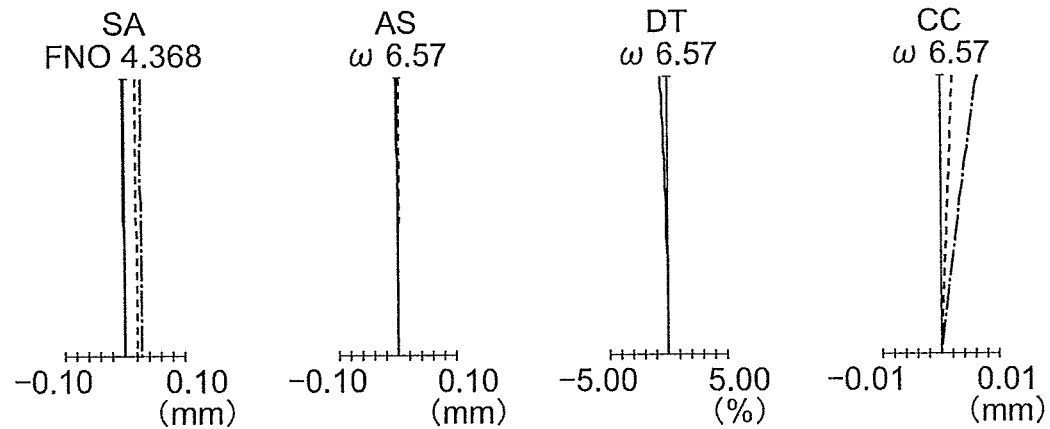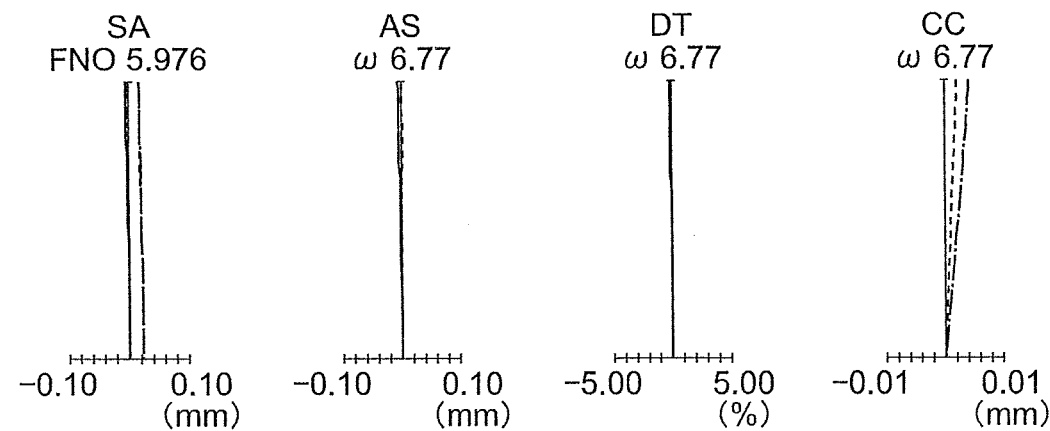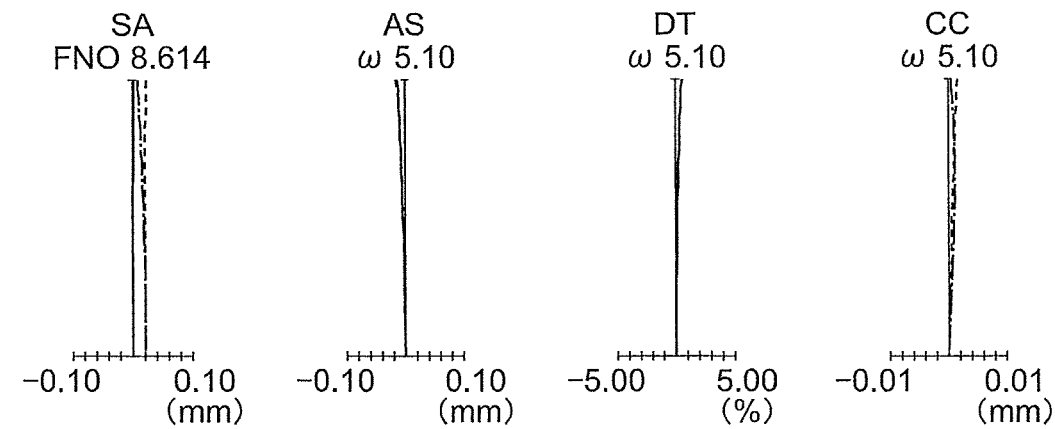

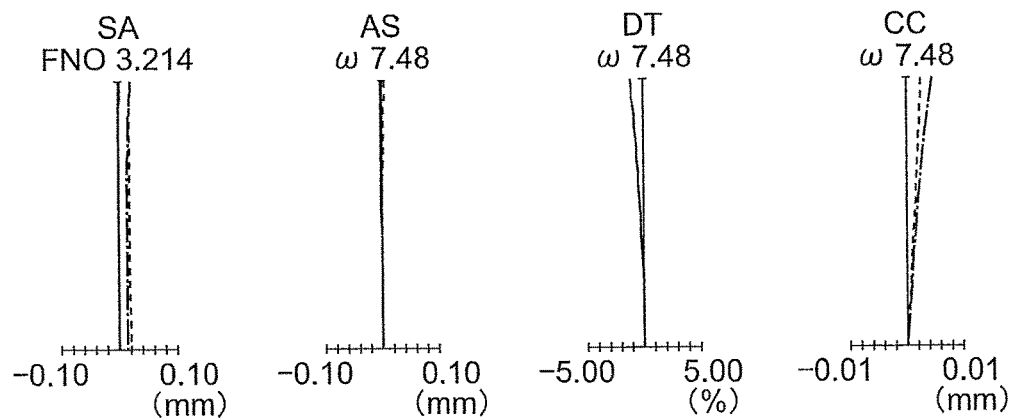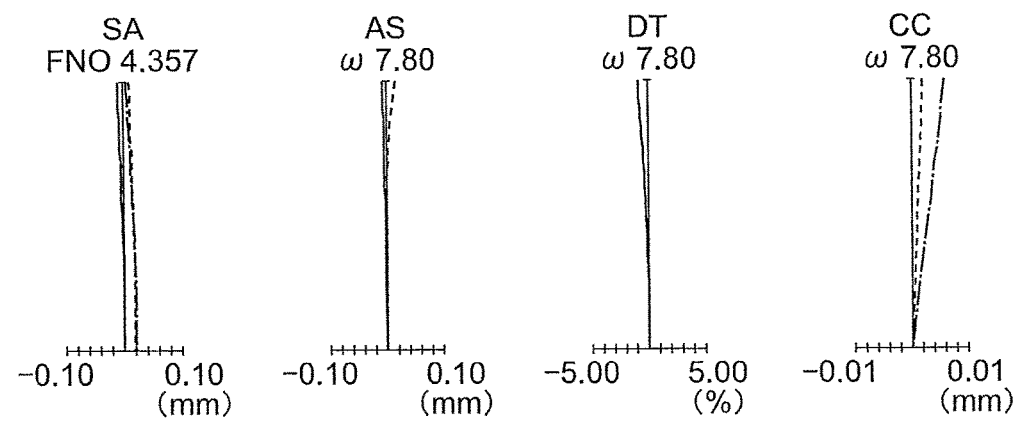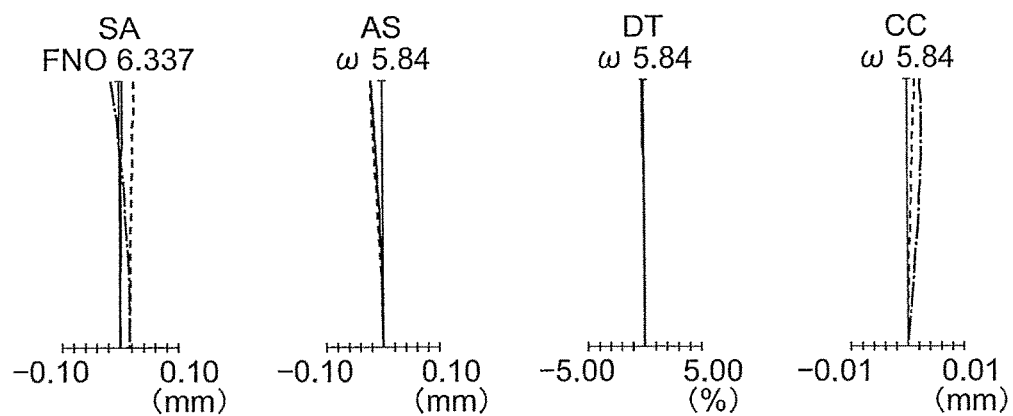

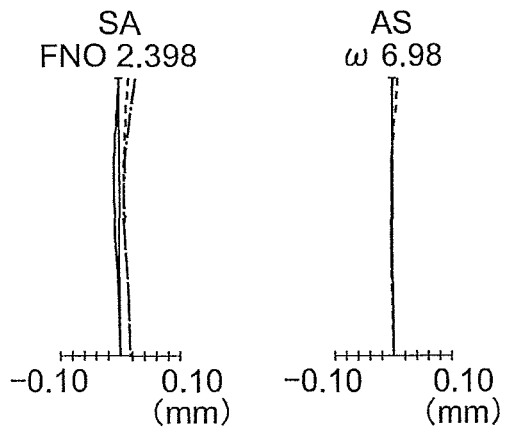
FIG. 26A
SA
FNO 2.398
-0.10   0.10
(mm)
FIG. 26B
AS
ω 6.98
-0.10   0.10
(mm)
FIG. 26C
DT
ω 6.98
-5.00   5.00
(%)
FIG. 26D
CC
ω 6.98
-0.01   0.01
(mm)
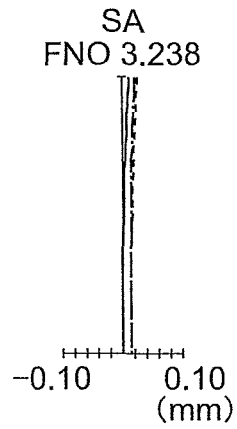
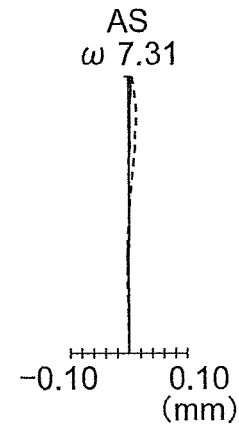
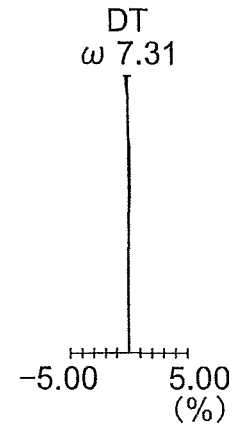
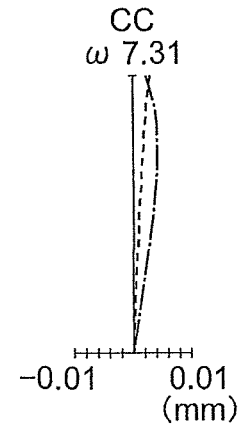
FIG. 26E
SA
FNO 3.238
-0.10   0.10
(mm)
FIG. 26F
AS
ω 7.31
-0.10   0.10
(mm)
FIG. 26G
DT
ω 7.31
-5.00   5.00
(%)
FIG. 26H
CC
ω 7.31
-0.01   0.01
(mm)
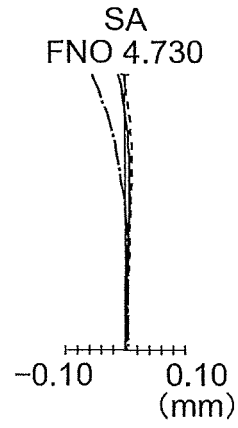
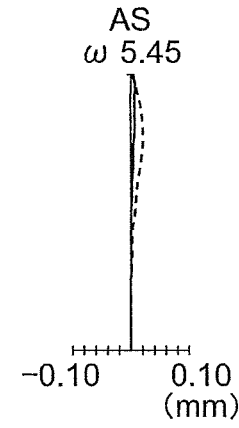
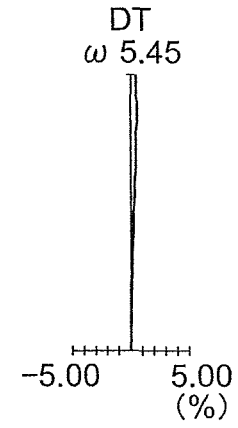
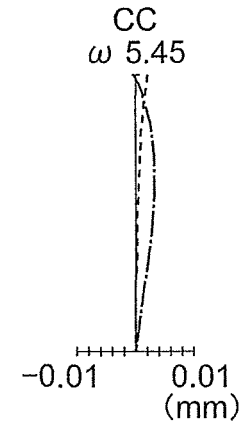
FIG. 26I
SA
FNO 4.730
-0.10   0.10
(mm)
FIG. 26J
AS
ω 5.45
-0.10   0.10
(mm)
FIG. 26K
DT
ω 5.45
-5.00   5.00
(%)
FIG. 26L
CC
ω 5.45
-0.01   0.01
(mm)

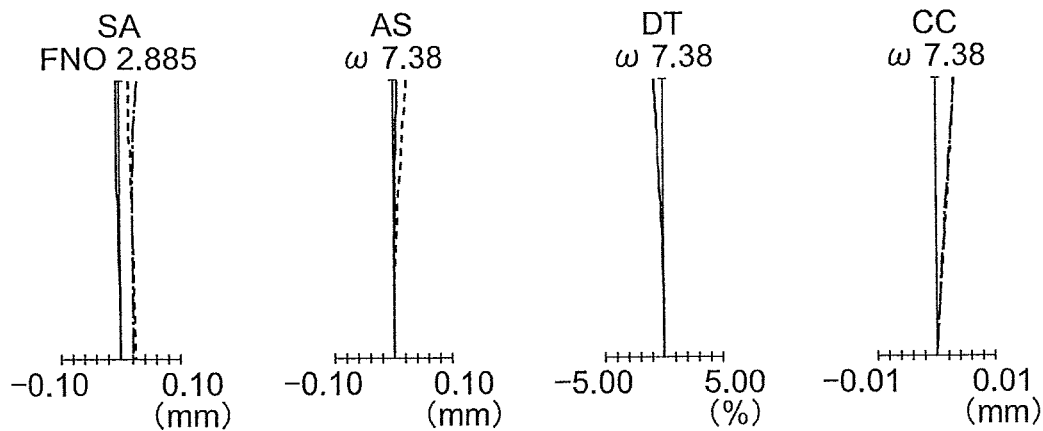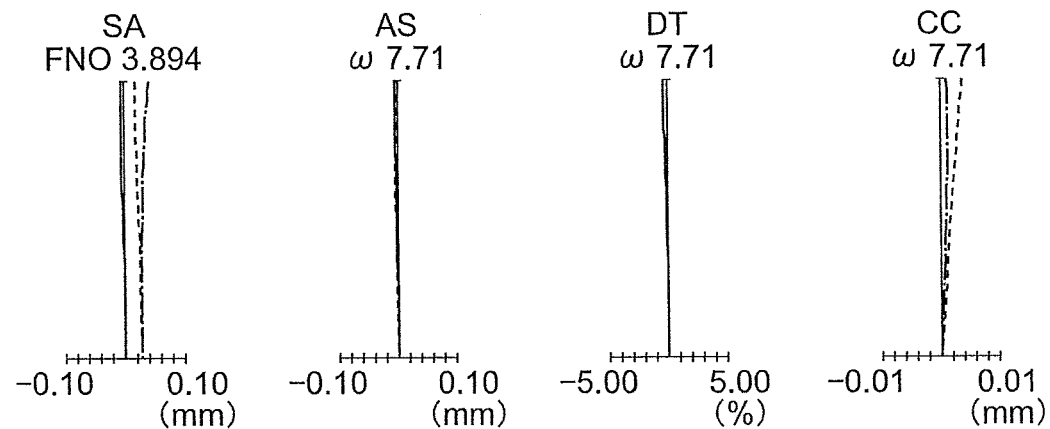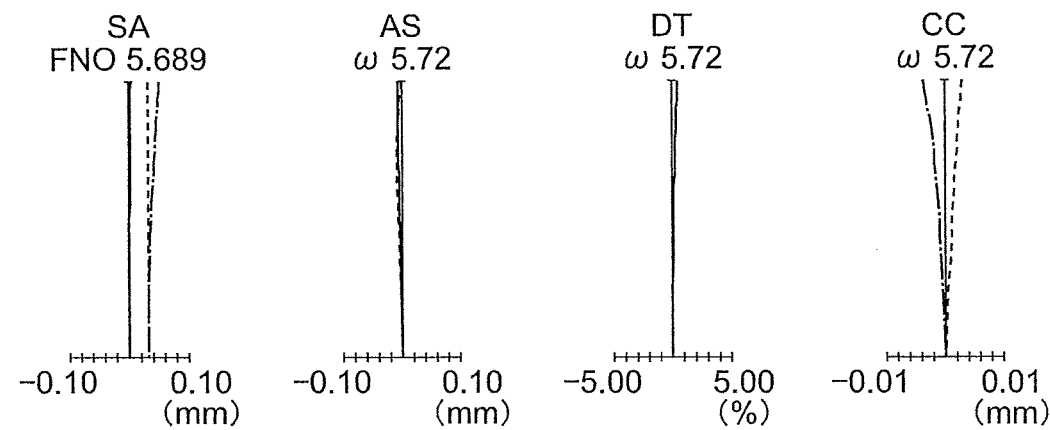

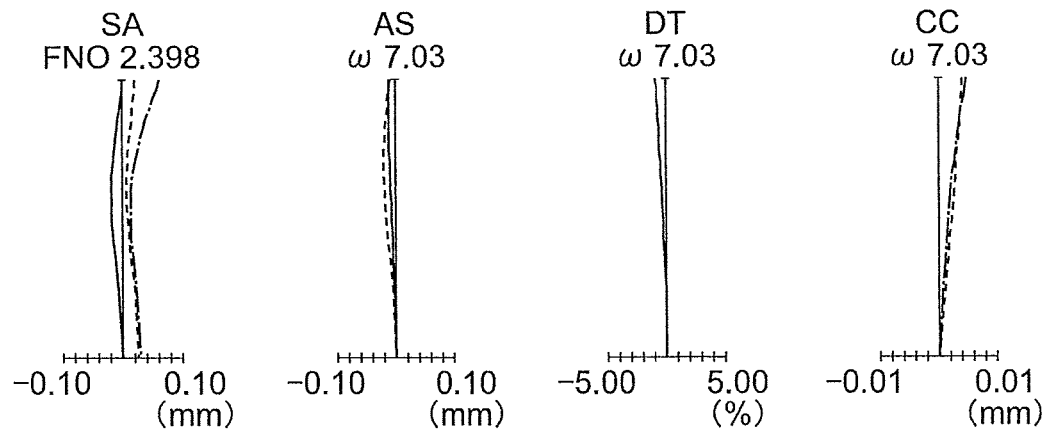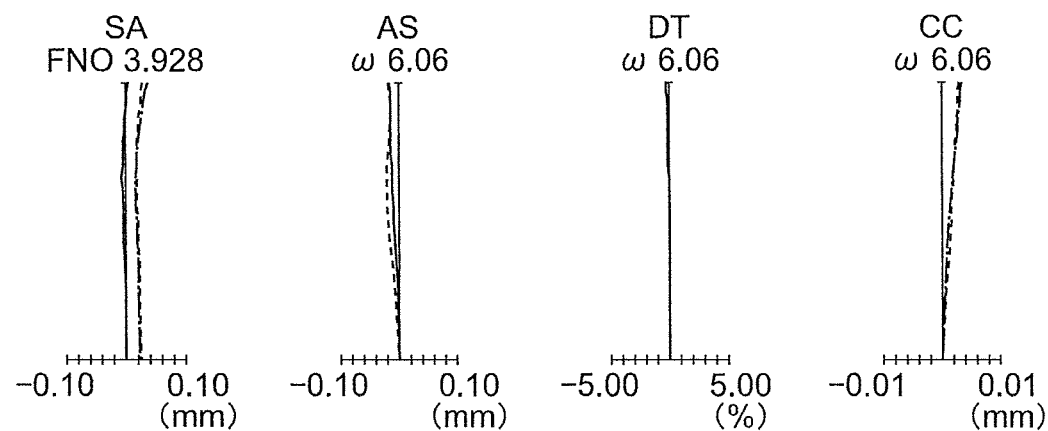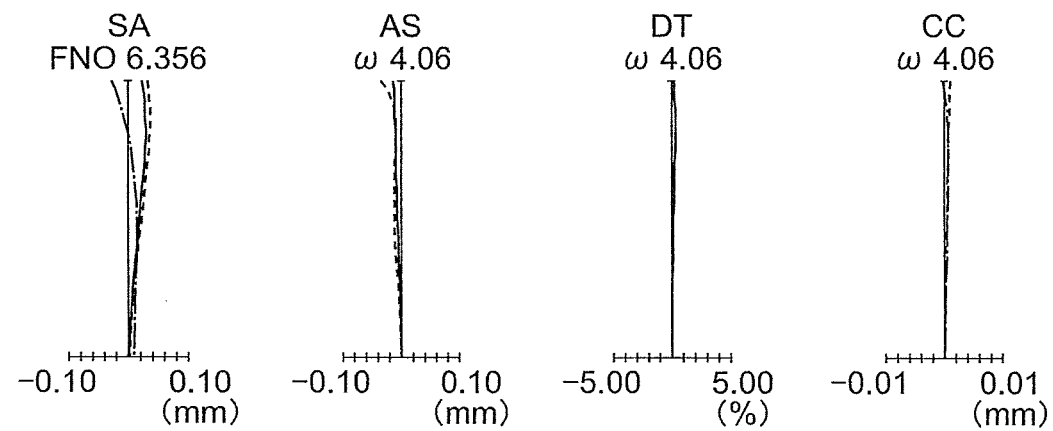

ZOOM IMAGE PICKUP APPARATUS

CROSS-REFERENCE TO RELATED APPLICATION

The present application is a continuation application of International Application No. PCT/JP2015/053642 filed on Feb. 10, 2015, the entire contents of which are incorporated herein by reference.

BACKGROUND OF THE INVENTION

Field of the Invention

The present invention relates to a zoom image pickup apparatus which can be connected to an eyepiece portion of an optical instrument Description of the Related Art Optical instruments include endoscopes, microscopes, telescopes, and binoculars for example. In an endoscope for instance, often, images of a site to be observed are acquired by attaching an adapter and a video camera to an eyepiece portion of the endoscope. Images acquired are used for diagnosis and treatment of the site to be observed. Moreover, images acquired are recorded in a recording medium.

A camera such as a television camera and a film camera is used for imaging. Recently in particular, the imaging is carried out by a small-size television camera in which a solid image pickup element such as a CCD (charge coupled device) is used. An endoscope image that is picked up is displayed on a television monitor for example. In many cases, diagnosis and treatment are carried out by using the endoscope image displayed.

With the recent advancement in semiconductor technology, small-sizing of elements and high-densification of pixels have been carried out for image pickup elements to be used in these television cameras. Therefore, an optical system to be used in combination with such image pickup element also has to have a high optical performance.

As mentioned above, in an endoscope, an adapter and a television camera are to be attached to an eyepiece portion of the endoscope. In such arrangement, an image formed by an eyepiece of the endoscope is formed on an image pickup element provided inside the television camera, via an image pickup optical system in the adapter.

In actual image pickup, different adapters of various types with different magnification are provided, and the adapters are to be used properly according to the type and purpose of the endoscope to be used. For this, a large number of adapters are necessary and the cost becomes high.

Moreover, when a size of a site to be observed is to be changed by changing the magnification while in use, the adapter is to be replaced every time. However, it is difficult to replace the adapter during surgery for example. Moreover, it is practically difficult to adjust a size of an image of a site to be observed to a size desired by a user (such as a person performing the surgery). Consequently, with regard to the size of the image, the user has to compromise to certain extent.

As a method for achieving an image of a size desired by the user, a method of using a zooming optical system for the optical system inside the adapter is available. In a plurality of endoscopes, when each endoscope has same diopter scale, an object-point position with respect to the adapter is same for any endoscope. Consequently, even when the optical system inside the adapter is a zooming optical system, there is no need to provide a focusing mechanism.

However, obviously there are cases in which the diopter scale of each endoscope differs. For example, in rigid endoscopes, diopter scale differs in each rigid endoscope in many cases. Even in flexible endoscopes, obviously there are cases in which the diopter scale of each flexible endoscope differs.

When the diopter scale differs for each endoscope, the diopter scale varies according to an object position. Therefore, when the endoscope to be combined with a zooming optical system differs, in a case in which the diopter scale thereof differs according to a distance up to a site to be observed, it is necessary to provide a focusing mechanism to the zooming optical system.

Although the abovementioned description has been made by citing an example of endoscopes, a point of differing diopter scales is similar for microscope, telescopes, and binoculars.

As a focusing method, there is a method of moving the whole zooming optical system in an optical direction. In video photography, capturing is carried out while zooming and focusing all the time. When the zooming and focusing are carried out all the time, a focusing speed depends on a weight of lenses. Moreover, as an overall length of lenses varies at the time of focusing, the optical system and an overall image pickup apparatus become large.

In view of the abovementioned circumstances, a zooming optical system in which the focusing speed is increased by moving a comparatively small lens and the overall optical system is made compact has been proposed. Such zooming optical systems have been proposed in Japanese Patent Application Laid-open Publication No. Hei 9-325273 and Japanese Patent Application Laid-open Publication No. Hei 11-125770 respectively.

The zooming optical system disclosed in Japanese Patent Application Laid-open Publication No. Hei 9-325273 includes in order from an object side, a first unit having a positive refractive power, a second unit having a negative refractive power, and a third unit having a positive refractive power. The first unit is a focusing lens unit, and a diopter scale adjustment from a positive refractive power to a negative refractive power is possible by the movement of the focusing lens unit.

The zooming optical system disclosed in Japanese Patent Application Laid-open Publication No. Hei 11-125770 includes in order from an object side, a first lens unit having a positive refractive power, a second lens unit having a negative refractive power, a third lens unit having a positive refractive power, and a fourth lens unit. The first lens unit is a focusing lens unit, and the whole lens unit or some of the lenses in the lens unit move in an optical axial direction.

Focusing to a site to be observed includes a case of focusing from a substantially defocused state and a case of continuing focusing after assuming a focused state once. In the latter case, a wobbling operation is carried out. Here, the wobbling operation is an operation of letting the focusing lens unit to undergo a reciprocating movement by a minute amount.

FIG. 1 is a diagram showing how an image height varies by the movement of a lens unit. In FIG. 1, P1 is a position of a lens unit G1 in a focused state. Moreover, P2 is position assumed by the lens unit G1 after moving by a minute amount. For making the movement easily understandable, the movement of the first lens unit G1 is exaggeratedly illustrated in FIG. 1.

In a state in which a position of the lens unit G1 coincides with P1, a light ray incident on the lens unit G1 advances as shown by a solid line, and reaches an image position. From this state, when the lens unit G1 is made to undergo the wobbling operation, the lens unit G1 moves to the position of P2.

In a state in which the position of the lens unit G1 coincides with P2, a light ray incident on the lens unit G1 advances as shown by a broken line, and reaches the image position. As shown in FIG. 1, a position of a light ray passing through the image position differs for the state in which the position of the lens unit G1 coincides with P1, and for the state in which the position of the lens unit G1 coincides with P2. In other words, the image height varies according to the change in the position of the lens unit G1. In such manner, when the wobbling operation is carried out, there is a variation in the image height. Here, Δy shown in FIG. 1 indicates an amount of variation in the image height.

In endoscopes, it is possible to observe a wide range in a direction along an optical axis comparatively clearly. Therefore, in endoscopes, from a center up to a periphery of a field of view, an image is viewed comparatively clearly. For this reason, when the amount of variation Δy, when the wobbling operation is carried out, is large, the variation in the size of the image is substantially noticeable. As a result, the user has an uncomfortable feeling. Therefore, in a case of carrying out the wobbling operation, it necessary to make the zooming optical system to be an optical system with a small amount of variation Δy.

SUMMARY OF THE INVENTION

A zoom image pickup apparatus according to the present invention comprises,
a mount portion,
a zoom lens which forms an image of light incident from the mount portion, and
an image pickup element which is disposed at an image forming position, wherein
the zoom lens includes a plurality of lens units, and a focusing lens unit, and
the following conditional expressions (1) and (2) are satisfied:

$$1.5 < f_{Lt}/f_{Lw} \quad (1), \text{ and}$$

$$|(y_{w7d'} - y_{w7d})/y_{w7d}| \times 100 < 0.66 \quad (2)$$

where,
a side of the mount portion is let to be an object side and a side of the image pickup element is let to be an image side,
each of $f_{Lt}$ and $f_{Lw}$ is a focal length of the zoom lens when focused to a first object, and $f_{Lt}$ denotes a focal length at a telephoto end and $f_{Lw}$ denotes a focal length at a wide angle end,
each of $y_{w7d}$ and $y_{w7d'}$ is a height of a first predetermined light ray at a position at which the first predetermined light ray intersects an image plane, and $y_{w7d}$ denotes a light-ray height when focused to the first object and $y_{w7d'}$ denotes a light-ray height in a defocused state,
the defocused state is a state in which the focusing lens unit is moved by $\Delta_{s1}$ when focused to the first object, and $\Delta_{s1} = f_{Lw} \times 0.005$,
the first predetermined light ray is a light ray with an angle of view of 7 degrees at the wide angle end, which passes through a center of a lens surface nearest to object, of the zoom lens,
the first object is an object when an object-point distance is 1000 mm, and
the object-point distance is a distance from a lens surface positioned nearest to object of the zoom lens, up to an object.

Moreover, another zoom image pickup apparatus according to the present invention comprises,
a mount portion,
a zoom lens which forms an image of light incident from the mount portion, and
an image pickup element which is disposed at an image forming position, wherein
the zoom lens includes in order from an object side,
a first lens unit having a positive refractive power,
a second lens unit having a negative refractive power,
a third lens unit having a positive refractive power,
a fourth lens unit having a negative refractive power, and
a fifth lens unit having a positive refractive power, and
the fourth lens unit is a focusing lens unit, and
at a time of zooming from a wide angle end to a telephoto end, only the second lens unit and the fourth lens unit move, and the first lens unit, the third lens unit, and the fifth lens unit are fixed.

Furthermore, still another zoom image pickup apparatus according to the present invention comprises
a mount portion,
a zoom lens which forms an image of light incident from the mount portion, and
an image pickup element which is disposed at an image forming position, wherein
the zoom lens includes in order from an object side,
a first lens unit,
a second lens unit having a negative refractive power,
a third lens unit having a positive refractive power,
a fourth lens unit having a negative refractive power, and
a fifth lens unit having a positive refractive power, and
the fourth lens unit is a focusing lens unit, and
at a time of zooming from a wide angle end to a telephoto end, only the second lens unit and the third lens unit move, and the first lens unit, the fourth lens unit, and the fifth lens unit are fixed.

Still another zoom image pickup apparatus according to the present invention comprises
a mount portion,
a zoom lens which forms an image of light incident from the mount portion, and
an image pickup element which is disposed at an image forming position, wherein
the zoom lens includes in order from an object side,
a first lens unit having a negative refractive power,
a second lens unit having a positive refractive power,
a third lens unit having a negative refractive power, and
a fourth lens unit having a positive refractive power, and
the third lens unit is a focusing lens unit, and
at a time of zooming from a wide angle end to a telephoto end, only the first lens unit and the second lens unit move, and the third lens unit and the fourth lens unit are fixed.

Moreover, still another zoom image pickup apparatus according to the present invention comprises
a mount portion,
a zoom lens which forms an image of light incident from the mount portion, and
an image pickup element which is disposed at an image forming position, wherein
the zoom lens includes a plurality of lens units, and a focusing lens unit, and
the following conditional expressions (1) and (15) are satisfied:

$$1.5 < f_{Lt}/f_{Lw} \quad (1), \text{ and}$$

$$|(y_{w7d'} - y_{w7d})/|P|/(1/N) < 192 \quad (15)$$

where, a side of the mount portion is let to be an object side and a side of the image pickup element is let to be an image side, each of $f_{Lt}$ and $f_{Lw}$ is a focal length of the zoom lens when focused to a first object, and $f_{Lt}$ denotes a focal length at a telephoto end and $f_{Lw}$ denotes a focal length at a wide angle end, each of $y_{w7d}$ and $y_{w7d'}$ is a height of a first predetermined light ray at a position at which the first predetermined light ray intersects an image plane, and $y_{w7d}$ denotes a light-ray height when focused to the first object and $y_{w7d'}$ denotes a light-ray height in a defocused state, the defocused state is a state in which the focusing lens unit is moved by $\Delta_{s2}$ when focused to the first object, and $\Delta_{s2}$=10×P, $$0.0008<P<0.005, 0.05<1/N<1,$$

where,

N denotes the number of pixels (unit millions of pixels) of the image pickup element, P denotes a pixel pitch (unit mm) of the image pickup element, the first predetermined light ray is a light ray with an angle of view of 7 degrees at the wide angle end, which passes through a center of a lens surface nearest to object, of the zoom lens, the first object is an object when an object-point distance is 1000 mm, and the object-point distance is a distance from a lens surface positioned nearest to object of the zoom lens, up to an object.

BRIEF DESCRIPTION OF THE DRAWINGS

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of focusing to the first object, of the zoom lens according to the example 1;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of focusing to the first object, of the zoom lens according to the example 4;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of focusing to the first object, of the zoom lens according to the example 5;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of focusing to the first object, of the zoom lens according to the example 7;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of focusing to the first object, of the zoom lens according to the example 8;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of focusing to the first object, of the zoom lens according to the example 9;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of focusing to the first object, of the zoom lens according to the example 10;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of focusing to the first object, of the zoom lens according to the example 11;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of focusing to the first object, of the zoom lens according to the example 12;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams at the time of focusing to the first object, of the zoom lens according to the example 13;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams at the time of focusing to the first object, of the zoom lens according to the example 14.

DETAILED DESCRIPTION OF THE INVENTION

A zoom image pickup apparatus according to the present embodiment includes a mount portion, a zoom lens which forms an image of light incident from the mount portion, and an image pickup element which is disposed at an image forming position, wherein the zoom lens includes a plurality of lens units, and a focusing lens unit, and the following conditional expressions (1) and (2) are satisfied:

$$1.5 < f_{Lt}/f_{Lw} \quad (1), \text{ and}$$

$$|(y_{w7d'} - y_{w7d})/y_{w7d}| \times 100 < 0.66 \quad (2)$$

where, a side of the mount portion is let to be an object side and a side of the image pickup element is let to be an image side, each of $f_{Lt}$ and $f_{Lw}$ is a focal length of the zoom lens when focused to a first object, and $f_{Lt}$ denotes a focal length at a telephoto end and $f_{Lw}$ denotes a focal length at a wide angle end, each of $y_{w7d}$ and $y_{w7d'}$ is a height of a first predetermined light ray at a position at which the first predetermined light ray intersects an image plane, and $y_{w7d}$ denotes a light-ray height when focused to the first object and $y_{w7d'}$ denotes a light-ray height in a defocused state, the defocused state is a state in which the focusing lens unit is moved by $\Delta_{s1}$ when focused to the first object, and $\Delta_{s1} = f_{Lw} \times 0.005$, the first predetermined light ray is a light ray with an angle of view of 7 degrees at the wide angle end, which passes through a center of a lens surface nearest to object of the zoom lens, the first object is an object when an object-point distance is 1000 mm, and the object-point distance is a distance from a lens surface positioned nearest to object of the zoom lens, up to an object.

By making so as not to fall below a lower limit value of conditional expression (1), it is possible to obtain an image of a desired size even without replacing an adapter as in a conventional technology. For instance, in a case in which the optical instrument is an endoscope, it is possible to display an image of a size desired by a person carrying out surgery, on a television monitor.

Figure 1:
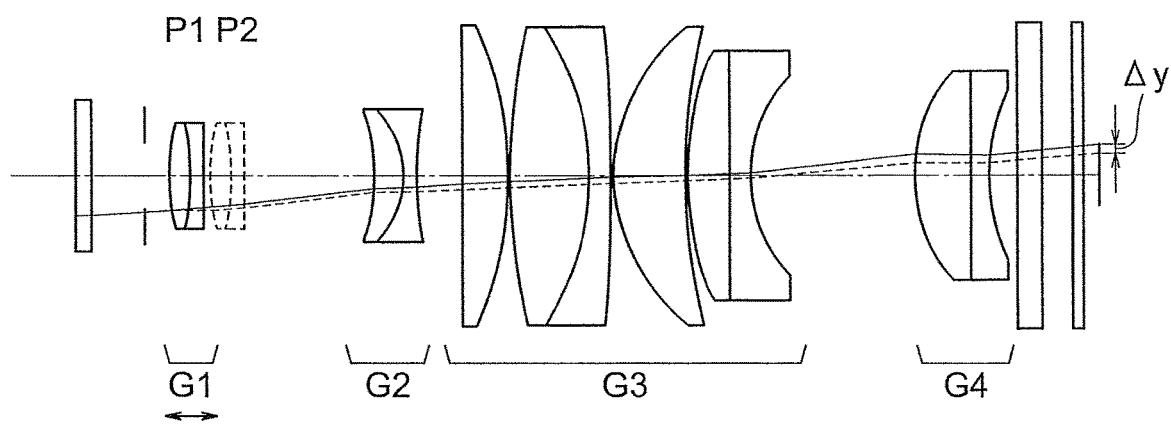
FIG. 1 is a diagram showing how an image height varies by a movement of a lens unit in a conventional zoom optical system.
Figure 2A:
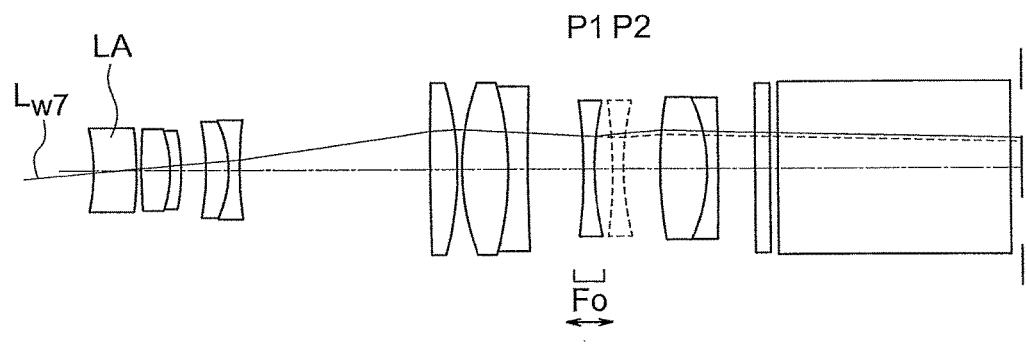
FIG. 2A and FIG. 2B are diagrams for explaining $y_{w7d}$ and $y_{w7d'}$.
Figure 23A:
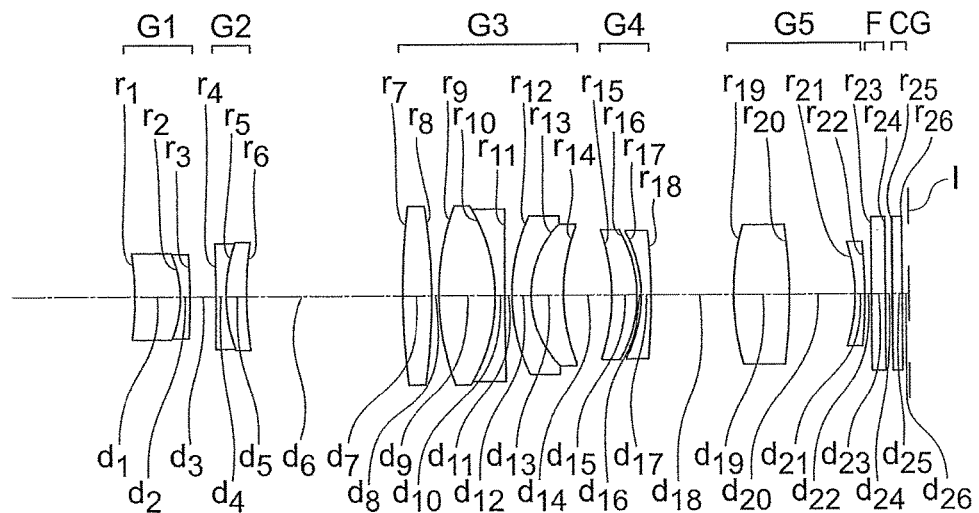
FIG. 23A, FIG. 23B, and FIG. 23C are cross-sectional views along an optical axis showing an optical arrangement at the time of focusing to a first object, of a zoom lens according to an example 11.
Figure 23B:
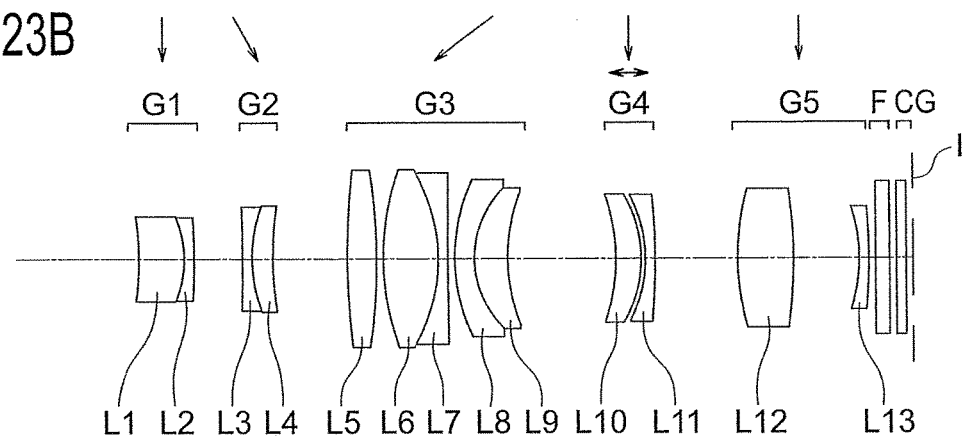
Figure 23C:
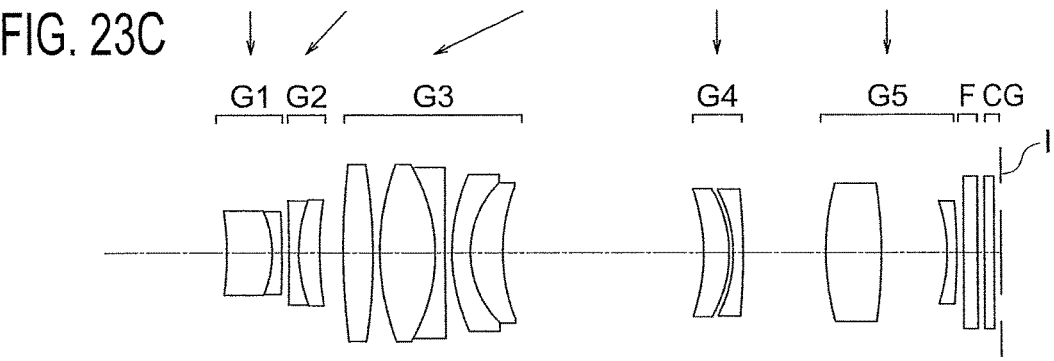
Figure 25A:
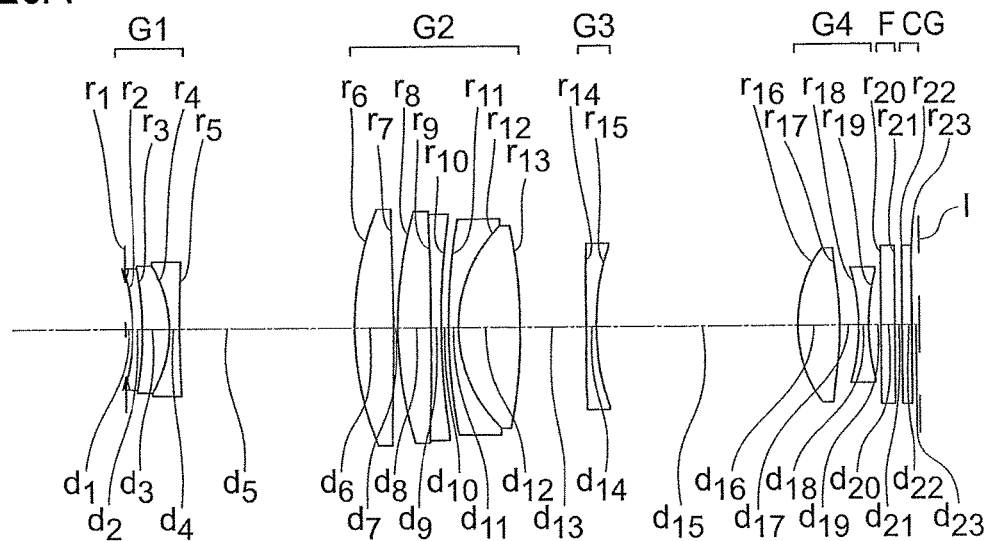
FIG. 25A, FIG. 25B, and FIG. 25C are cross-sectional views along an optical axis showing an optical arrangement at the time of focusing to a first object, of a zoom lens according to an example 12.
Figure 25B:
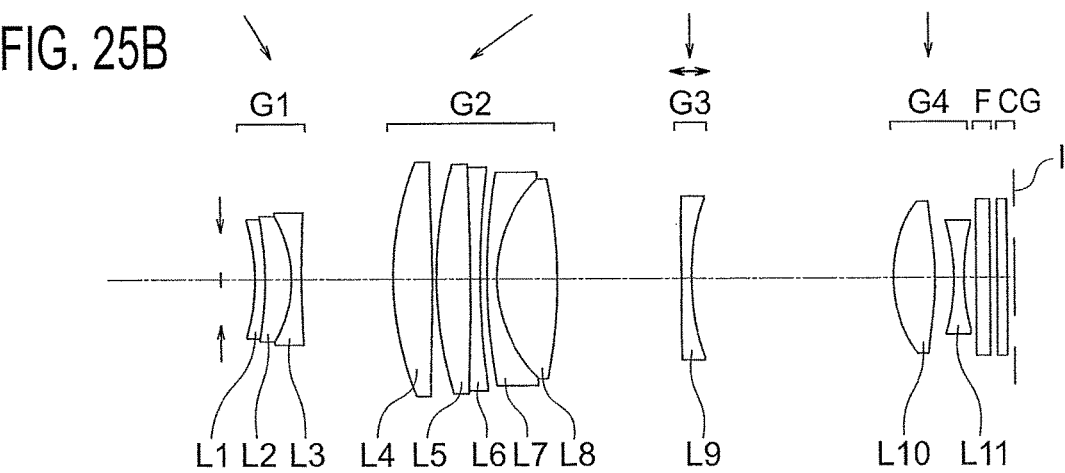
Figure 25C:
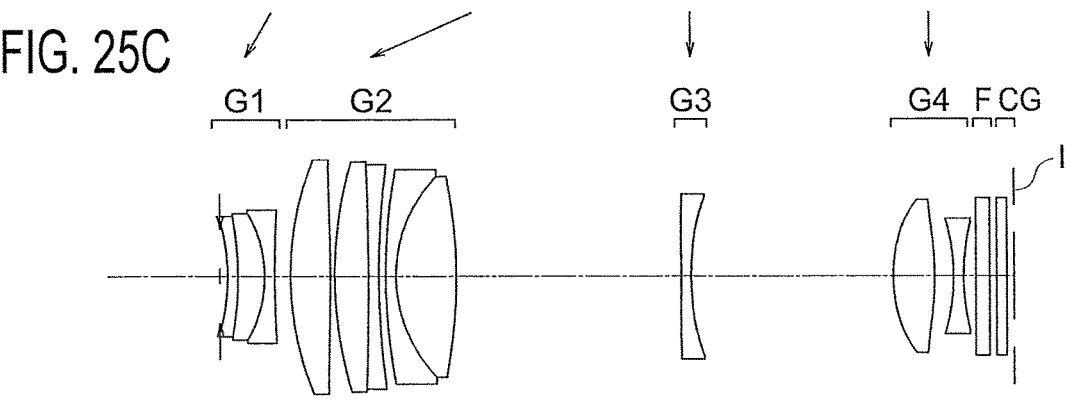
Figure 27A:
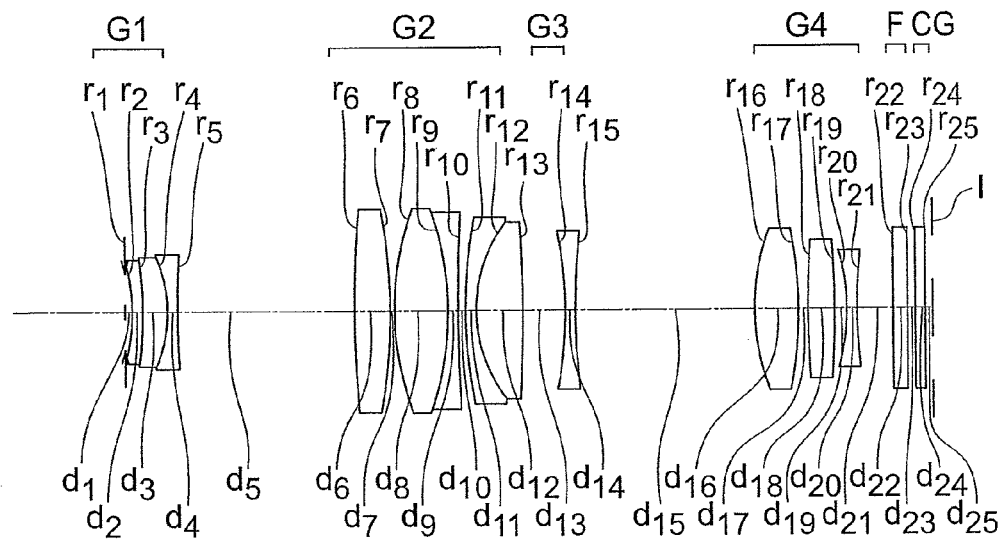
FIG. 27A, FIG. 27B, and FIG. 27C are cross-sectional views along an optical axis showing an optical arrangement at the time of focusing to a first object, of a zoom lens according to an example 13.
Figure 27B:
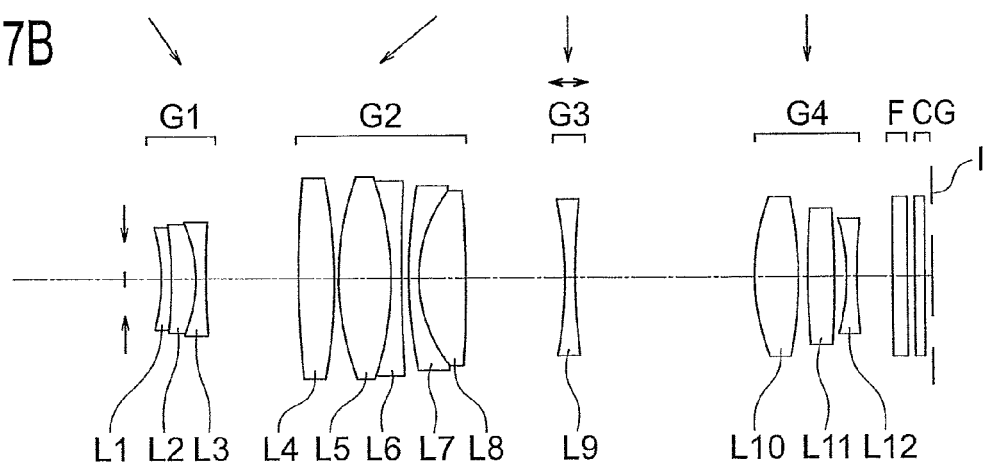
Figure 27C:
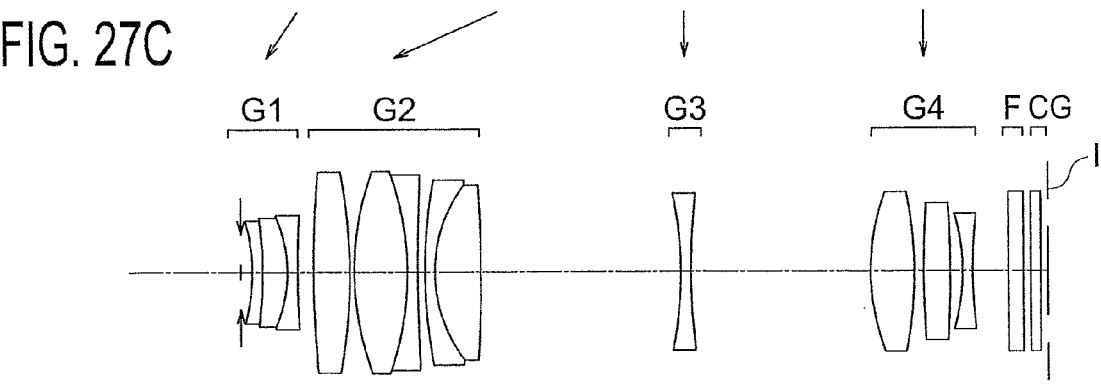
Figure 29A:
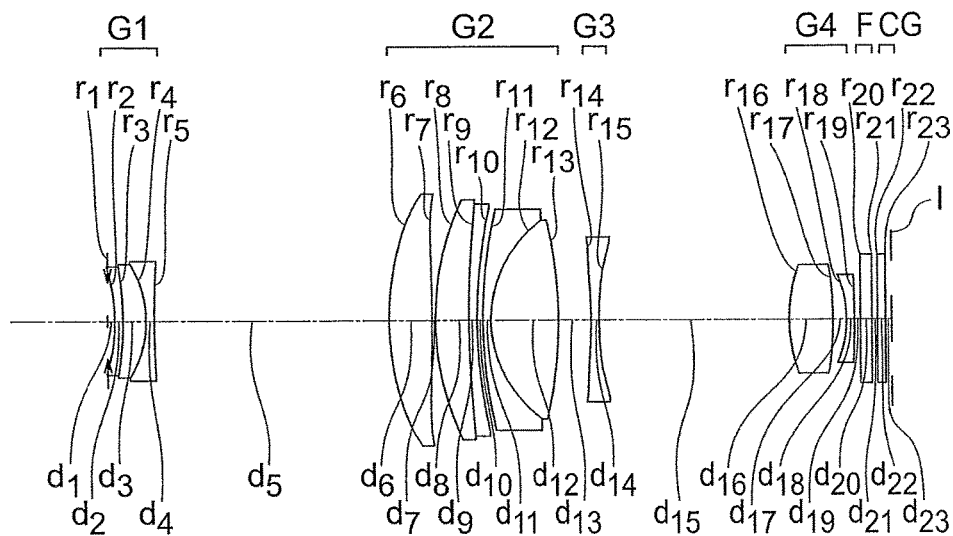
FIG. 29A, FIG. 29B, and FIG. 29C are cross-sectional views along an optical axis showing an optical arrangement at the time of focusing to a first object, of a zoom lens according to an example 14.
Figure 29B:
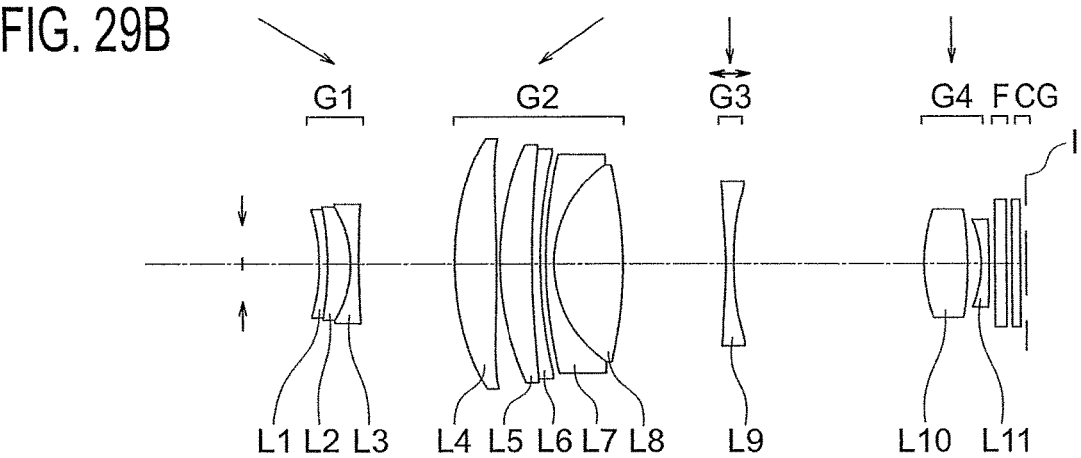
Figure 29C:
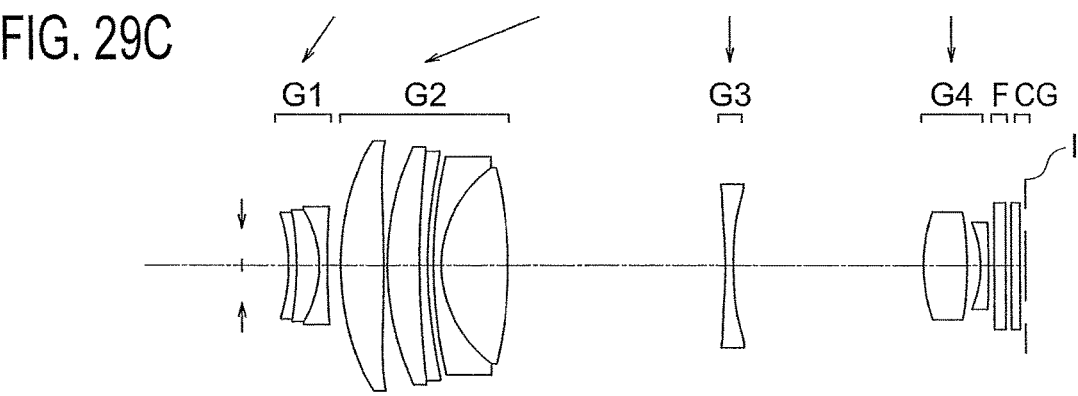

Conditional expression (2) is a conditional expression related to an amount of variation Δy (an amount of variation in image height). Next, $y_{w7d}$ and $y_{w7d'}$ in conditional expression (2) will be described by using FIG. 2A and FIG. 2B. FIG. 2A shows an overall zoom lens and FIG. 23 is an enlarged view showing proximity of an image plane. Moreover, $L_{w7}$ shows a first predetermined light ray, LA shows a lens nearest to object of the zoom lens, and Fo indicates the focusing lens unit.

Figure 2B:
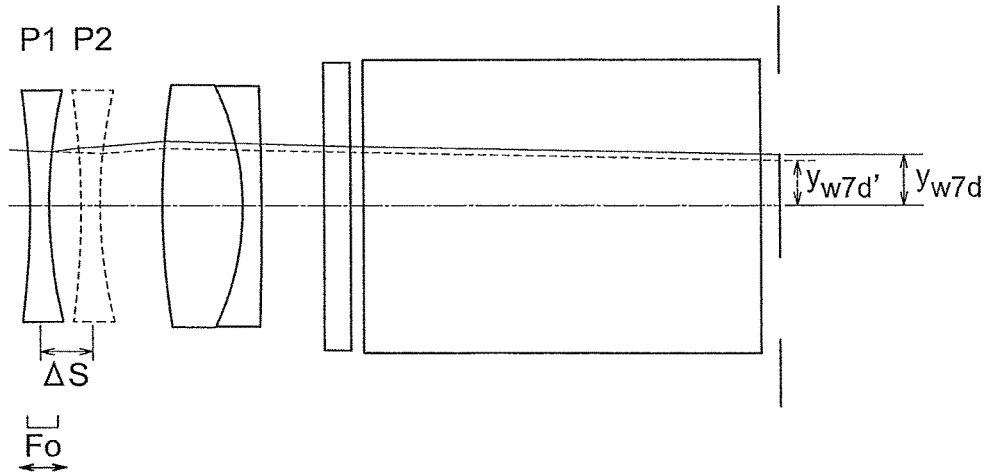
Figure 3A:
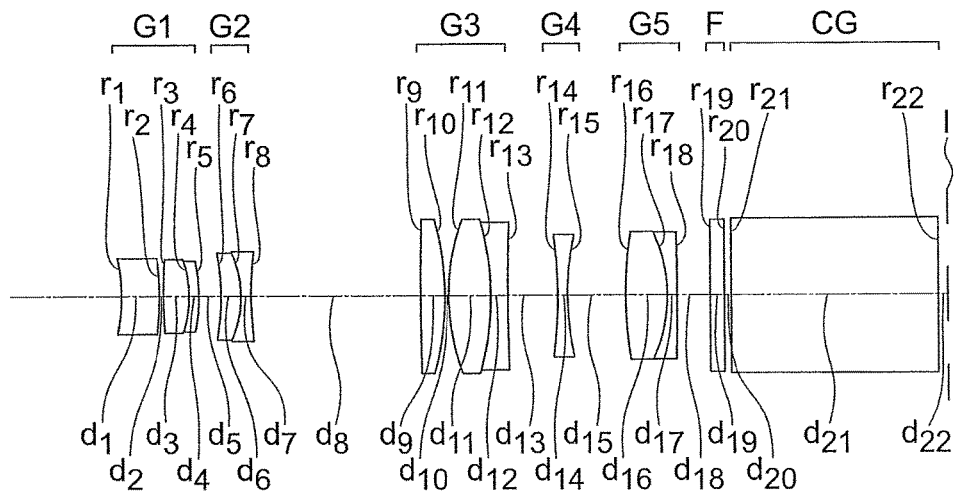
FIG. 3A, FIG. 3B, and FIG. 3C are cross-sectional views along an optical axis showing an optical arrangement at the time of focusing to a first object, of a zoom lens according to an example 1.
Figure 3B:
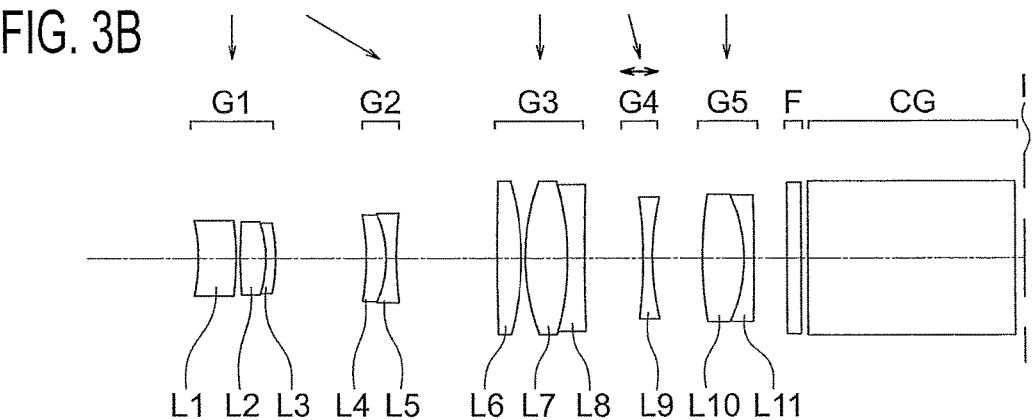
Figure 3C:
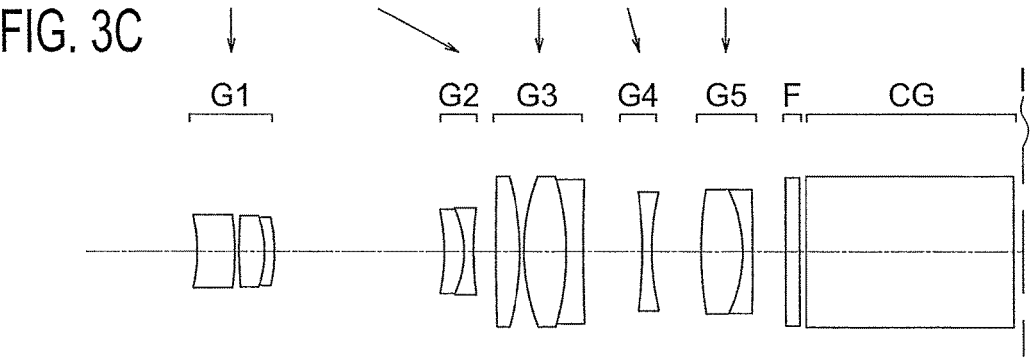
Figure 5A:
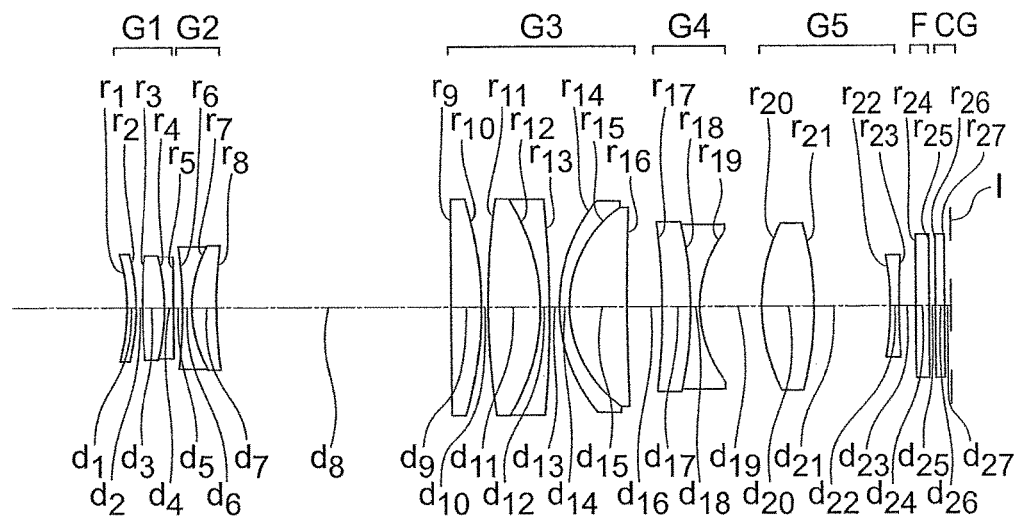
FIG. 5A, FIG. 5B, and FIG. 5C are cross-sectional views along an optical axis showing an optical arrangement at the time of focusing to a first object, of a zoom lens according to an example 2.
Figure 5B:
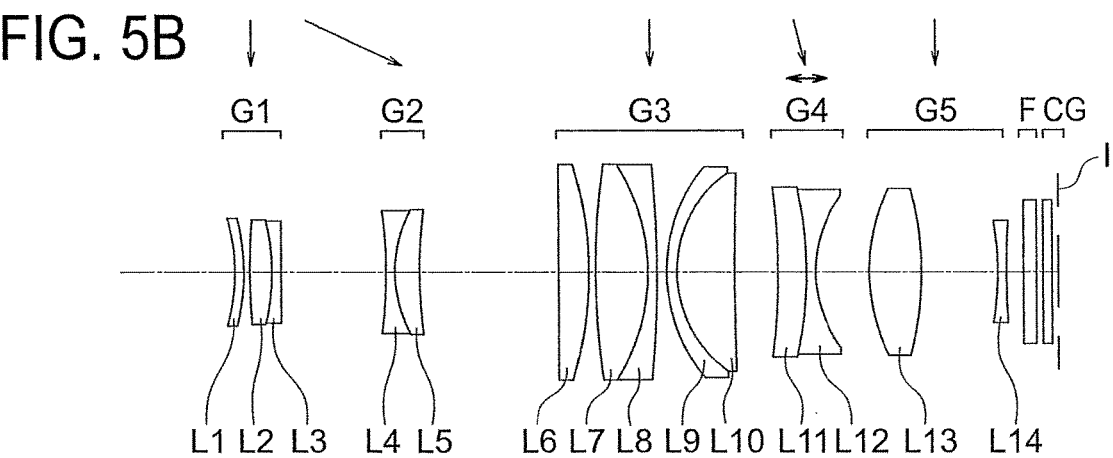
Figure 5C:
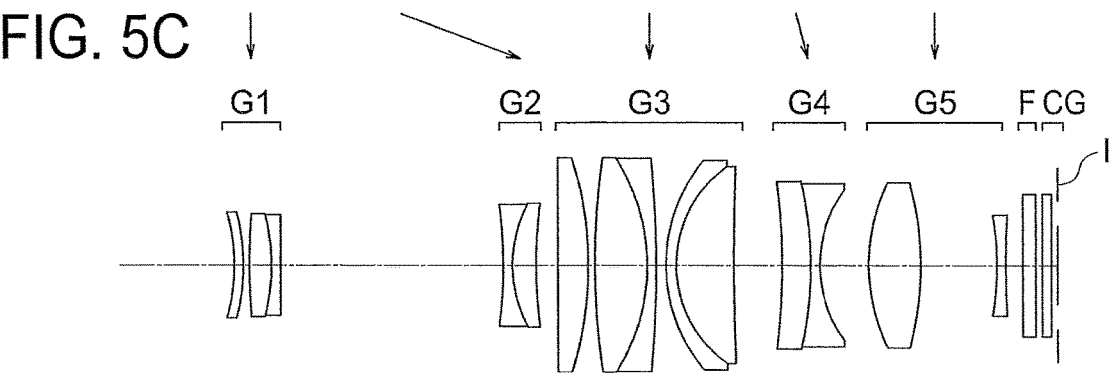
Figure 6A:
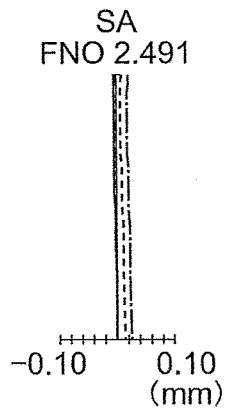
FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of focusing to the first object, of the zoom lens according to the example 2.
Figure 6B:
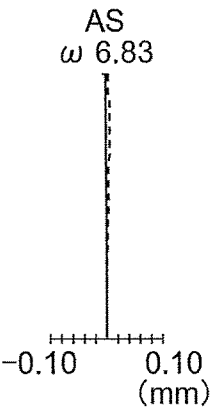
Figure 6C:
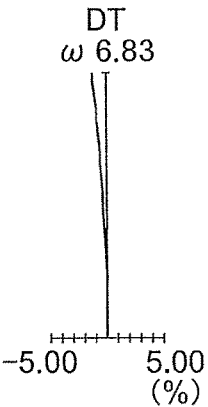
Figure 6D:
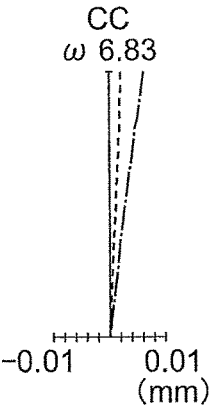
Figure 6E:
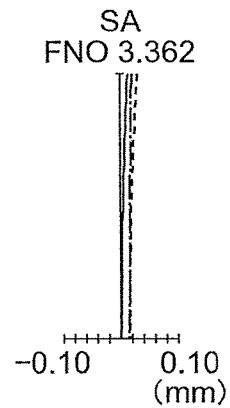
Figure 6F:
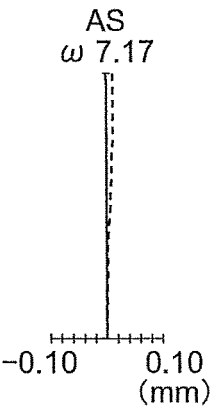
Figure 6G:
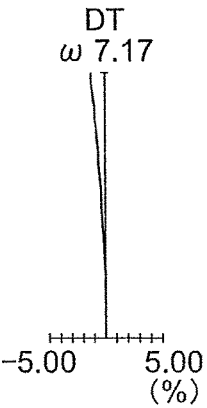
Figure 6H:
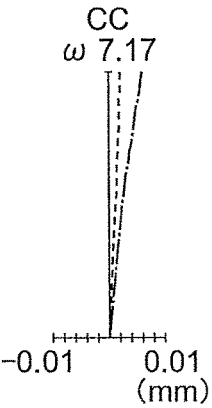
Figure 6I:
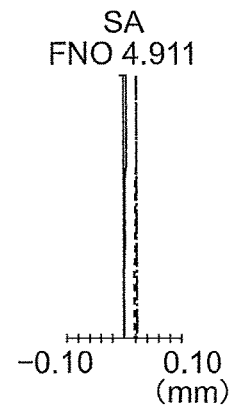
Figure 6J:
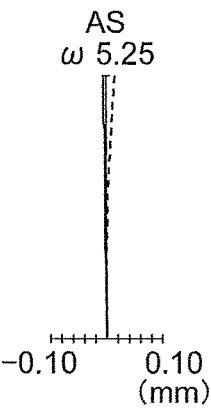
Figure 6K:
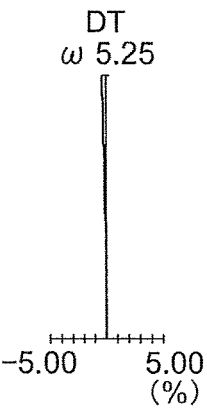
Figure 6L:
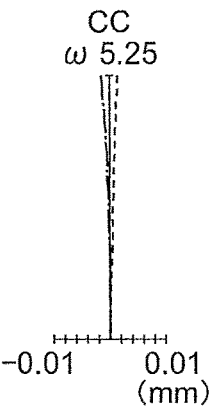
Figure 7A:
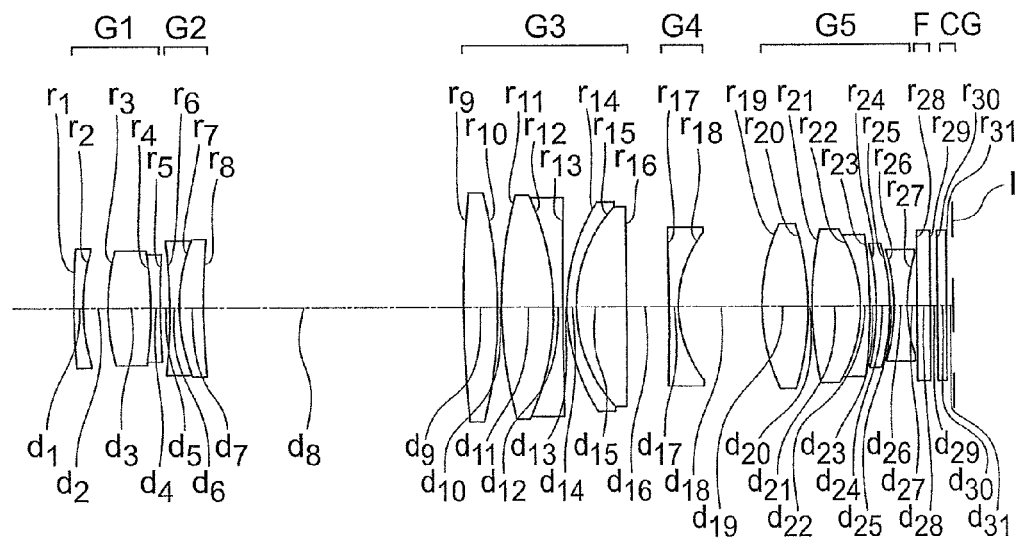
FIG. 7A, FIG. 7B, and FIG. 7C are cross-sectional views along an optical axis showing an optical arrangement at the time of focusing to a first object, of a zoom lens according to an example 3.
Figure 7B:
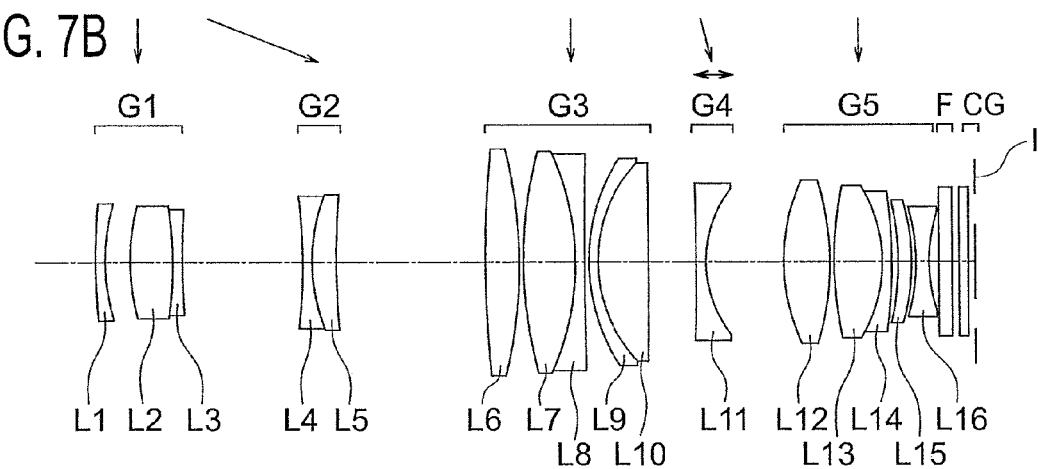
Figure 7C:
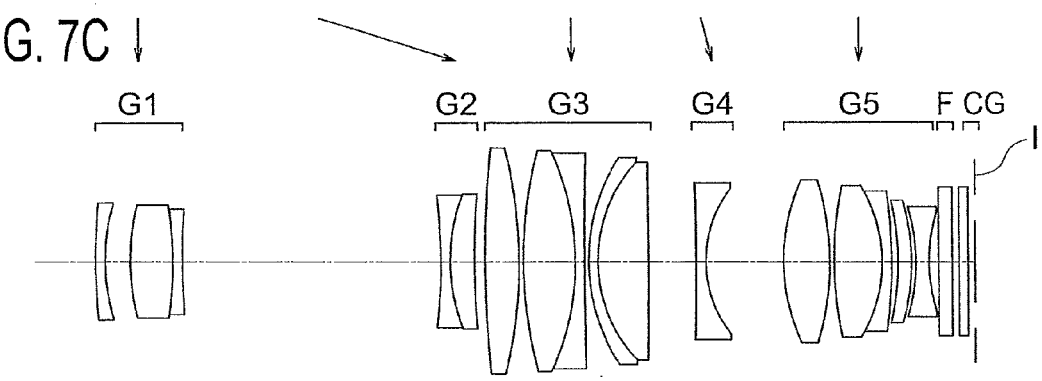
Figure 8A:
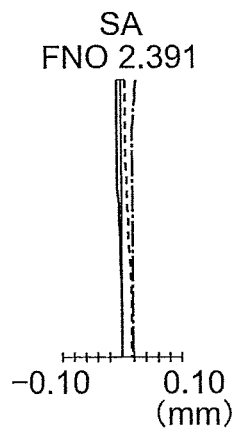
FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of focusing to the first object, of the zoom lens according to the example 3.
Figure 8B:
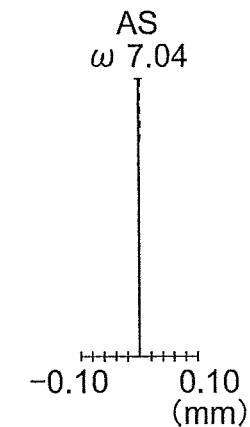
Figure 8C:
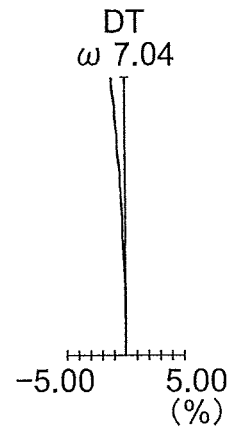
Figure 8D:
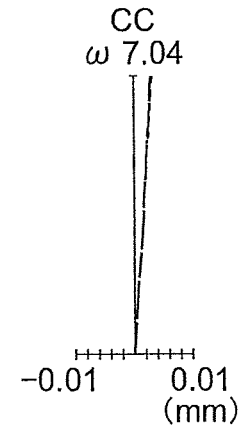
Figure 8E:
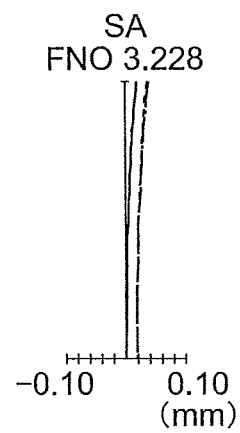
Figure 8F:
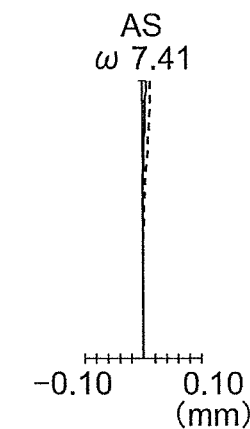
Figure 8G:
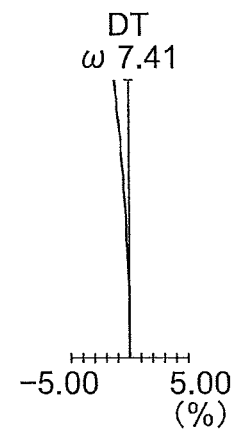
Figure 8H:
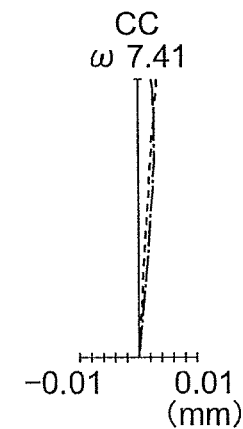
Figure 8I:
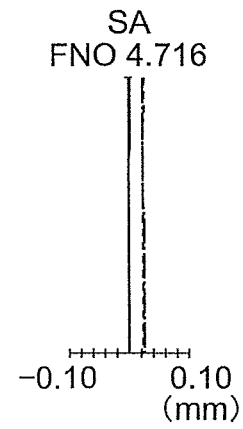
Figure 8J:
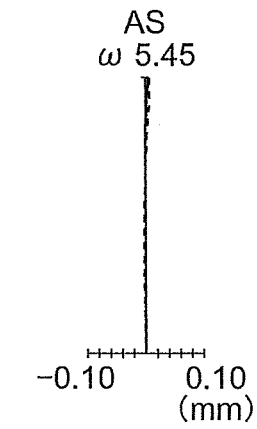
Figure 8K:
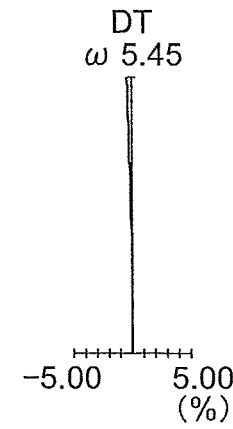
Figure 8L:
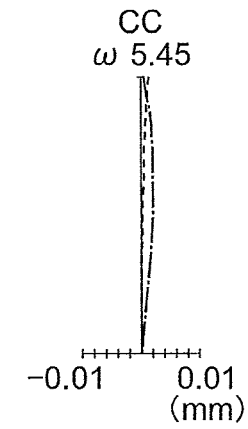
Figure 9A:
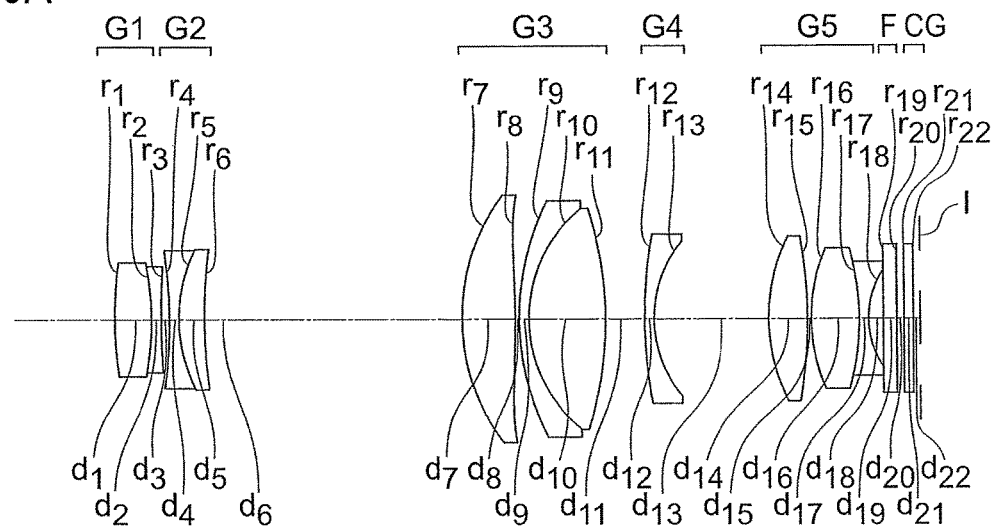
FIG. 9A, FIG. 9B, and FIG. 9C are cross-sectional views along an optical axis showing an optical arrangement at the time of focusing to a first object, of a zoom lens according to an example 4.
Figure 9B:
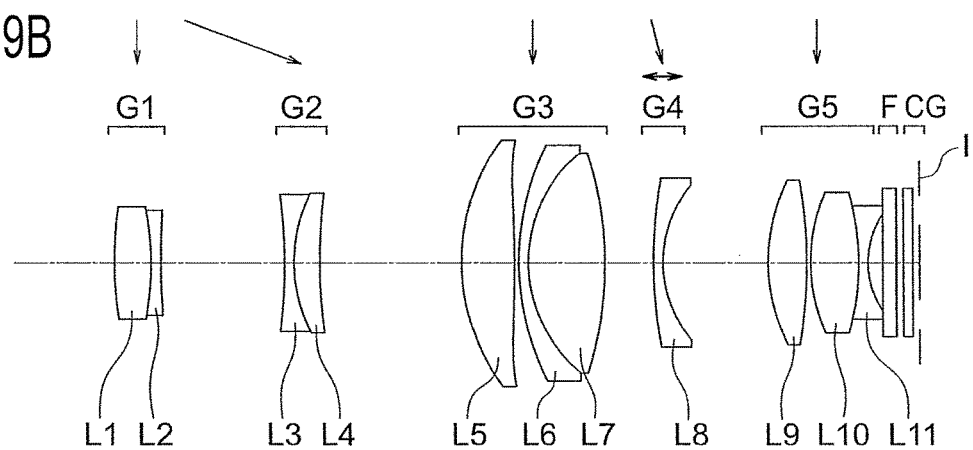
Figure 9C:
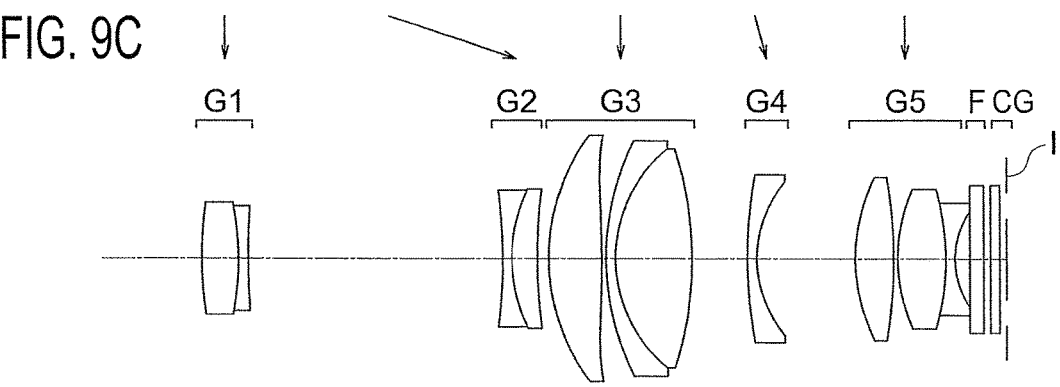
Figure 11A:
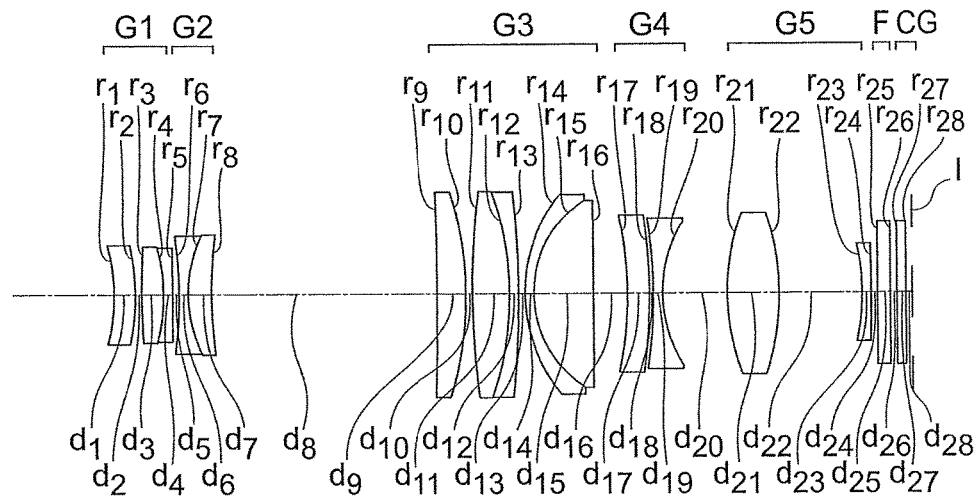
FIG. 11A, FIG. 11B, and FIG. 11C are cross-sectional views along an optical axis showing an optical arrangement at the time of focusing to a first object, of a zoom lens according to an example 5.
Figure 11B:
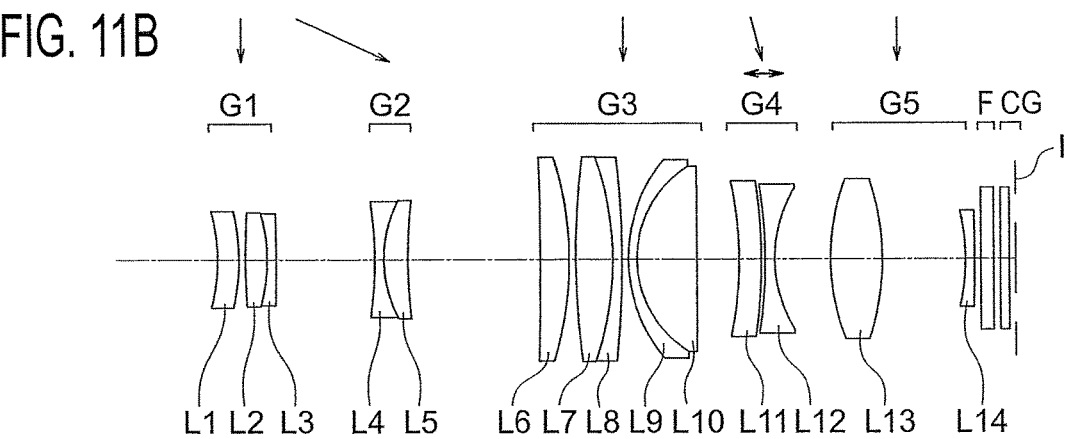
Figure 11C:
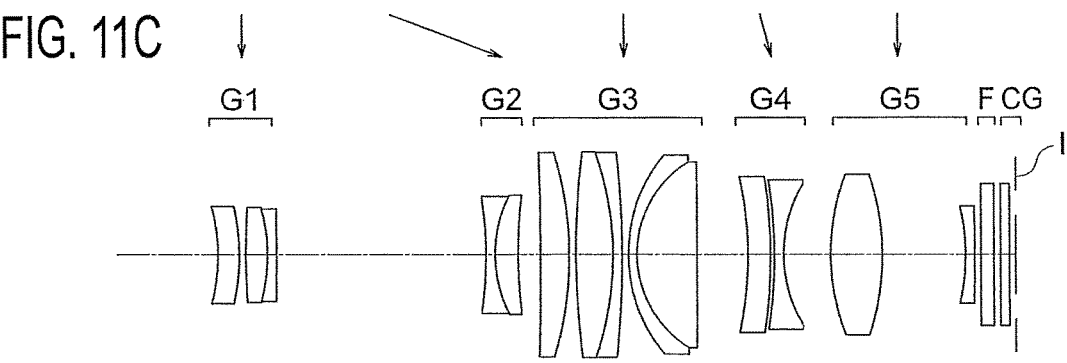
Figure 13A:
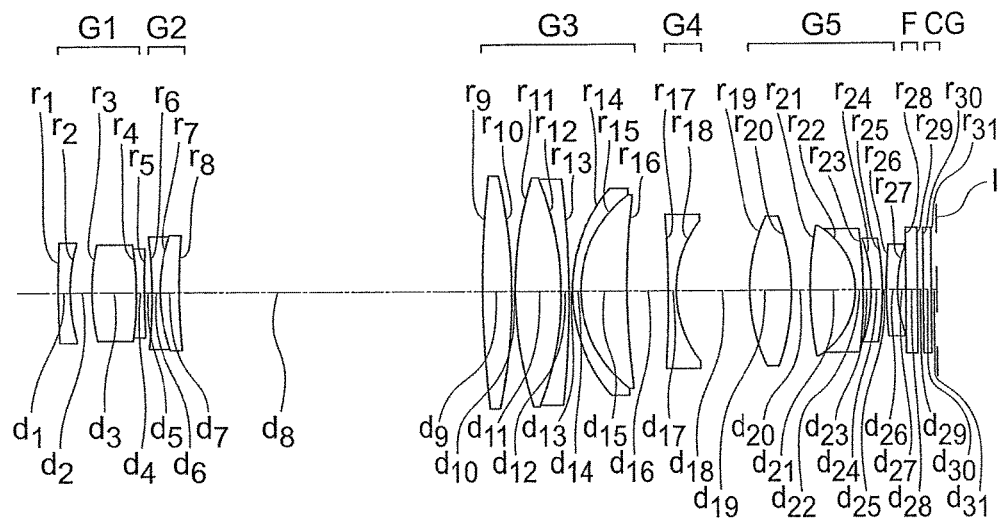
FIG. 13A, FIG. 13B, and FIG. 13C are cross-sectional views along an optical axis showing an optical arrangement at the time of focusing to a first object, of a zoom lens according to an example 6.
Figure 13B:
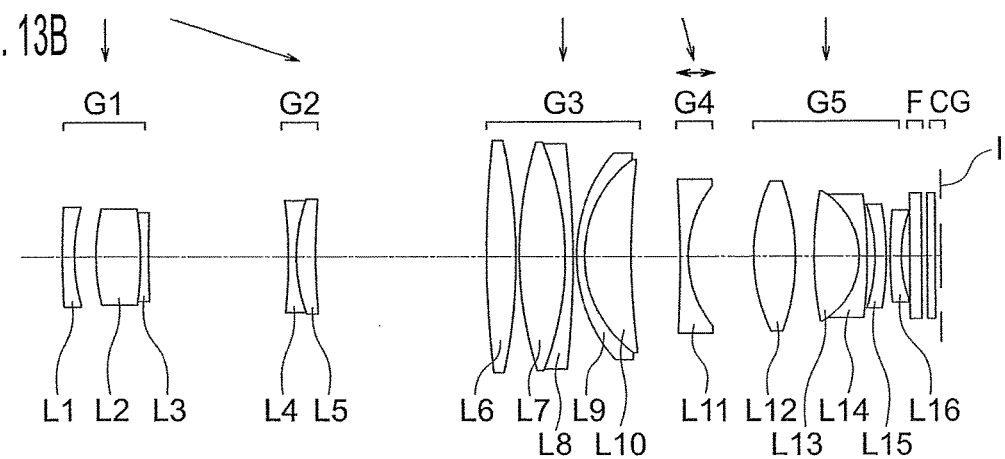
Figure 13C:
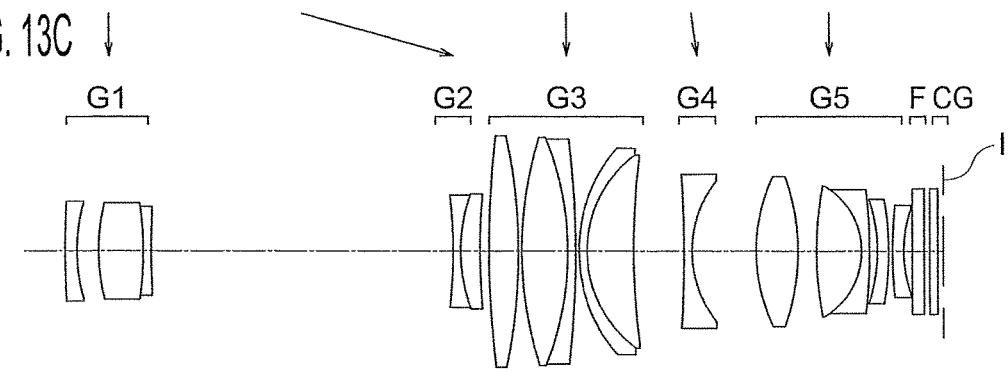
Figures 14A, 14B, 14C, 14D:
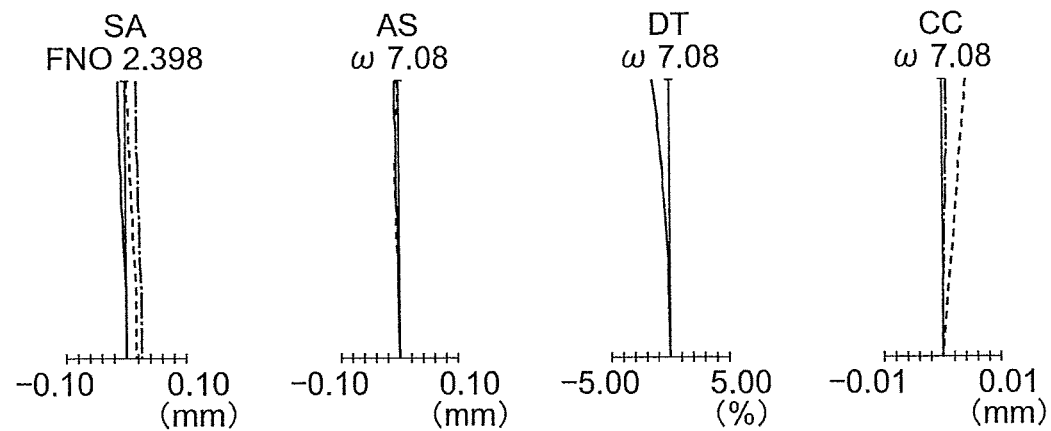
FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of focusing to the first object, of the zoom lens according to the example 6.
Figures 14E, 14F, 14G, 14H:
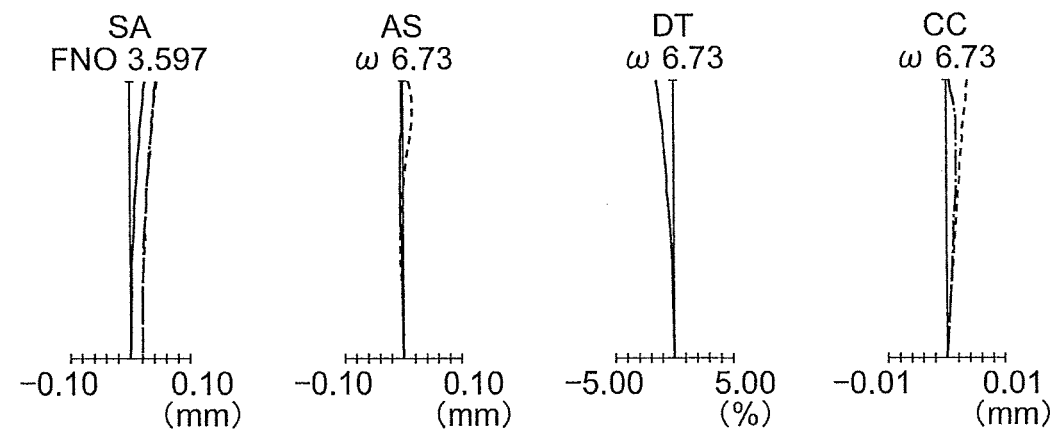
Figures 14I, 14J, 14K, 14L:
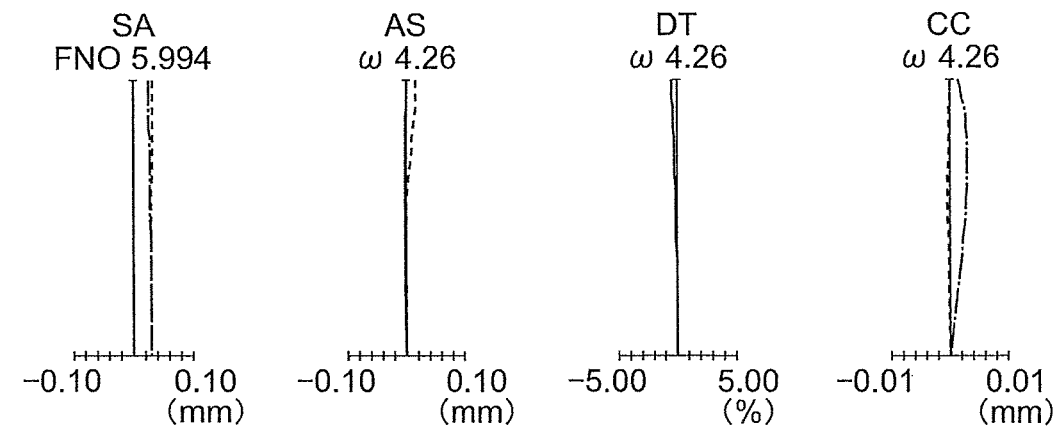
Figure 15A:
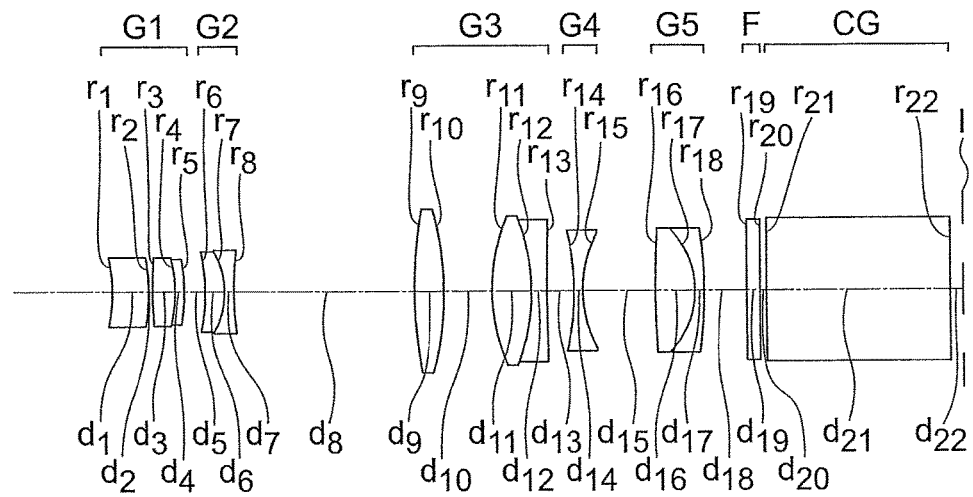
FIG. 15A, FIG. 15B, and FIG. 15C are cross-sectional views along an optical axis showing an optical arrangement at the time of focusing to a first object, of a zoom lens according to an example 7.
Figure 15B:
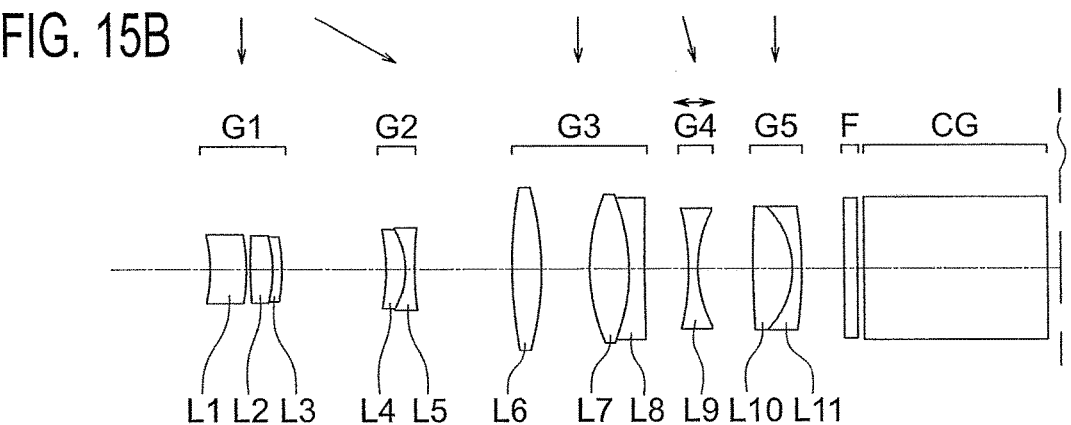
Figure 15C:
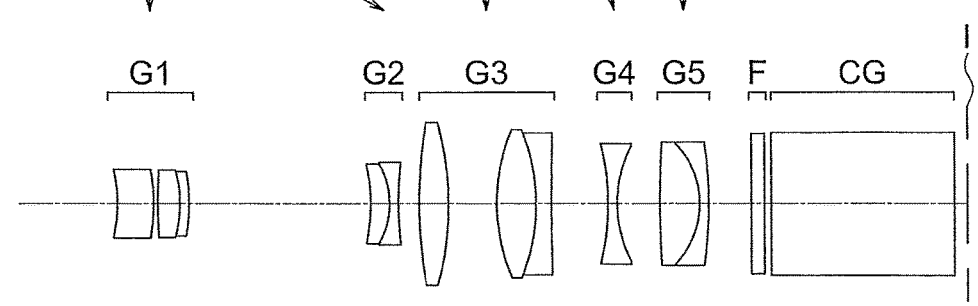
Figure 17A:
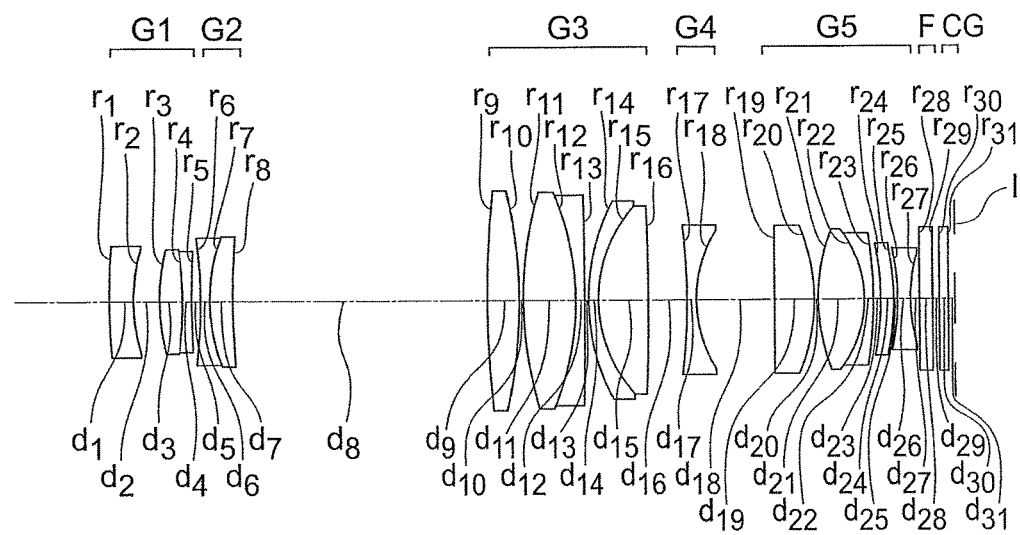
FIG. 17A, FIG. 17B, and FIG. 17C are cross-sectional views along an optical axis showing an optical arrangement at the time of focusing to a first object, of a zoom lens according to an example 8.
Figure 17B:
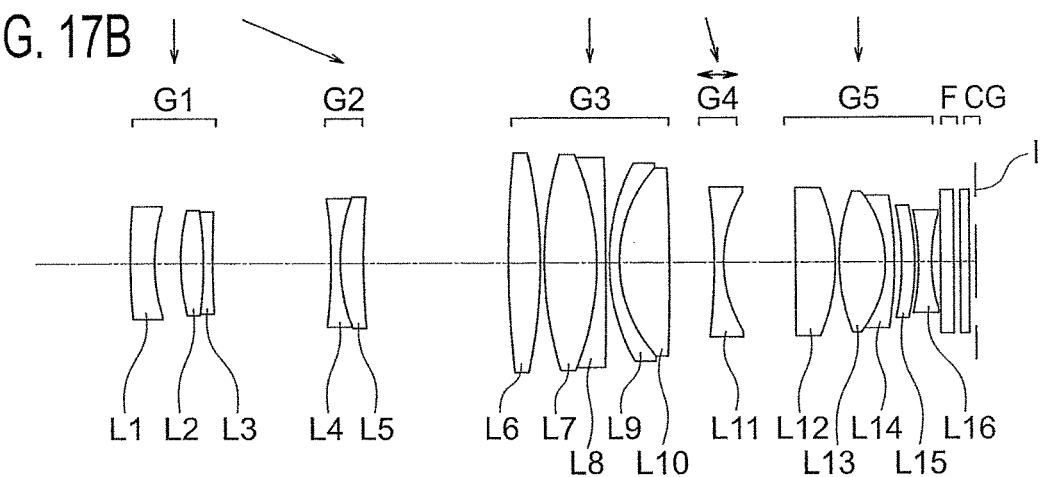
Figure 17C:
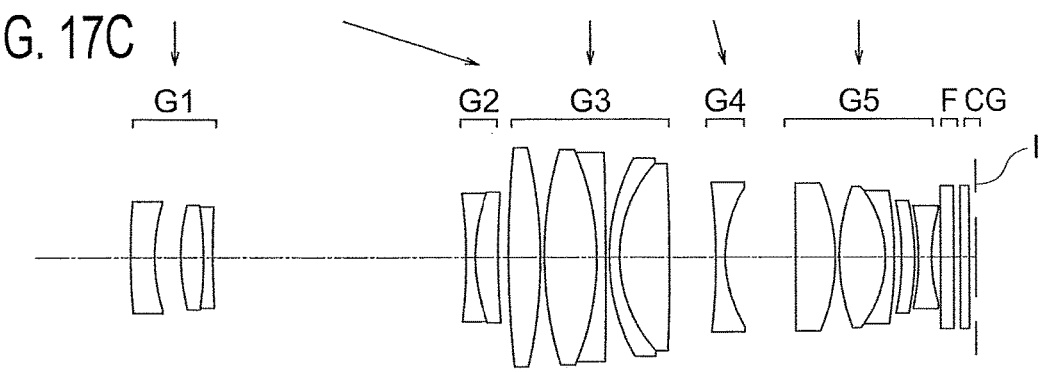
Figure 19A:
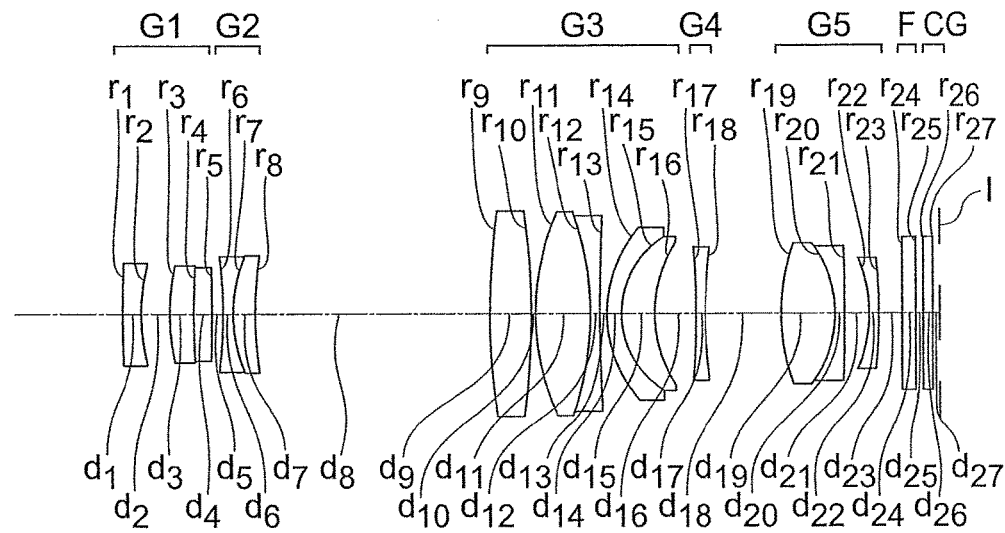
FIG. 19A, FIG. 19B, and FIG. 19C are cross-sectional views along an optical axis showing an optical arrangement at the time of focusing to a first object, of a zoom lens according to an example 9.
Figure 19B:
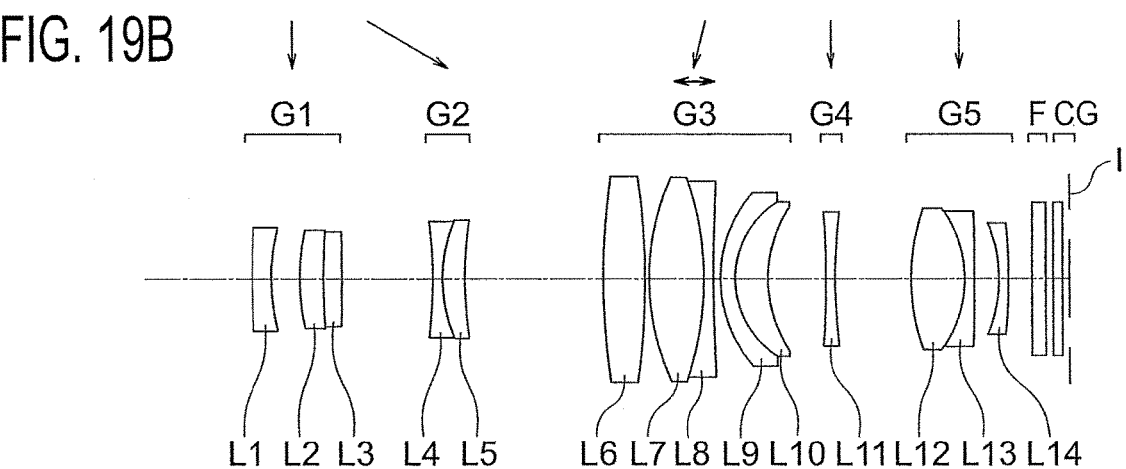
Figure 19C:
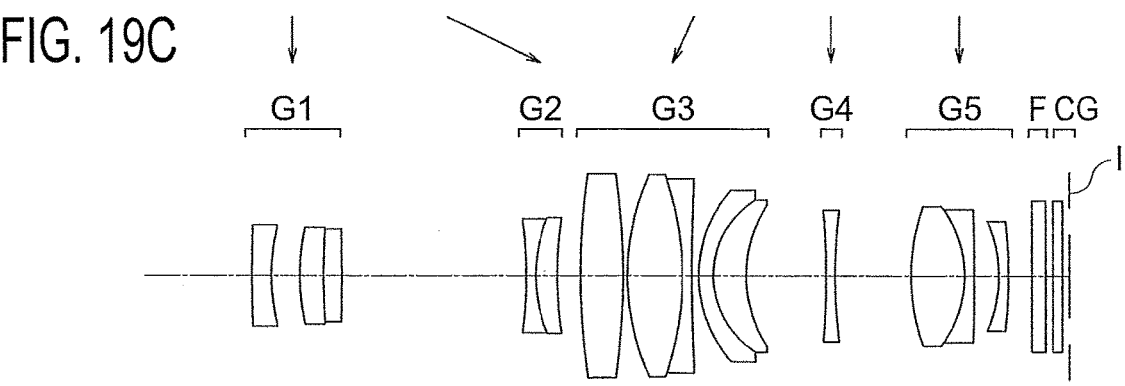
Figure 21A:
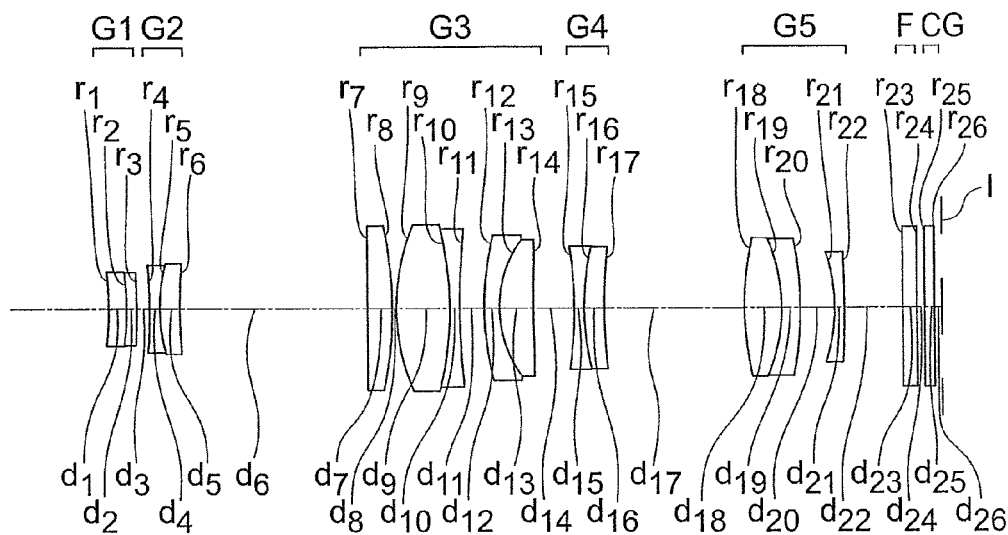
FIG. 21A, FIG. 21B, and FIG. 21C are cross-sectional views along an optical axis showing an optical arrangement at the time of focusing to a first object, of a zoom lens according to an example 10.
Figure 21B:
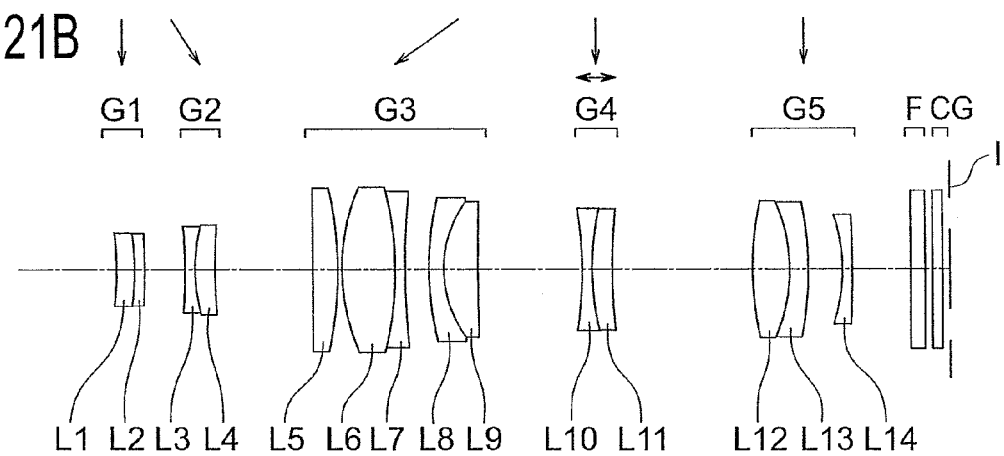
Figure 21C:
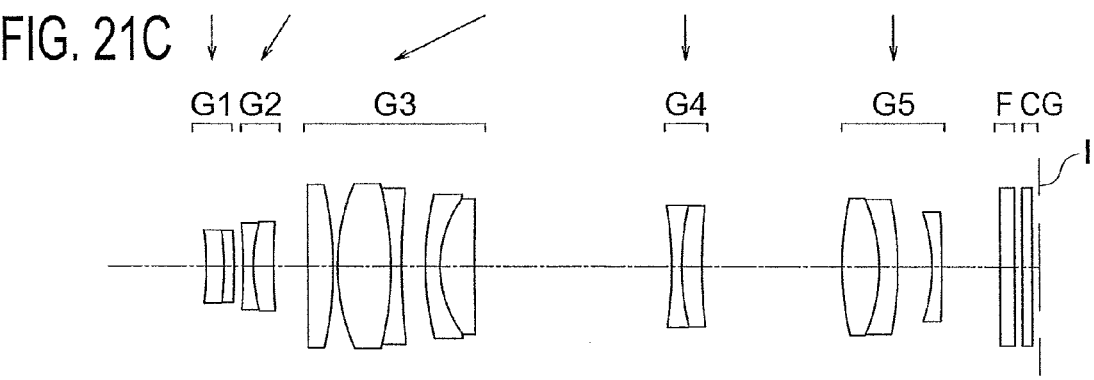

FIG. 2A and FIG. 2B are diagrams showing how the image height varies according to a movement of the focusing lens unit Fo. In FIG. 2A and FIG. 2B, P1 is a position of the focusing lens unit Fo when focused to a first object. Moreover, P2 is a position to which the focusing lens unit Fo is moved only by a minute amount ΔS. For making the movement of the focusing lens unit Fo easily understandable, the movement of the focusing lens unit Fo is exaggeratedly illustrated in FIG. 2B.

The first predetermined light ray $L_{w7}$ is a light ray with an angle of view of 7 degrees at the wide angle end. The first predetermined light ray $L_{w7}$ passes through a center of a lens surface on the object side of the lens LA.

In a state of a position of the focusing lens unit Fo coinciding with P1, a light ray incident on the focusing lens unit Fo advances as shown by a solid line, and reaches an image position. The image height at this time becomes $y_{w7d}$. From this state, the focusing lens unit Fo is let to undergo a wobbling operation. Accordingly, the focusing lens unit Fo moves to a position of P2.

In a state of the position of the focusing lens unit Fo coinciding with P2, a light ray incident on the focusing lens unit Fo advances as shown by a broken line, and reaches an image position. The image height at this time becomes $y_{w7d'}$. As shown in FIG. 2B, for the light ray of the angle of view of 7 degrees at the wide angle end, the image height fluctuates between $y_{w7d}$ and $y_{w7d'}$ according to the position of the focusing lens unit Fo.

In autofocusing, a focused state is maintained all the time by letting the focusing lens unit Fo undergo the wobbling operation. Therefore, in autofocusing, the amount of variation Δy is sought to be small at the time of movement of the focusing lens unit Fo. By satisfying conditional expression (2), it is possible to suppress an increase in the amount of variation Δy at the wide angle end.

In such manner, by satisfying conditional expressions (1) and (2), it is possible to change the size of an image freely, and it is possible to carry out autofocusing in which the increase in the amount of variation Δy has been suppressed when the autofocusing is carried out for an image of a desired height.

It is preferable that the following conditional expression (2') be satisfied instead of conditional expression (2).

$$|(y_{w7d'} - y_{w7d})/y_{w7d}| \times 100 < 0.65 \quad (2')$$

Furthermore, it is more preferable that the following conditional expression (2″) be satisfied instead of conditional expression (2).

$$|(y_{w7d'}-y_{w7d})/y_{w7d}|\times 100<0.63 \qquad (2''')$$

Moreover, in the zoom image pickup apparatus according to the present embodiment, it is preferable that the following conditional expression (7) be satisfied:

$$|(y_{t5d'}-y_{t5d})/y_{t5d}|\times 100<0.66 \qquad (3)$$

where, each of $y_{t5d'}$ and $y_{t5d}$ is a height of a second predetermined light ray at a position at which the second predetermined light ray intersects an image plane, and $y_{t5d}$ denotes a light-ray height when focused to the first object and $y_{t5d'}$ denotes a light-ray height in a defocused state, and the second predetermined light ray is a light ray with an angle of view of 5 degrees at the telephoto end, which passes through a center of a lens surface nearest to object of the zoom lens.

As mentioned above, in autofocusing, the amount of variation Δy is sought to be small at the time of movement of the focusing lens unit. By satisfying conditional expression (3), it is possible to suppress an increase in the amount of variation Δy at the telephoto end.

It is preferable that the following conditional expression (3′) be satisfied instead of conditional expression (3).

$$|(y_{t5d'}-y_{t5d})/x100<0.65 \qquad (3')$$

Furthermore, it is more preferable that the following conditional expression (3″) be satisfied instead of conditional expression (3).

$$|(y_{t5d'}-y_{t5d})/y_{t5d}|\times 100<0.63 \qquad (3'')$$

Moreover, in the zoom image pickup apparatus according to the present embodiment, it is preferable that the plurality of lens units include a movable lens unit, and the focusing lens unit is positioned on an image side of the movable lens unit.

By the movable lens unit, it is possible to vary an image forming magnification. Here, when the focusing lens unit is positioned on the object side of the movable lens unit, an amount of variation in the image height and an amount of variation in an image position due to the movement of the focusing lens unit change substantially according to the movement of the movable lens unit. In such manner, the variation in the image height and the variation in the image position due to the movement of the focusing lens unit are substantially affected by the movement of the movable lens unit.

For this reason, the focusing lens unit is to be positioned on the image side of the movable lens unit. By making such an arrangement, the effect due to the movable lens unit can be almost ignored. As a result of this, in a range from the wide angle end up to the telephoto end, it is possible to suppress an increase in the amount of variation Δy.

Moreover, in the range from the wide angle end to the telephoto end, focusing sensitivity ceases to vary substantially. Furthermore, the variation in the focusing sensitivity being small, it becomes easy to control the movement of the focusing lens unit. The focusing sensitivity is an amount indicating an amount of movement of the image plane with respect to the amount of movement of the focusing lens unit.

Moreover, a height of an axial light ray becomes low on the image side. By positioning the focusing lens unit on the image side of the movable lens unit, the height of an axial light ray passing through the focusing lens unit becomes low. Consequently, it becomes easy to suppress an occurrence of a spherical aberration.

Moreover, in the zoom image pickup apparatus according to the present embodiment, it is preferable that the following conditional expression (4) be satisfied:

$$0.55<|\beta_{ctw}|<5 \qquad (4)$$

where, $\beta_{ctw}=(1-\beta_{fcw}\times\beta_{fcw})\times\beta_{w}'\times\beta_{w}'$, here each of $\beta_{fcw}$ and $\beta_{w}'$ is a lateral magnification at the wide angle end when focused to the first object, and $\beta_{fcw}$ denotes a lateral magnification of the focusing lens unit and $\beta_{w}'$ denotes a lateral magnification of a lens unit positioned on an image side of the focusing lens unit, $\beta_{ctw}=(1-_{fcw}\times\beta_{fcw})$ when the focusing lens unit is positioned nearest to image, the first object is an object when the object-point distance is 1000 mm, and the object-point distance is a distance from a lens surface positioned nearest to object of the zoom lens up to an object.

Conditional expression (4) is a conditional expression related to the focusing sensitivity at the wide angle end. As mentioned above, the focusing sensitivity is the amount indicating the amount of movement of the image plane with respect to the amount of movement of the focusing lens unit.

By exceeding a lower limit value of conditional expression (4), it is possible to suppress the increase in the amount of movement of the focusing lens unit at the time of focusing. As a result of this, it is possible to suppress the fluctuation in an astigmatism at the time of focusing. Moreover, since it is possible to suppress the increase in the amount of movement of the focusing lens unit, it is possible to make small a space for the movement of the focusing lens unit. As a result of this, it is possible to carry out small-sizing of the zoom lens and small-sizing of the zoom image pickup apparatus.

By falling below an upper limit value of conditional expression (4), it is possible to suppress the astigmatism from occurring in the focusing lens unit.

It is preferable that the following conditional expression (4′) be satisfied instead of conditional expression (4).

$$0.555<|\beta_{ctw}|<4 \qquad (4')$$

Furthermore, it is more preferable that the following conditional expression (4″) be satisfied instead of conditional expression (4).

$$0.555<|\beta_{ctw}-<3 \qquad (4'')$$

Moreover, in the zoom image pickup apparatus according to the present embodiment, it is preferable that the following conditional expression (5) be satisfied:

$$-6<f_{fc}/f_{Lw}<-0.4 \qquad (5)$$

where, $f_{fc}$ denotes a focal length of the focusing lens unit, $f_{Lw}$ denotes the focal length at the wide angle end of the zoom lens when focused to the first object, the first object is an object when an object-point distance is 1000 mm, and the object-point distance is a distance from a lens surface positioned nearest to object of the zoom lens up, to the object.

Conditional expression (5) is a conditional expression in which a ratio of two focal lengths is taken. One is the focal length of the focusing lens unit and the other is the focal length of the zoom lens. The focal length of the zoom lens is a focal length at the wide angle end when focused to the first object.

By exceeding a lower limit value of conditional expression (5), since it is possible to set favorably Petzval sum for the focusing lens unit, it is possible to correct the astigmatism favorably. Accordingly, it is possible to maintain a favorable optical performance.

It is effective to fall below an upper limit value of conditional expression (5) for shortening the overall length of the optical system, and accordingly, it is possible to make small the amount of movement of the focusing lens unit.

It is preferable that the following conditional expression (5') be satisfied instead of conditional expression (5).

$$-4 < f_{ft}/f_{Lw} < -0.5 \quad (5')$$

Furthermore, it is more preferable that the following conditional expression (5") be satisfied instead of conditional expression (5).

$$-2.4 < f_{fc}/f_{Lw} < -0.8 \quad (5'')$$

Moreover, in the zoom image pickup apparatus according to the present embodiment, it is preferable that the following conditional expression (6) be satisfied:

$$2 < d_{pg}/d_{fc} < 25 \quad (6)$$

where, each of $d_{pg}$ and $d_{fg}$ is a thickness on an optical axis of a lens unit, and $d_{pg}$ denotes a thickness of a lens unit having the largest positive refractive power from among thicknesses of lens units positioned on the object side of the focusing lens unit, and $d_{fc}$ denotes a thickness of the focusing lens unit.

Conditional expression (6) is a conditional expression in which a ratio of the thickness on the optical axis of two lens units is taken. One is the thickness of a predetermined positive lens unit and the other is the thickness of the focusing lens unit. The predetermined positive lens unit is a lens unit having the largest positive refractive power from among the lens units positioned on the object side of the focusing lens unit. Moreover, the thickness is a thickness on the optical axis.

On the object side of the focusing lens unit, the height of an axial image ray is high. An aberration is corrected by disposing the lens unit having the largest positive refractive power here. By exceeding a lower limit value of conditional expression (6), it is possible to make thick the thickness of the lens unit having the largest positive refractive power. As a result of this, it is possible to carry out the correction of the spherical aberration favorably.

By falling below an upper limit value of conditional expression (6), the thickness of the lens unit having the largest refractive power does not become excessively thick. Therefore, it is effective to fall below the upper limit value of conditional expression (6) for shortening the overall length of the optical system.

It is preferable that the following conditional expression (6') be satisfied instead of conditional expression (6).

$$2.7 < d_{pg}/d_{fc} < 22 \quad (6')$$

Furthermore, it is more preferable that the following conditional expression (6") be satisfied instead of conditional expression (6).

$$3.9 < d_{pg}/d_{fc} < 20 \quad (6'')$$

Moreover, in the zoom image pickup apparatus according to the present embodiment, it is preferable that a lens unit having a negative refractive power which satisfies the following conditional expression (7) is positioned on the object side of a lens unit having a positive refractive power:

$$0.1 < d_{ng}/d_{pg} < 0.9 \quad (7)$$

where, each of $d_{ng}$ and $d_{pg}$ is a thickness on an optical axis of a lens unit, and $d_{ng}$ denotes a thickness of a lens unit having the largest negative refractive power from among thicknesses of lens units positioned on the object side of the focusing lens unit, and $d_{pg}$ denotes the thickness of the lens unit having the largest positive refractive power from among the thicknesses of lens units positioned on the object side of the focusing lens unit.

Conditional expression (7) is a conditional expression related to a ratio of the thickness on the optical axis of the two lens units. One is the thickness of the predetermined positive lens unit and the other is the thickness of the predetermined negative lens unit. The predetermined positive lens unit is a lens unit having the largest positive refractive power from among the lens units positioned on the object side of the focusing lens unit. The predetermined negative lens unit is a lens unit having the largest negative refractive power from among the lens units positioned on the object side of the focusing lens unit.

When the lens units are arranged in order of the lens unit having a negative refractive power and the lens unit having a positive refractive power, from the object side, a light ray is diverged at the lens unit having the negative refractive power. In this case, the lens unit having a positive refractive power is sought to correct an aberration at a position at which the height of a light ray is high. Particularly, since a diameter of a light beam becomes large for an axial light beam, the lens unit having a positive refractive power is sought to correct the spherical aberration. Conditional expression (7) is a conditional expression for correcting the spherical aberration favorably while suppressing an increase in the overall length of the optical system.

By exceeding a lower limit value of conditional expression (7), it is possible to shorten the overall length of the optical system. By falling below an upper limit value of conditional expression (7), it is possible to carry out the correction of the spherical aberration favorably.

It is preferable that the following conditional expression (7') be satisfied instead of conditional expression (7)

$$0.15 < d_{ng}/d_{pg} < 0.5 \quad (7')$$

Furthermore, it is more favorable that the following conditional expression (7") be satisfied instead of conditional expression (7).

$$0.17 < d_{ng}/d_{pg} < 0.35 \quad (7'')$$

Moreover, in the zoom image pickup apparatus according to the present embodiment, it is preferable that the following conditional expression (8) be satisfied:

$$1 < \phi_{fc}/\phi_{L1} < 3 \quad (8)$$

where, each of $\phi_{fc}$ and $\phi_{L1}$ is an effective diameter at the wide angle end when focused to the first object, and $\phi_{fc}$ denotes an effective diameter of a lens surface positioned nearest to object of the focusing lens unit, $\phi_{L1}$ denotes an effective diameter of a lens surface positioned nearest to object of the zoom lens, the first object is an object when an object-point distance is 1000 mm, where the object-point distance is the distance from the lens surface positioned nearest to object of the zoom lens, up to the object, and the effective diameter is the maximum diameter of a range on a target lens surface, through which a light ray contributing to image formation passes.

Conditional expression (8) is a conditional expression related to a ratio of two effective diameters. One is the effective diameter of the lens surface positioned nearest to object in the focusing lens unit and the other is the effective diameter of the lens surface positioned nearest to object in the zoom lens. It is preferable to set the effective diameter of the zoom lens for achieve both of guiding an optical path of an exit pupil to the image pickup element without vignetting or with small vignetting, and small-sizing.

By exceeding a lower limit value of conditional expression (8), it is possible to prevent the lens unit positioned nearest to object from becoming large-sized. In such manner, exceeding the lower limit value of conditional expression (8) is advantageous for small-sizing of the optical system. As a result, it is possible to carryout the correction of the spherical aberration favorably while achieving the small-sizing of the optical system.

By falling below an upper limit value of conditional expression (8), it is possible to carry out the correction of the spherical aberration and coma in the focusing lens unit while preventing the focusing lens unit from becoming large-sized.

It is preferable that the following conditional expression (8') be satisfied instead of conditional expression (8).

$$1 < \phi_{fc}/\phi_{L1} < 2.5 \tag{8'}$$

Furthermore, it is more preferable that the following conditional expression (8") be satisfied instead of conditional expression (8).

$$1.1 < \phi_{fc}/\phi_{L1} < 2 \tag{8''}$$

Moreover, in the zoom image pick apparatus according to the present embodiment, it is preferable that the following conditional expression (9) be satisfied:

$$-6 < f_{ng}/f_{pg} < -0.5 \tag{9}$$

where, $f_{ng}$ denotes a focal length of a lens having the largest negative refractive power from among focal lengths of lens units positioned on the object side of the focusing lens unit, and $f_{pg}$ denotes a focal length of a lens having the largest positive refractive power from among focal lengths of lens units positioned on the object side of the focusing lens unit.

Conditional expression (9) is a conditional expression related to a ratio of the focal lengths of the two lens units. One is the focal length of the predetermined negative lens unit and the other is the focal length of the predetermined positive lens unit. The predetermined negative lens unit is the lens unit having the largest negative refractive power from among the lens units positioned on the object side of the focusing lens unit. The predetermined positive lens unit is the lens unit having the largest positive refractive power from among the lens unit positioned on the object side of the focusing lens unit.

By satisfying conditional expression (9), it is possible to balance the refractive power of the predetermined negative lens unit and the refractive power of the predetermined positive lens unit. In this case, since it is possible to set Petzval sum favorably, it is possible to correct the astigmatism favorably. Accordingly, it is possible to maintain a favorable optical performance.

It is preferable that the following conditional expression (9') be instead of conditional expression (9).

$$-5 < f_{ng}/f_{pg} < -0.9 \tag{9'}$$

Furthermore, it is more preferable that the following conditional expression (9") be satisfied instead of conditional expression (9).

$$-3 < f_{ng}/f_{pg} < -1.1 \tag{9''}$$

Moreover, in the zoom image pickup apparatus according to the present embodiment, it is preferable that the following conditional expression (10) be satisfied:

$$-4 < f_{ng}/f_{Lt} < -0.2 \tag{10}$$

where, $f_{ng}$ denotes the focal length of the lens unit having the largest negative refractive power from among focal lengths of lens units positioned on the object side of the focusing lens unit, and $f_{Lt}$ denotes the focal length at the telephoto end of the zoom lens when focused to the first object, the first object is an object when the object-point distance is 1000 mm, and the object-point distance is a distance from a lens surface positioned nearest to object of the zoom lens, up to an object.

Conditional expression (10) is a conditional expression related to a ratio of the focal lengths of the two lens units. One is the focal length of the lens unit having the largest negative refractive power from among the focal lengths of the lens units positioned on the object side of the focusing lens unit, and the other is the focal length at the telephoto end of the zoom lens when focused to the first object.

By exceeding a lower limit value of conditional expression (10), since it is possible to set Petzval sum favorably, it is possible to correct the astigmatism favorably. Accordingly, it is possible to maintain a favorable optical performance.

By falling below an upper limit value of conditional expression (10), it is possible to make small an amount of movement of the predetermined negative lens unit. Falling below the upper limit value of conditional expression (10) is effective for shortening the overall length of the optical system.

It is preferable that the following conditional expression (10') be satisfied instead of conditional expression (10).

$$-3 < f_{ng}/f_{Lt} < -0.25 \tag{10'}$$

Furthermore, it is more preferable that the following conditional expression (10") be satisfied instead of conditional expression (10).

$$-1.7 < f_{ng}/f_{Lt} < -0.3 \tag{10''}$$

Moreover, in the zoom image pickup apparatus according to the present embodiment, it is preferable that only the focusing lens unit move at the time of focusing, and the following conditional expression (11) be satisfied:

$$0.7 < |\beta_{ctt}|/|\beta_{ctw}| < 2 \tag{11}$$

where, $\beta_{ctt} = (1 - \oplus_{fct} \times \beta_{fct}) \times \beta_t' \times \beta_t'$, $\beta_{ctw} = (1 - \beta_{fcw} \times \beta_{fcw}) \times \beta_w' \times \beta_w'$, here, each of $\beta_{fct}$ and $\beta_t'$ is a lateral magnification at the telephoto end when focused to the first object, and $\beta_{fct}$ denotes a lateral magnification of the focusing lens unit and $\beta_t'$ denotes a lateral magnification of a lens unit positioned on the image side of the focusing lens unit, each of $\beta_{fcw}$ and $\beta_w'$ is a lateral magnification at the wide angle end when focused to the first object, and $\beta_{fcw}$ denotes a lateral magnification of the focusing lens unit and $\beta_t'$ denotes a lateral magnification of a lens unit positioned on the image side of the focusing lens unit, the first object is an object when the object-point distance is 1000 mm, and the object-point distance is a distance from a lens surface positioned nearest to object of the zoom lens, up to an object.

Conditional expression (11) is a conditional expression related to a ratio of the focusing sensitivity at the telephoto end and the focusing sensitivity at the wide angle end. As mentioned above, the focusing sensitivity is the amount indicating the amount of movement of the image plane with respect to the amount of movement of the focusing lens unit.

When conditional expression (11) is satisfied, a fluctuation in the focusing sensitivity at both of the telephoto end and the wide angle end is suppressed. In such manner, since the variation in the focusing sensitivity being small, it becomes easy to control the movement of the focusing lens unit.

It is preferable that the following conditional expression (11') be satisfied instead of conditional expression (11).

$$0.9 < |\beta_{ctt}|/|\beta_{ctw}| < 1.5 \quad (11')$$

Furthermore, it is more preferable that the following conditional expression (11") be satisfied instead of conditional expression (11).

$$0.9 < |\beta_{ctt}|/|\beta_{ctw}| < 1.2 \quad (11'')$$

Moreover, in the zoom image pickup apparatus according to the present embodiment, it is preferable that the following conditional expression (12) be satisfied:

$$0.03 < \phi_{L1}/f_{Lt} < 0.2 \quad (12)$$

where, $\phi_{L1}$ is an effective diameter of a lens surface positioned nearest to object of the zoom lens, and denotes an effective diameter at the wide angle end when focused to the first object, $f_{Lt}$ denotes the focal length at the telephoto end of the zoom lens when focused to the first object, the first object is an object when an object-point distance is 1000 mm, where the object-point distance is the distance from the lens surface positioned nearest to object of the zoom lens, up to the object, and the effective diameter is the maximum diameter of a range on a target lens surface, through which a light ray contributing to image formation passes.

Conditional expression (12) is a conditional expression in which a ratio of the effective diameter of the lens surface positioned nearest to the object of the zoom lens and the focal length of the zoom lens at the telephoto end when focused to the first object is taken. The effective diameter of a lens is the maximum diameter of a range through which a light contributing to image formation at the wide angle end when focused to the first object passes, or in other words, is a diameter regulated by a marginal ray.

When conditional expression (12) is satisfied, since it is possible to make small the effective diameter of the lens surface positioned nearest to object of the zoom lens, it is possible to achieve small-sizing of the optical system.

It is preferable that the following conditional expression (12') be satisfied instead of conditional expression (12).

$$0.04 < \phi_{L1}/f_{1t} < 0.18 \quad (12')$$

Furthermore, it is more preferable that the following conditional expression (12") be satisfied instead of conditional expression (12).

$$0.05 < \phi_{L1}/f_{1t} < 0.15 \quad (12'')$$

Moreover, in the zoom image pickup apparatus according to the present embodiment, it is preferable that the focusing lens unit have a negative refractive power, and the plurality of lens units include at least one lens unit having a negative refractive power.

By making such arrangement, it is possible to use the lens unit having a negative refractive power, for zooming. By moving the lens unit having a negative refractive power, it is possible to make large the zooming ratio easily. Moreover, it is possible to achieve small-sizing of the optical system.

Moreover, in the zoom image pickup apparatus according to the present embodiment, it is preferable that a rearmost lens unit be disposed nearest to image, and the rearmost lens unit include a positive lens which is disposed nearest to object, and a negative lens which is disposed nearest to image.

The rearmost lens unit is a lens unit disposed nearest to image in the zoom lens. In the rearmost lens unit, by disposing the lenses in order of the positive lens and the negative lens from the object side, it is possible to diverge by the negative lens a light ray that was converged by the positive lens. As a result of this, it is possible to make gentle an angle of a light ray passing through the rearmost lens unit, with respect to the optical axis. Therefore, it is possible to suppress an occurrence of an off-axis aberration in particular.

Moreover, in the zoom image pickup apparatus according to the present embodiment, it is preferable that the focusing lens unit be a wobbling lens unit which undergo a wobbling operation along an optical axis by a small amount of movement with respect to an amount of movement at the time of focusing.

In an optical instrument, it is necessary to maintain a focused state according to an object distance by making the autofocus function work all the time. As a method for maintaining the focused state, a contrast AF (autofocus) method (so-called mountain-climbing method or hill-climbing method) is available.

In the contrast AF method, for maintaining the focused state, the wobbling operation is performed. In the wobbling operation, a variation in contrast is measured all the time. Moreover, in a case in which a judgment has been made that the focused state has changed, an operation is carried out to refocus by moving the focusing lens unit appropriately. By letting the focusing lens unit to be the wobbling lens unit, it is possible to realize autofocusing.

Moreover, in the zoom image pickup apparatus according to the present embodiment, it is preferable that an overall length of the zoom lens be fixed.

When an overall length of the optical system changes at the time of focusing, the whole of the zoom image pickup apparatus becomes large. Therefore, by letting the overall length of the zoom lens to be fixed, it is possible to prevent the zoom image pickup apparatus from becoming large-sized, and also the manufacturing becomes easy.

Moreover, in the zoom image pickup apparatus according to the present embodiment, it is preferable that the following conditional expression (13) be satisfied:

$$-5 < (r_{fcff} + r_{fcfb})/(r_{fcff} - r_{fcfb}) < 5 \quad (13)$$

where, $r_{fcff}$ denotes a radius of curvature of an object-side lens surface of a lens positioned nearest to object in the focusing lens unit, and $r_{fcfb}$ denotes a radius of curvature of an image-side lens surface of a lens positioned nearest to image in the focusing lens unit.

Conditional expression (13) is a conditional expression related to a shape of the focusing lens unit. When conditional expression (13) is satisfied, the shape of the focusing lens unit becomes a shape suitable for correcting the spherical aberration. Therefore, it is possible to suppress a fluctuation in the spherical aberration at the time of focusing.

Moreover, it is preferable that the following conditional expression (13') be satisfied instead of conditional expression (13).

$$-4 < (r_{fcff} + r_{fcfb})/(r_{fcff} - r_{fcfb}) < 4 \quad (13')$$

Furthermore, it is more preferable that the following conditional expression (13") be satisfied instead of conditional expression (13).

$$-3 < (r_{fcff} + r_{fcfb})/(r_{fcff} - r_{fcfb}) < 2 \quad (13'')$$

Moreover, in the zoom image pickup apparatus according to the present embodiment, it is preferable that the following conditional expression (14) be satisfied:

$$-5 < (r_{1f} + r_{1b})/(r_{1f} - r_{1b}) < 5 \quad (14)$$

where, $r_{1f}$ denotes a radius of curvature of an object-side lens surface of a lens positioned nearest to image, and $r_{1b}$ denotes a radius of curvature of an image-side lens surface of a lens positioned nearest to image.

Conditional expression (14) is a conditional expression related to a shape of a lens positioned nearest to image.

By exceeding a lower limit value of conditional expression (14), it is possible to correct the astigmatism favorably. As a result of this, it is possible to maintain a favorable optical performance. By falling below an upper limit value of conditional expression (14), it is possible to correct the spherical aberration favorably. As a result of this, it is possible maintain a favorable optical performance.

Moreover, it is preferable that the following conditional expression (14') be satisfied instead of conditional expression (14).

$$-3 < (r_{1f} + r_{1b})/(r_{1f} - r_{1b}) < 3 \quad (14')$$

Furthermore, it is more preferable that the following conditional expression (14") be satisfied instead of conditional expression (14).

$$-2 < (r_{1f} + r_{1b})/(r_1 - r_{1b}) < 2 \quad (14'')$$

Moreover, a zoom image pickup apparatus according to the present embodiment includes a mount portion, a zoom lens which forms an image of light incident from the mount portion; and an image pickup element which is disposed at an image forming position, wherein the zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the fourth lens unit is a focusing lens unit, and at a time of zooming from a wide angle end to a telephoto end, only the second lens unit and the fourth lens unit move, and the first lens unit, the third lens unit, and the fifth lens unit are fixed.

In the zoom image pickup apparatus according to the present embodiment, the zoom lens includes in order from the object side the first lens unit having a positive refractive power, the second lens unit having a negative refractive power, the third lens unit having a positive refractive power, the fourth lens unit having a negative refractive power, and the fifth lens unit having a positive refractive power (hereinafter, referred to as a 'first arrangement')

Moreover, a zoom image pickup apparatus according to the present embodiment includes amount portion, a zoom lens which forms an image of light incident from the mount portion, and an image pickup element which is disposed at an image forming position, wherein the zoom lens includes in order form an object side, a first lens unit, a second lens unit having a negative refractive power, a third lens unit having a positive refractive power, a fourth lens unit having a negative refractive power, and a fifth lens unit having a positive refractive power, and the fourth lens unit is a focusing lens unit, and at the time of zooming from a wide angle end to a telephoto end, only the second lens unit and the third lens unit move, and the first lens unit, the fourth lens unit, and the fifth lens unit are fixed.

In the zoom image pickup apparatus according to the present embodiment, the zoom lens includes in order from the object side, the first lens unit, the second lens unit having a negative refractive power, the third lens unit having a positive refractive power, the fourth lens unit having a negative refractive power, and the fifth lens unit having a positive refractive power (hereinafter, referred to as a 'second arrangement').

Moreover, a zoom image pickup apparatus according to the embodiment includes a mount portion, a zoom lens which forms an image of light incident from the mount portion, and an image pickup element which is disposed at an image forming position, wherein the zoom lens includes in order from an object side, a first lens unit having a negative refractive power, a second lens unit having a positive refractive power, a third lens unit having a negative refractive power, and a fourth lens unit having a positive refractive power, and the third lens unit is a focusing lens unit, and at a time of zooming from a wide angle end to a telephoto end, only the first lens unit and the second lens unit move and the third lens unit and the fourth lens unit are fixed.

In the zoom image pickup apparatus according to the present embodiment, the zoom lens includes in order from the object side, the first lens unit having a negative refractive power, the second lens unit having a positive refractive power, the third lens unit having a negative refractive power, and the fourth lens unit having a positive refractive power (hereinafter, referred to as a 'third arrangement').

Each of the zoom lens having the first arrangement, the zoom lens having the second arrangement, and the zoom lens having the third arrangement can be used as an image pickup optical system for endoscope. When an image pickup optical system for endoscope is combined with an endoscope optical system, an entrance-pupil position is restricted. Generally, an image pickup optical system for endoscope does not have an aperture stop. Therefore, an aperture of an image-forming light beam is determined by an exit-pupil diameter. An eye-point of an endoscope optical system is a position where generally, there is no problem for visual observation, such as a position few mm away from an eyepiece end surface.

Therefore, the fourth lens unit is let to be the focusing lens unit in the first arrangement and the second arrangement, and the third lens unit is let to be the focusing lens unit in the third arrangement. When such an arrangement is made, since it is possible to keep the position of the focusing lens unit away from the entrance-pupil position, it is possible to make small an angle made by a light ray incident on the focusing lens unit with the optical axis. As a result of this, it is possible to suppress an increase in the amount of variation Δy at the time of movement of the focusing lens unit.

Furthermore, since the refractive power of the focusing lens unit is a negative refractive power, it is possible to make the focusing sensitivity high. As a result of this, it is possible to suppress an increase in the amount of movement of the focusing lens unit at the time of focusing.

Moreover, in the first arrangement and the second arrangement, the fifth lens unit having a positive refractive power is disposed on the image side of the focusing lens unit (fourth lens unit), and in the third arrangement, the fourth lens unit having a positive refractive power is disposed on the image side of the focusing lens unit (third lens unit). In any of the cases, the lens unit having a positive refractive power is disposed next to a lens unit (focusing lens unit) having a negative refractive power. Therefore, it is possible to suppress a fluctuation in an angle of view at the time of focusing.

Moreover, at the time of zooming from the wide angle end to the telephoto end, movement of lens units in each arrangement is as described below. In the first arrangement, only the second lens unit and the fourth lens unit move, and the first lens unit, the third lens unit, and the fifth lens unit are fixed. In the second arrangement, only the second lens unit and the third lens unit move, and the first lens unit, the fourth lens unit, and the fifth lens unit are fixed. In the third arrangement, only the first lens unit and the second lens unit move, and the third lens unit and the fourth lens unit are fixed.

In the first arrangement and the second arrangement, since a substantial zooming effect emanates by the second lens unit and the third lens unit, the second lens unit and the third lens unit become the main variator. In the third arrangement, since a substantial zooming effect emanates by the first lens unit and the second lens unit, the first lens unit and the second lens unit become the main variator.

Here, when the focusing lens unit is positioned on the object side of the main variator, an amount of variation in the image height and an amount of variation in the image position due to the movement of the focusing lens unit vary substantially according to the movement of the main variator. In such manner, the variation in the image height and the variation in the image position due to the movement of the focusing lens unit are affected substantially by the movement of the main variator.

For this reason, in the first arrangement and the second arrangement, the fourth lens unit is let to be the focusing lens unit. Moreover, in the third arrangement, the third lens unit is let to be the focusing lens unit. Accordingly, the focusing lens unit is disposed next to the main variator. Therefore, since an effect of the main variator can be ignored, the focusing sensitivity ceases to vary substantially. Moreover, since the variation in the focusing sensitivity is small, it becomes easy to control the movement of the focusing lens unit.

Moreover, in the first arrangement, it is possible to make small a lens diameter in the second lens unit and the fourth lens unit. Consequently, by moving the second lens unit and the fourth lens unit, it is possible to make an optical system small-sized. Moreover, by letting the number of lens units that move at the time of focusing to be two, it is possible to make a mechanical arrangement and a control of movement of lens units comparatively simple.

Moreover, a zoom image pickup apparatus according to the present embodiment includes a mount portion, a zoom lens which forms an image of light incident from the mount portion, and an image pickup element which is disposed at an image forming position, wherein the zoom lens includes a plurality of lens units, and a focusing lens unit, and the following conditional expressions (1) and (15) be satisfied:

$$1.5 < f_{Lt}/f_{Lw} \qquad (1), \text{ and}$$

$$|(y_{w7d'} - y_{w7d})/P|/(1/N) < 192 \qquad (15)$$

where, a side of the mount portion is let to be an object side and a side of the image pickup element is let to be an image side, each of $f_{Lt}$ and $f_{Lw}$ is a focal length of the zoom lens when focused to a first object, and $f_{Lt}$ denotes a focal length at a telephoto end and $f_{Lw}$ denotes a focal length at a wide angle end, each of $y_{w7d}$ and $y_{w7d'}$ is a height of a first predetermined light ray at a position at which the first predetermined light ray intersects an image plane, and $y_{w7d}$ denotes a light-ray height when focused to the first object and $y_{w7d'}$ denotes a light-ray height in a defocused state, the defocused state is a state in which the focusing lens unit is moved by $\Delta_{s2}$ when focused to the first object, and $\Delta_{s2} = 10 \times P$, $$0.0008 < P < 0.005, 0.05 < 1/N < 1,$$

where,

N denotes the number of pixels (unit millions of pixels) of the image pickup element, P denotes a pixel pitch (unit mm) of the image pickup element, the first predetermined light ray is a light ray with an angle of view of 7 degrees at the wide angle end, which passes through a center of a lens surface nearest to object of the zoom lens, the first object is an object when an object-point distance is 1000 mm, and the object-point distance is a distance from a lens surface positioned nearest to object of the zoom lens, up to an object.

Since a technical significance of conditional expression (1) has already been described, description thereof is omitted here.

Conditional expression (15) indicates as to how much the variation in the image height is prominent on the image pickup element when the focusing lens unit has fluctuated minutely. Since the amount of variation in the image height is divided by the pixel pitch, finer the pixel pitch, more prominent is the variation in image height. Moreover, when a sensor size is same, larger the total number of pixels, finer is the pixel pitch. Therefore, conditional expression (15) reflects the fact that larger the number of pixels, more prominent is the variation in the image height.

By satisfying conditional expressions (1) and (15), it is possible to change the size of the image freely, and when the autofocusing is carried out for an image of a desired height, it is possible to carry out autofocusing in which an increase in the amount of variation Δy is suppressed.

It is preferable that the following conditional expression (15') be satisfied instead of conditional expression (15).

$$|(y_{w7d'} - y_{w7d})/P|/(1/N) < 190 \qquad (15')$$

Furthermore, it is more preferable that the following conditional expression (15″) be satisfied instead of conditional expression (15).

$$|(y_{w7d'}-y_{w7d})/P|/(1/N)<188 \quad (15'')$$

Examples of zoom lenses to be used in the zoom image pickup apparatus according to the present invention will be described below in detail by referring to the accompanying diagrams. However, the present invention is not restricted to the examples described below. Moreover, as to whether the refractive power is positive or negative, is based on a paraxial radius of curvature.

Moreover, a zoom lens in each of the following examples is to be connected to an eyepiece portion. Generally, since an aperture stop is disposed on an optical system of an optical instrument side, the aperture stop is not to be provided to the zoom lens side. However, for designing a zoom lens, an aperture stop is necessary. A virtual stop in the following description of examples is an aperture stop provided for designing. Therefore, in the actual zoom lens, the aperture stop does not exist physically. However, sometimes a stop (such as a flare aperture) for shielding unnecessary light rays is disposed at a position of the virtual stop.

Moreover, a position of a first object is a position when an object-point distance is 1000 mm. Furthermore, a position of a second object is a position when the object-point distance is 333.33 mm, and at the position of the second object, object is nearest to the zoom lens.

Cross-sectional views of each example will be described below. Cross-sectional views are lens cross-sectional views along an optical axis showing an optical arrangement when focused to the first object. In the cross-sectional views, F indicates a filter, CG indicates a cover glass, and I indicates an image pickup surface (image plane) of an image pickup element. For instance, in a case of a type using three image pickup elements (three-plate type), CG indicates a color separation prism and not a cover glass.

FIG. 3A, FIG. 5A, FIG. 7A, FIG. 9A, FIG. 11A, FIG. 13A, FIG. 15A, FIG. 17A, FIG. 19A, FIG. 21A, FIG. 23A, FIG. 25A, FIG. 27A, and FIG. 29A show cross-sectional views at a wide angle end.

FIG. 3B, FIG. 5B, FIG. 7B, FIG. 9B, FIG. 11B, FIG. 13B, FIG. 15B, FIG. 17B, FIG. 19B, FIG. 21B, FIG. 23B, FIG. 25B, FIG. 27B, and FIG. 29B show cross-sectional views in an intermediate focal length state.

FIG. 3C, FIG. 5C, FIG. 7C, FIG. 9C, FIG. 11C, FIG. 13C, FIG. 15C, FIG. 17C, FIG. 19C, FIG. 21C, FIG. 23C, FIG. 25C, FIG. 27C, and FIG. 29C show cross-sectional views at a telephoto end.

Aberration diagrams for each example will be described below. Aberration diagrams are aberration diagrams at the time of focusing to a first object.

FIG. 4A, FIG. 6A, FIG. 8A, FIG. 10A, FIG. 12A, FIG. 14A, FIG. 16A, FIG. 18A, FIG. 20A, FIG. 22A, FIG. 24A, FIG. 26A, FIG. 28A, and FIG. 30A show a spherical aberration (SA) at the wide angle end;

FIG. 4B, FIG. 6B, FIG. 8B, FIG. 10B, FIG. 12B, FIG. 14B. FIG. 16B, FIG. 18B, FIG. 20B, FIG. 22B, FIG. 24B, FIG. 26B, FIG. 28B, and FIG. 30B show an astigmatism (AS) at the wide angle end.

FIG. 4C, FIG. 6C, FIG. 8C, FIG. 10C, FIG. 12C, FIG. 14C, FIG. 16C, FIG. 18C, FIG. 20C, FIG. 22C, FIG. 24C, FIG. 26C, FIG. 28C, and FIG. 30C show a distortion (DT) at the wide angle end.

FIG. 4D, FIG. 6D, FIG. 8D, FIG. 10D, FIG. 12D, FIG. 14D, FIG. 16D, FIG. 18D, FIG. 20D, FIG. 22D, FIG. 24D, FIG. 26D, FIG. 28D, and FIG. 30D show a chromatic aberration of magnification (CC) at the wide angle end.

FIG. 4E, FIG. 6E, FIG. 8E, FIG. 10E, FIG. 12E, FIG. 14E, FIG. 16E, FIG. 18E, FIG. 20E, FIG. 22E, FIG. 24E, FIG. 26E, FIG. 28E, and FIG. 30S show a spherical aberration (SA) in the intermediate focal length state.

FIG. 4F, FIG. 6F, FIG. 8F, FIG. 10F, FIG. 12F, FIG. 14F, FIG. 16F, FIG. 18F, FIG. 20F, FIG. 22F, FIG. 24F, FIG. 26F, FIG. 28F, and FIG. 30F show an astigmatism (AS) in the intermediate focal length state.

FIG. 4G, FIG. 6G, FIG. 8G, FIG. 10G, FIG. 12G, FIG. 14G, FIG. 16G, FIG. 18G, FIG. 20G, FIG. 22G, FIG. 24G, FIG. 26G, FIG. 28G, and FIG. 30G show a distortion (DT) in the intermediate focal length state.

FIG. 4H, FIG. 6H, FIG. 8H, FIG. 10H, FIG. 12H, FIG. 14H, FIG. 16H, FIG. 18H, FIG. 20H, FIG. 22H, FIG. 24H, FIG. 26G, FIG. 28G, and FIG. 30G show a chromatic aberration of magnification (CC) in the intermediate focal length state.

FIG. 4I, FIG. 6I, FIG. 8I, FIG. 10I, FIG. 12I, FIG. 14I, FIG. 16I, FIG. 18I, FIG. 20I, FIG. 22I, FIG. 24I, FIG. 26I, FIG. 28I, and FIG. 30I show a spherical aberration (SA) at the telephoto end.

FIG. 4J, FIG. 6J, FIG. 8J, FIG. 10J, FIG. 12J, FIG. 14J, FIG. 16J, FIG. 18J, FIG. 20J, FIG. 22J, FIG. 24J, FIG. 26J, FIG. 28J, and FIG. 30J show an astigmatism (AS) at the telephoto end.

FIG. 4K, FIG. 6K, FIG. 8K, FIG. 10K, FIG. 12K, FIG. 14K, FIG. 16K, FIG. 18K, FIG. 20K, FIG. 22K, FIG. 24K, FIG. 26K, FIG. 28K, and FIG. 30K show a distortion (DT) at the telephoto end.

FIG. 4L, FIG. 6L, FIG. 8L, FIG. 10L, FIG. 12L, FIG. 14L, FIG. 16L, FIG. 18L, FIG. 20L, FIG. 22L, FIG. 24L, FIG. 26L, FIG. 28L, and FIG. 30L show a chromatic aberration of magnification (CC) at the telephoto end.

A zoom lens according to an example 1 will be described below.

A zoom lens according to the example 1 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented. A virtual stop is set to be positioned on an image-side surface of the negative meniscus lens L3.

The second lens unit G2 includes a positive meniscus lens L4 having a convex surface directed toward the image side and a biconcave negative lens L5. Here, the positive meniscus lens L4 and the biconcave negative lens L5 are cemented.

The third lens unit G3 includes a biconvex positive lens L6, a biconvex positive lens L7, and a biconcave negative lens L8. Here, the biconvex positive lens L7 and the biconcave negative lens L8 are cemented.

The fourth lens unit G4 includes a biconcave negative lens L9.

The fifth lens unit G5 includes a biconvex positive lens L10 and a negative meniscus lens L11 having a convex surface directed toward the image side. Here, the biconvex positive lens L10 and the negative meniscus lens L11 are cemented.

At the time of zooming from a wide angle end to a telephoto end, the first lens unit G1 is fixed, the second lens unit G2 moves toward the image side, the lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the biconcave negative lens L9 moves toward the image side.

Next, a zoom lens according to an example 2 will be described below.

The zoom lens according to the example 2 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G4 having a positive refractive power.

The first lens unit G1 includes a negative meniscus lens L1 having a convex surface directed toward an image side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a positive meniscus lens L6 having a convex surface directed toward the image side, a biconvex positive lens L7, a negative meniscus lens L8 having a convex surface directed toward the image side, a negative meniscus lens L9 having a convex surface directed toward the object side, and a positive meniscus lens L10 having a convex surface directed toward the object side. Here, the biconvex positive lens L7 and the negative meniscus lens L8 are cemented. Moreover, the negative meniscus lens L9 and the positive meniscus lens L10 are cemented.

The fourth lens unit G4 includes a negative meniscus lens L11 having a convex surface directed toward the image side and a biconcave negative lens L12. Here, the negative meniscus lens L11 and the biconcave negative lens L12 are cemented.

The fifth lens unit G5 includes a biconvex positive lens L13 and a biconcave negative lens L14.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the negative meniscus lens L11 and the biconcave negative lens L12 move toward the image side.

Next, a zoom lens according to an example 3 will be described below.

The zoom lens according to the example 3 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a biconcave negative lens L8, a negative meniscus lens L9 having a convex surface directed toward the object side, and a biconvex positive lens L10. Here, the biconvex positive lens L7 and the biconcave negative lens L8 are cemented. Moreover, the negative meniscus lens L9 and the biconvex positive lens L10 are cemented.

The fourth lens unit G4 includes a biconcave negative lens L11.

The fifth lens unit G5 includes a biconvex positive lens L12, a biconvex positive lens L13, a negative meniscus lens L14 having a convex surface directed toward the image side, a positive meniscus lens L15 having a convex surface directed toward the image side, and a biconcave negative lens L16. Here, the biconvex positive lens L13 and the negative meniscus lens L14 are cemented.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed. A position of the fourth lens unit G4 is same in an intermediate focal length state and at the telephoto end.

Moreover, focusing to an object is carried out by a movement of the fourth lens unit G4. At the time of focusing from a first object to a second object, the biconcave negative lens L11 moves toward the image side.

Next, a zoom lens according to an example 4 will be described below.

The zoom lens according to the example 4 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a biconvex positive lens L1 and a biconcave negative lens L2. Here, the biconvex positive lens L1 and the biconcave negative lens L2 are cemented. A virtual stop is set to be positioned on an image-side surface of the biconcave negative lens L2.

The second lens unit G2 includes a biconcave negative lens L3 and a positive meniscus lens L4 having a convex surface directed toward the object side. Here, the biconcave negative lens L3 and the positive meniscus lens L4 are cemented.

The third lens unit G3 includes a biconvex positive lens L5, a negative meniscus lens L6 having a convex surface directed toward the object side, and a biconvex positive lens L7. Here, the negative meniscus lens L6 and the biconvex positive lens L7 are cemented.

The fourth lens unit G4 includes a negative meniscus lens L8 having a convex surface directed toward the object side.

The fifth lens unit G5 includes a biconvex positive lens L9, a biconvex positive lens L10, and a biconcave negative lens L11. Here, the biconvex positive lens L10 and the biconcave negative lens L11 are cemented.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the negative meniscus lens L8 moves toward the image side.

An aspheric surface is provided to a total of two surfaces namely, both surfaces of the biconvex positive lens L5.

Next, a zoom lens according to an example 5 will be described below.

The zoom lens according to the example 5 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented. A virtual stop is set to be positioned on an image-side surface of the negative meniscus lens L3.

The second lens unit G4 includes a biconcave negative lens L4 and a positive meniscus lens L5 having a convex surface directed toward the object side. Here, the biconcave negative lens L4 and the positive meniscus lens L5 are cemented.

The third lens unit G3 includes a positive meniscus lens L6 having a convex surface directed toward the image side, a biconvex positive lens L7, a negative meniscus lens L8 having a convex surface directed toward the image side, a negative meniscus lens L9 having a convex surface directed toward the object side, and a biconvex positive lens L10. Here, the biconvex positive lens L7 and the negative meniscus lens L8 are cemented. Moreover, the negative meniscus lens L9 and the biconvex positive lens L10 are cemented.

The fourth lens unit G4 includes a negative meniscus lens L11 having a convex surface directed toward the image side and a biconcave negative lens L12.

The fifth lens unit G5 includes a biconvex positive lens L13 and a negative meniscus lens L14 having a convex surface directed toward the image side.

At the time of zooming from a wide angle end to a telephoto end the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the negative meniscus lens L11 and the biconcave negative lens L12 move toward the image side.

Next, a zoom lens according to an example 6 will be described below.

The zoom lens according to the example 6 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a negative meniscus lens L8 having a convex surface directed toward the image side, a negative meniscus lens L9 having a convex surface directed toward the object side, and a positive meniscus lens L10 having a convex surface directed toward the object side. Here, the biconvex positive lens L7 and the negative meniscus lens L8 are cemented. Moreover, the negative meniscus lens L9 and the positive meniscus lens L10 are cemented.

The fourth lens unit G4 includes a biconcave negative lens L11.

The fifth lens unit G5 includes a biconvex positive lens L12, a biconvex positive lens L13, a negative meniscus lens L14 having a convex surface directed toward the image side, a negative meniscus lens L15 having a convex surface directed toward the image side, and a negative meniscus lens L16 having a convex surface directed toward the object side.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the biconcave negative lens L11 moves toward the image side.

Next, a zoom lens according to an example 7 will be described below.

The zoom lens according to the example 7 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented. A virtual stop is set to be positioned on an image-side surface of the negative meniscus lens L3.

The second lens unit G2 includes a positive meniscus lens L4 having a convex surface directed toward the image side and a biconcave negative lens L5. Here, the positive meniscus lens L4 and the biconcave negative lens L5 are cemented.

The third lens unit G3 includes a biconvex positive lens L6, a biconvex positive lens L7, and a biconcave negative lens L8. Here, the biconvex positive lens L7 and the biconcave negative lens L8 are cemented.

The fourth lens unit G4 includes a biconcave negative lens L9.

The fifth lens unit G5 includes a biconvex positive lens L10 and a negative meniscus lens L11 having a convex surface directed toward the image side. Here, the biconvex positive lens L10 and the negative meniscus lens L11 are cemented.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the biconcave negative lens L9 moves toward the image side.

Next, a zoom lens according to an example 8 will be described below.

The zoom lens according to the example 8 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a negative meniscus lens L8 having a convex surface directed toward the image side, a negative meniscus lens L9 having a convex surface directed toward the object side, and a biconvex positive lens L10. Here, the biconvex positive lens L7 and the negative meniscus lens L8 are cemented. Moreover, the negative meniscus lens L9 and the biconvex positive lens L10 are cemented.

The fourth lens unit G4 includes a biconcave negative lens L11.

The fifth lens unit G5 includes a biconvex positive lens L12, a biconvex positive lens L13, a negative meniscus lens L14 having a convex surface directed toward the image side, a positive meniscus lens L15 having a convex surface directed toward the image side, and a biconcave negative lens L16.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing is carried out by a movement of the fourth lens unit G4. At the time focusing from a first object to a second object, the biconcave negative lens L11 moves toward the image side.

Next, a zoom lens according to an example 9 will be described below.

The zoom lens according to the example 9 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a positive meniscus lens l2 having a convex surface directed toward the object side, and a biconvex positive lens L3. Here, the positive meniscus lens L2 and the biconvex positive lens L3 are cemented. A virtual stop is set to be positioned on an image-side surface of the biconvex positive lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a biconcave negative lens L8, a negative meniscus lens L9 having a convex surface directed toward the object side, and a positive meniscus lens L10 having a convex directed toward the object side. Here, the biconvex positive lens L7 and the biconcave negative lens L8 are cemented. Moreover, the negative meniscus lens L9 and the positive meniscus lens L10 are cemented.

The fourth lens unit G4 includes a biconcave negative lens L11.

The fifth lens unit G5 includes a biconvex positive lens L12, a negative meniscus lens L13 having a convex surface directed toward the image side, and a negative meniscus lens L14 having a convex surface directed toward the image side. Here, the biconvex positive lens L12 and the negative meniscus lens L13 are cemented.

At the time of zooming from a wide angle end to a telephoto end, the first lens unit G1 is fixed, the second lens unit G2 moves toward the image side, the third lens unit G3 moves toward the object side, the fourth lens unit G4 is fixed, and the fifth lens unit G5 is fixed.

Moreover, focusing to an object is carried out by a movement of the fourth lens unit G4. At the time of focusing from a first object to a second object, the biconcave negative lens L11 moves toward the image side.

Next, a zoom lens according to an example 10 will be described below.

The zoom lens according to the example 10 includes in order from an object side, a first lens unit G1 having a negative refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a positive meniscus lens L1 having a convex surface directed toward an image side and a negative meniscus lens L2 having a convex surface directed toward the image side. Here, the positive meniscus lens L1 and the negative meniscus lens L2 are cemented. A virtual stop is set to be positioned on an image-side surface of the negative meniscus lens L2.

The second lens unit G2 includes a biconcave negative lens L3 and a positive meniscus lens L4 having a convex surface directed toward the object side. Here, the biconcave negative lens L3 and the positive meniscus lens L4 are cemented.

The third lens unit G3 includes a positive meniscus lens L5 having a convex surface directed toward the image side, a biconvex positive lens L6, a biconcave negative lens L7, a negative meniscus lens L8 having a convex surface directed toward the object side, and a positive meniscus lens L9 having a convex surface directed toward the object side. Here, the biconvex positive lens L6 and the biconcave negative lens L7 are cemented. Moreover, the negative meniscus lens L8 and the positive meniscus lens L9 are cemented.

The fourth lens unit G4 includes a biconcave negative lens L10 and a positive meniscus lens L11 having a convex surface directed toward the object side. Here, the biconcave negative lens L10 and the positive meniscus lens L11 are cemented.

The fifth lens unit G5 includes a biconvex positive lens L12, a negative meniscus lens L13 having a convex surface directed toward the image side, and a negative meniscus lens L14 having a convex surface directed toward the image side. Here, the biconvex positive lens L12 and the negative meniscus lens L13 are cemented.

At the time of zooming from a wide angle end to a telephoto end, the first lens unit G1 is fixed, the second lens unit G2, after moving toward the image side, moves toward the object side, the third lens unit G3 moves toward the object side, the fourth lens unit G4 is fixed, and the fifth lens unit G5 is fixed.

Moreover, focusing to an object is carried out by a movement of the fourth lens unit G4. At the time of focusing from a first object to a second object, the biconcave negative lens L10 and the positive meniscus lens L11 move toward the image side.

Next, a zoom lens according to an example 11 will be described below.

The zoom lens according to the example 11 includes in order from an object side, a first lens unit G1 having a negative refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a positive meniscus lens L1 having a convex surface directed toward an image side and a negative meniscus lens L2 having a convex surface directed toward the image side. Here, the positive meniscus lens L1 and the negative meniscus lens L2 are cemented. A virtual stop is set to be positioned on an image-side surface of the negative meniscus lens L2.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L5, a biconvex positive lens L6, a biconcave negative lens L7, a negative meniscus lens L8 having a convex surface directed toward the object side, and a positive meniscus lens L9 having a convex surface directed toward the object side. Here, the biconvex positive lens L6 and the biconcave negative lens L7 are cemented. Moreover, the negative meniscus lens L8 and the positive meniscus lens L9 are cemented.

The fourth lens unit G4 includes a positive meniscus lens L10 having a convex surface directed toward the image side and a negative meniscus lens L11 having a convex surface directed toward the image side.

The fifth lens unit G5 includes a biconvex positive lens L12 and a negative meniscus lens L13 having a convex surface directed toward the image side.

At the time of zooming from a wide angle end to a telephoto end, the first lens unit G1 is fixed, the second lens unit G2, after moving toward the image side, moves toward the object side, the third lens unit G3 moves toward the object side, the fourth lens unit G4 is fixed, and the fifth lens unit G5 is fixed.

Moreover, focusing to an object is carried out by a movement of the fourth lens unit G4. At the time of focusing from a first object to a second object, the positive meniscus lens L10 and the negative meniscus lens L11 move toward the image side.

Next, a zoom lens according to an example 12 will be described below.

The zoom lens according to the example 12 includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward an image side, a positive meniscus lens L2 having a convex surface directed toward the image side, and a biconcave negative lens L3. Here, the negative meniscus lens L1, the positive meniscus lens L2, and the biconcave negative lens L3 are cemented. A virtual stop is set to be positioned on an object side of the negative meniscus lens L1.

The second lens unit G2 includes a biconvex positive lens L4, a biconvex positive lens 5, a biconcave negative lens L6, a negative meniscus lens L7 having a convex surface directed toward the object side, and a biconvex positive lens L8 Here, the biconvex positive lens L5 and the biconcave negative lens L6 are cemented. Moreover, the negative meniscus lens L7 and the biconvex positive lens L8 are cemented.

The third lens unit G3 includes a biconcave negative lens L9.

The fourth lens unit G4 includes a biconvex positive lens L10 and a biconcave negative lens L11.

At the time of zooming from a wide angle end to a telephoto end, the first lens unit G1, after moving toward the image side, moves toward the object side, the second lens unit G2 moves toward the object side, the third lens unit G3 is fixed, and the fourth lens unit G4 is fixed.

Moreover, focusing to an object is carried out by a movement of the third lens unit G3. At the time of focusing from a first object to a second object, the biconcave negative lens L9 moves toward the image side.

An aspheric surface is provided to a total of six surfaces namely, both surfaces of the biconvex positive lens L4, both surfaces of the biconcave negative lens L9, and both surfaces of the biconvex positive lens L10.

Next, a zoom lens according to an example 13 will be described below.

The zoom lens according to the example 13 includes in order from an object side, a first lens unit G1 having a negative refractive power, a second lens unit G2 having a positive refractive power, a third lens unit G3 having a negative refractive power, and a fourth lens unit having a positive refractive power.

The first lens unit G1 includes a negative meniscus lens L1 having a convex surface directed toward an image side, a positive meniscus lens L2 having a convex surface directed toward the image side, and a biconcave negative lens L3. Here, the negative meniscus lens L1, the positive meniscus lens L2, and the biconcave negative lens L3 are cemented. A virtual stop is set to be positioned on an object side of the negative meniscus lens L1.

The second lens unit G2 includes a biconvex positive lens L4, a biconvex positive lens L5, a biconcave negative lens L6, a negative meniscus lens L7 having a convex surface directed toward the object side, and a biconvex positive lens L8. Here, the biconvex positive lens L5 and the biconcave negative lens L6 are cemented. Moreover, the negative meniscus lens L7 and the biconvex positive lens L8 are cemented.

The third lens unit G3 includes a biconcave negative lens L9.

The fourth lens unit G4 includes a biconvex positive lens L10, a biconvex positive lens L11, and a biconcave negative lens L12.

At the time of zooming from a wide angle end to a telephoto end, the first lens unit G1, after moving toward the image side, moves toward the object side, the second lens unit G2 moves toward the object side, the third lens unit G3 is fixed, and the fourth lens unit G4 is fixed.

Moreover, focusing to an object is carried out by a movement of the third lens unit G3. At the time of focusing from a first object to a second object, the biconcave negative lens L9 moves toward the image side.

Next, a zoom lens according to an example 14 will be described below.

The zoom lens according to the example 14 includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward an image side, a positive meniscus lens L2 having a convex surface directed toward the image side, and a biconcave negative lens L3. Here, the negative meniscus lens L1, the positive meniscus lens L2, and the biconcave negative lens L3 are cemented. A virtual stop is set to be positioned on an object side of the negative meniscus lens L1.

The second lens unit G2 includes a biconvex positive lens L4, a positive meniscus lens L5 having a convex surface directed toward the object side, a negative meniscus lens L6 having a convex surface directed toward the object side, a negative meniscus lens L7 having a convex surface directed toward the object side, and a biconvex positive lens L8. Here, the positive meniscus lens L5 and the negative meniscus lens L6 are cemented. Moreover, the negative meniscus lens L7 and the biconvex positive lens L8 are cemented.

The third lens unit G3 includes a biconcave negative lens L9.

The fourth lens unit G4 includes a biconvex positive lens L10 and a negative meniscus lens L11 having a convex surface directed toward the image side.

At the time of zooming from a wide angle end to a telephoto end, the first lens unit G1, after moving toward the image side, moves toward the object side, the second lens unit G2 moves toward the object side, the third lens unit G3 is fixed, and the fourth lens unit G4 is fixed.

Moreover, focusing to an object is carried out by a movement of the third lens unit G3. At the time of focusing from a first object to a second object, the biconcave negative lens L9 moves toward the image side.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, ER denotes an effective diameter, *denotes an aspheric surface. Moreover, in zoom data, f denotes a focal length of an overall zoom lens system, FNO. denotes F-number, FB denotes a back focus, IH denotes an image height, ω denotes a half angle of field, f1, f2 . . . is a focal length of each lens unit. Further, Lens total length is the distance from the frontmost lens surface to the rearmost lens surface plus the back focus. The back focus is a unit which is expressed upon air conversion of a distance from the lens backmost surface to a paraxial image surface.

Moreover, WE1, ST1 and TE1 denote a wide angle end, an intermediate state and a telephoto end, respectively, at a state of focusing to the first object. WE2, ST2 and TE2 denote a wide angle end, an intermediate state and a telephoto end, respectively, at a state of focusing to the second object. Further, a value of IH and a value of ω do not denote a value at focal length in each state.

Moreover, a shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10

$$Z=(y^2/r)/[1+\{1-(1+k)(y/r)^2\}^{1/2}]+A4\ y^4+A6\ y^6+A8\ y^8+A10\ y^{10}$$

Further, in the aspherical surface coefficients, 'e-n' (where, n is an integral number) indicates '10$^{-n}$'. Moreover, these symbols are commonly used in the following numerical data for each example.

Example 1

Unit mm

Surface data

| Surface no. | r | d | nd | vd | ER |
|---|---|---|---|---|---|
| Object plane | ∞ | ∞ | | | |
| 1 | −12.214 | 2.70 | 1.58144 | 40.75 | 2.1728 |
| 2 | −20.622 | 0.30 | | | 2.1487 |
| 3 | 38.082 | 1.80 | 1.48749 | 70.23 | 2.1132 |
| 4 | −8.106 | 0.70 | 1.78590 | 44.20 | 2.0107 |
| 5 | −12.145 | Variable | | | |
| 6 | −15.671 | 1.42 | 1.92286 | 18.90 | 2.0982 |
| 7 | −7.610 | 0.70 | 1.74951 | 35.33 | 2.2171 |
| 8 | 25.752 | Variable | | | 2.3026 |
| 9 | 258.336 | 1.75 | 1.75500 | 52.32 | 4.802 |
| 10 | −19.896 | 0.30 | | | 4.9185 |
| 11 | 15.793 | 3.00 | 1.72916 | 54.68 | 4.9117 |
| 12 | −20.119 | 1.20 | 1.80518 | 25.42 | 4.6805 |
| 13 | 130.235 | Variable | | | 4.4587 |
| 14 | −32.675 | 0.70 | 1.72916 | 54.68 | 3.83 |
| 15 | 18.164 | Variable | | | 3.7522 |
| 16 | 28.066 | 3.00 | 1.88300 | 40.76 | 3.9661 |
| 17 | −10.669 | 0.70 | 1.78472 | 25.68 | 3.8877 |
| 18 | −151.242 | Variable | | | 3.8001 |
| 19 | ∞ | 1.00 | 1.52113 | 66.54 | |
| 20 | ∞ | 0.50 | | | |
| 21 | ∞ | 14.90 | 1.51633 | 64.14 | |
| 22 | ∞ | 0.70 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 15.83 | 21.69 | 31.22 | 15.74 | 21.41 | 30.24 |
| FNO. | 4.41 | 6.04 | 8.69 | 4.38 | 5.96 | 8.42 |

-continued

Unit mm

| | | | | | | |
|---|---|---|---|---|---|---|
| FB | 19.44 | 19.44 | 19.44 | 19.44 | 19.44 | 19.44 |
| LTL | 59.28 | 59.28 | 59.28 | 59.28 | 59.28 | 59.28 |
| d5 | 1.60 | 6.49 | 12.20 | 1.60 | 6.49 | 12.20 |
| d8 | 12.23 | 7.34 | 1.62 | 12.23 | 7.34 | 1.62 |
| d13 | 3.55 | 4.17 | 4.22 | 3.82 | 4.70 | 5.36 |
| d15 | 4.20 | 3.57 | 3.52 | 3.92 | 3.04 | 2.38 |
| d18 | 2.34 | 2.34 | 2.34 | 2.34 | 2.34 | 2.34 |
| IH | 1.92 | 2.73 | 3.00 | 1.92 | 2.73 | 3.00 |
| ω | 7.03 | 7.28 | 5.46 | 7.1 | 7.36 | 5.46 |

Unit focal length f1 = 35.30    f2 = −15.16    f3 = 12.75    f4 = −15.85    f5 = 22.17

Example 2

Unit mm

Surface data

| Surface no. | r | d | nd | vd | ER |
|---|---|---|---|---|---|
| Object plane | ∞ | ∞ | | | |
| 1 | −15.012 | 0.70 | 1.88300 | 40.76 | 3.5678 |
| 2 | −16.475 | 0.50 | | | 3.6075 |
| 3 | 52.044 | 1.70 | 1.80610 | 40.92 | 3.5081 |
| 4 | −16.001 | 0.70 | 1.72151 | 29.23 | 3.4058 |
| 5 | 4134.942 | Variable | | | |
| 6 | −35.115 | 0.70 | 1.80610 | 40.92 | 3.3334 |
| 7 | 10.106 | 1.87 | 1.84666 | 23.78 | 3.4484 |
| 8 | 35.596 | Variable | | | 3.5458 |
| 9 | −1832.152 | 2.27 | 1.80610 | 40.92 | 7.4671 |
| 10 | −28.959 | 0.50 | | | 7.6195 |
| 11 | 58.441 | 4.00 | 1.57135 | 52.95 | 7.6161 |
| 12 | −15.741 | 0.70 | 1.74077 | 27.79 | 7.5389 |
| 13 | −87.401 | 0.78 | | | 7.5633 |
| 14 | 12.676 | 0.80 | 1.69895 | 30.13 | 7.4011 |
| 15 | 9.422 | 4.41 | 1.49700 | 81.61 | 6.9479 |
| 16 | 199.193 | Variable | | | 6.6287 |
| 17 | −50.492 | 2.15 | 1.92286 | 18.90 | 5.9176 |
| 18 | −29.717 | 0.70 | 1.58144 | 40.75 | 5.7288 |
| 19 | 9.709 | Variable | | | 5.2644 |
| 20 | 14.909 | 4.00 | 1.72916 | 54.68 | 5.7444 |
| 21 | −24.171 | 5.94 | | | 5.4936 |
| 22 | −22.094 | 0.70 | 1.80518 | 25.42 | 2.8635 |
| 23 | 68.660 | Variable | | | 2.7234 |
| 24 | ∞ | 1.00 | 1.52113 | 66.54 | |
| 25 | ∞ | 0.50 | | | |
| 26 | ∞ | 0.70 | 1.51633 | 64.14 | |
| 27 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 16.30 | 22.01 | 32.14 | 16.10 | 21.43 | 29.95 |
| FNO. | 2.49 | 3.36 | 4.91 | 2.46 | 3.27 | 4.58 |
| FB | 4 | 4 | 4 | 4 | 4 | 4 |
| LTL | 63.50 | 63.50 | 63.50 | 63.50 | 63.50 | 63.50 |
| d5 | 0.68 | 8.00 | 17.19 | 0.68 | 8.00 | 17.19 |
| d8 | 18.22 | 10.89 | 1.71 | 18.22 | 10.89 | 1.71 |
| d16 | 2.70 | 3.33 | 3.70 | 3.09 | 4.06 | 5.35 |
| d19 | 4.78 | 4.15 | 3.78 | 4.39 | 3.43 | 2.13 |
| d23 | 1.30 | 1.30 | 1.30 | 1.30 | 1.30 | 1.30 |
| IH | 1.92 | 2.73 | 3.00 | 1.92 | 2.73 | 3.00 |
| ω | 6.83 | 7.17 | 5.25 | 6.95 | 7.35 | 5.33 |

Unit focal length f1 = 58.87    f2 = −23.06    f3 = 15.86    f4 = −14.67    f5 = 18.15

Example 3

Unit mm

Surface data

| Surface no. | r | d | nd | vd | ER |
|---|---|---|---|---|---|
| Object plane | ∞ | ∞ | | | |
| 1 | 50.195 | 0.70 | 1.57135 | 52.95 | 3.8202 |
| 2 | 14.605 | 1.84 | | | 3.7125 |
| 3 | 16.895 | 3.10 | 1.80400 | 46.57 | 3.6868 |
| 4 | −28.288 | 0.70 | 1.69895 | 30.13 | 3.4197 |
| 5 | 69.580 | Variable | | | |
| 6 | −41.811 | 0.70 | 1.88300 | 40.76 | 3.3333 |
| 7 | 13.843 | 1.76 | 1.84666 | 23.78 | 3.4287 |
| 8 | 58.330 | Variable | | | 3.5461 |
| 9 | 82.739 | 2.52 | 1.88300 | 40.76 | 7.6069 |
| 10 | −34.283 | 0.30 | | | 7.6897 |
| 11 | 32.941 | 3.78 | 1.69680 | 55.53 | 7.517 |
| 12 | −19.967 | 0.70 | 2.00330 | 28.27 | 7.2943 |
| 13 | 385.813 | 0.30 | | | 7.1693 |
| 14 | 13.921 | 0.70 | 1.72825 | 28.46 | 6.9624 |
| 15 | 10.726 | 3.77 | 1.48749 | 70.23 | 6.6331 |
| 16 | −412.981 | Variable | | | 6.3211 |
| 17 | −210.166 | 0.70 | 1.58913 | 61.14 | 5.2422 |
| 18 | 8.832 | Variable | | | 4.8053 |
| 19 | 14.758 | 3.40 | 1.49700 | 81.61 | 5.1012 |
| 20 | −20.808 | 0.30 | | | 4.9371 |
| 21 | 27.266 | 3.59 | 1.88300 | 40.76 | 4.5942 |
| 22 | −10.640 | 0.70 | 1.72916 | 54.68 | 4.0655 |
| 23 | −38.106 | 0.48 | | | 3.6802 |
| 24 | −20.137 | 1.00 | 1.72825 | 28.46 | 3.435 |
| 25 | −16.275 | 0.32 | | | 3.1938 |
| 26 | −14.358 | 1.00 | 1.72825 | 28.46 | 2.9512 |
| 27 | 11.916 | Variable | | | 2.5692 |
| 28 | ∞ | 1.00 | 1.52113 | 66.54 | |
| 29 | ∞ | 0.50 | | | |
| 30 | ∞ | 0.70 | 1.51633 | 64.14 | |
| 31 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 15.79 | 21.32 | 31.14 | 15.56 | 20.69 | 28.96 |
| FNO. | 2.39 | 3.23 | 4.72 | 2.36 | 3.14 | 4.39 |
| FB | 3.44 | 3.44 | 3.44 | 3.44 | 3.44 | 3.44 |
| LTL | 65.00 | 65.00 | 65.00 | 65.00 | 65.00 | 65.00 |
| d5 | 0.68 | 8.84 | 19.15 | 0.68 | 8.84 | 19.15 |
| d8 | 19.27 | 11.11 | 0.80 | 19.27 | 11.11 | 0.80 |
| d16 | 3.13 | 3.53 | 3.53 | 3.49 | 4.20 | 5.03 |
| d18 | 6.12 | 5.72 | 5.72 | 5.76 | 5.06 | 4.22 |
| d27 | 0.74 | 0.74 | 0.74 | 0.74 | 0.74 | 0.74 |
| IH | 1.92 | 2.73 | 3.00 | 1.92 | 2.73 | 3.00 |
| ω | 7.04 | 7.41 | 5.45 | 7.21 | 7.65 | 5.59 |

Unit focal length f1 = 62.65    f2 = −25.80    f3 = 14.80    f4 = −14.31    f5 = 19.10

Example 4

Unit mm

Surface data

| Surface no. | r | d | nd | vd | ER |
|---|---|---|---|---|---|
| Object plane | ∞ | ∞ | | | |
| 1 | 30.662 | 2.72 | 1.80400 | 46.57 | 3.6956 |
| 2 | −22.684 | 0.70 | 1.80100 | 34.97 | 3.4261 |
| 3 | 64.717 | Variable | | | |
| 4 | −38.528 | 0.70 | 1.80610 | 40.92 | 3.3288 |
| 5 | 11.707 | 1.87 | 1.84666 | 23.78 | 3.4425 |
| 6 | 38.468 | Variable | | | 3.5547 |
| 7* | 15.786 | 3.87 | 1.58913 | 61.14 | 8.3436 |
| 8* | −78.080 | 0.30 | | | 8.1822 |
| 9 | 19.438 | 0.70 | 1.78472 | 25.68 | 7.9479 |
| 10 | 10.466 | 5.71 | 1.48749 | 70.23 | 7.4128 |
| 11 | −27.757 | Variable | | | 7.1991 |
| 12 | 34.286 | 0.70 | 1.69680 | 55.53 | 5.679 |
| 13 | 9.038 | Variable | | | 5.1727 |
| 14 | 13.594 | 2.88 | 1.77250 | 49.60 | 5.1601 |
| 15 | −34.478 | 0.30 | | | 4.8934 |
| 16 | 12.804 | 3.59 | 1.51633 | 64.14 | 4.2396 |
| 17 | −18.940 | 0.70 | 1.74951 | 35.33 | 3.1091 |
| 18 | 6.368 | Variable | | | 2.602 |
| 19 | ∞ | 1.00 | 1.52113 | 66.54 | |
| 20 | ∞ | 0.50 | | | |
| 21 | ∞ | 0.70 | 1.51633 | 64.14 | |
| 22 | ∞ | 0.50 | | | |
| Image plane | ∞ | | | | |

Aspherical surface data

7th surface
k = 0.000
A4 = −9.21106e−06, A6 = 6.75309e−08, A8 = 1.55922e−09
8th surface
k = 0.000
A4 = 7.46114e−05, A6 = 1.19205e−07, A8 = 1.16426e−09

Zoom data
Zoom ratio 1.97

| | WE1 | ST1 | TE1 | WE2 | ST2 | TE2 |
|---|---|---|---|---|---|---|
| f | 15.83 | 21.69 | 31.22 | 15.51 | 20.82 | 28.31 |
| FNO. | 2.28 | 3.13 | 4.50 | 2.24 | 3.00 | 4.08 |
| FB | 3.82 | 3.82 | 3.82 | 3.82 | 3.82 | 3.82 |
| LTL | 59.74 | 59.74 | 59.74 | 59.74 | 59.74 | 59.74 |
| d3 | 0.59 | 9.15 | 18.94 | 0.59 | 9.15 | 18.94 |
| d6 | 19.22 | 10.66 | 0.87 | 19.22 | 10.66 | 0.87 |
| d11 | 2.91 | 3.60 | 4.09 | 3.32 | 4.40 | 5.94 |
| d13 | 8.46 | 7.77 | 7.28 | 8.04 | 6.96 | 5.43 |
| d18 | 1.12 | 1.12 | 1.12 | 1.12 | 1.12 | 1.12 |
| IH | 1.92 | 2.73 | 3.00 | 1.92 | 2.73 | 3.00 |
| ω | 7.03 | 7.28 | 5.38 | 7.22 | 7.57 | 5.58 |

Unit focal length f1 = 68.55  f2 = −24.98  f3 = 14.86  f4 = −17.74  f5 = 26.57

Example 5

Unit mm

Surface data

| Surface no. | r | d | nd | vd | ER |
|---|---|---|---|---|---|
| Object plane | ∞ | ∞ | | | |
| 1 | −14.562 | 1.68 | 1.88300 | 40.76 | 3.2034 |
| 2 | −17.237 | 0.50 | | | 3.2719 |
| 3 | 66.245 | 1.65 | 1.80610 | 40.92 | 3.185 |
| 4 | −13.676 | 0.70 | 1.72151 | 29.23 | 3.093 |
| 5 | −165.866 | Variable | | | |
| 6 | −30.624 | 0.70 | 1.80610 | 40.92 | 3.0285 |
| 7 | 10.283 | 1.82 | 1.84666 | 23.78 | 3.1446 |
| 8 | 37.753 | Variable | | | 3.257 |
| 9 | −277.278 | 2.18 | 1.80610 | 40.92 | 7.1005 |
| 10 | −27.086 | 0.50 | | | 7.2694 |
| 11 | 61.882 | 2.90 | 1.57135 | 52.95 | 7.3011 |
| 12 | −23.873 | 0.70 | 1.74077 | 27.79 | 7.2573 |
| 13 | −76.315 | 0.50 | | | 7.2606 |
| 14 | 11.993 | 0.70 | 1.69895 | 30.13 | 7.0477 |
| 15 | 8.513 | 4.63 | 1.49700 | 81.61 | 6.5643 |
| 16 | −547.927 | Variable | | | 6.2284 |
| 17 | −28.802 | 1.69 | 1.80518 | 25.42 | 5.4826 |
| 18 | −42.509 | 0.30 | | | 5.3091 |
| 19 | −37.850 | 0.70 | 1.58144 | 40.75 | 5.2329 |
| 20 | 10.790 | Variable | | | 4.9631 |
| 21 | 17.656 | 4.00 | 1.72916 | 54.68 | 5.4951 |
| 22 | −19.207 | 6.51 | | | 5.3212 |
| 23 | −16.688 | 0.70 | 1.80518 | 25.42 | 2.6391 |
| 24 | −158.795 | Variable | | | 2.5319 |
| 25 | ∞ | 1.00 | 1.52113 | 66.54 | |
| 26 | ∞ | 0.50 | | | |
| 27 | ∞ | 0.70 | 1.51633 | 64.14 | |
| 28 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 15.00 | 20.25 | 29.58 | 14.84 | 19.80 | 27.89 |
| FNO. | 2.62 | 3.54 | 5.17 | 2.60 | 3.46 | 4.88 |
| FB | 3.20 | 3.20 | 3.20 | 3.20 | 3.20 | 3.20 |
| LTL | 61.85 | 61.85 | 61.85 | 61.85 | 61.85 | 61.85 |
| d5 | 0.50 | 7.61 | 16.28 | 0.50 | 7.61 | 16.28 |
| d8 | 17.52 | 10.41 | 1.74 | 17.52 | 10.41 | 1.74 |
| d16 | 2.60 | 3.25 | 3.91 | 2.86 | 3.73 | 5.01 |
| d20 | 4.98 | 4.33 | 3.67 | 4.72 | 3.85 | 2.57 |
| d24 | 0.50 | 0.50 | 0.50 | 0.50 | 0.50 | 0.50 |
| IH | 1.92 | 2.73 | 3.00 | 1.92 | 2.73 | 3.00 |
| ω | 7.43 | 7.81 | 5.72 | 7.55 | 7.99 | 5.82 |

Unit focal length f1 = 57.89  f2 = −21.98  f3 = 14.12  f4 = −12.37  f5 = 17.24

Example 6

Unit mm

Surface data

| Surface no. | r | d | nd | vd | ER |
|---|---|---|---|---|---|
| Object plane | ∞ | ∞ | | | |
| 1 | 68.855 | 1.05 | 1.57135 | 52.95 | 3.895 |
| 2 | 15.829 | 1.91 | | | 3.759 |
| 3 | 18.450 | 3.84 | 1.80400 | 46.57 | 3.7329 |
| 4 | −29.377 | 0.70 | 1.69895 | 30.13 | 3.4079 |
| 5 | 98.570 | Variable | | | |
| 6 | −42.649 | 0.70 | 1.88300 | 40.76 | 3.3369 |
| 7 | 14.728 | 1.67 | 1.84666 | 23.78 | 3.4329 |
| 8 | 57.254 | Variable | | | 3.548 |
| 9 | 88.682 | 2.53 | 1.88300 | 40.76 | 9.3055 |
| 10 | −48.966 | 0.30 | | | 9.3736 |
| 11 | 33.990 | 4.00 | 1.51633 | 64.14 | 9.224 |
| 12 | −27.094 | 0.70 | 1.80518 | 25.42 | 9.0672 |
| 13 | −81.961 | 0.30 | | | 8.9749 |

-continued

| Unit mm | | | | | |
|---|---|---|---|---|---|
| 14 | 13.885 | 0.74 | 1.78472 | 25.68 | 8.3044 |
| 15 | 10.591 | 4.08 | 1.49700 | 81.61 | 7.7434 |
| 16 | 67.637 | Variable | | | 7.394 |
| 17 | −107.673 | 0.70 | 1.67003 | 47.23 | 6.1122 |
| 18 | 10.162 | Variable | | | 5.5699 |
| 19 | 15.470 | 3.62 | 1.49700 | 81.61 | 5.9803 |
| 20 | −19.677 | 1.62 | | | 5.8377 |
| 21 | 30.113 | 4.00 | 1.80610 | 40.92 | 4.9025 |
| 22 | −6.601 | 0.70 | 1.77250 | 49.60 | 4.4299 |
| 23 | −44.340 | 0.69 | | | 3.7974 |
| 24 | −13.842 | 1.00 | 1.72151 | 29.23 | 3.5295 |
| 25 | −26.023 | 0.34 | | | 3.287 |
| 26 | 42.532 | 1.00 | 1.88300 | 40.76 | 2.9757 |
| 27 | 11.022 | Variable | | | 2.6451 |
| 28 | ∞ | 1.00 | 1.52113 | 66.54 | |
| 29 | ∞ | 0.50 | | | |
| 30 | ∞ | 0.70 | 1.51633 | 64.14 | |
| 31 | ∞ | 0.50 | | | |
| Image plane | ∞ | | | | |

Zoom data
Zoom ratio 2.50

| | WE1 | ST1 | TE1 | WE2 | ST2 | TE2 |
|---|---|---|---|---|---|---|
| f | 15.79 | 23.69 | 39.48 | 15.59 | 22.92 | 35.20 |
| FNO. | 2.40 | 3.60 | 5.99 | 2.37 | 3.48 | 5.35 |
| FB | 3.47 | 3.47 | 3.47 | 3.47 | 3.47 | 3.47 |
| LTL | 77.00 | 77.00 | 77.00 | 77.00 | 77.00 | 77.00 |
| d5 | 0.67 | 12.17 | 26.50 | 0.67 | 12.17 | 26.50 |
| d8 | 26.64 | 15.13 | 0.80 | 26.64 | 15.13 | 0.80 |
| d16 | 3.60 | 4.30 | 4.41 | 3.90 | 4.98 | 6.49 |
| d18 | 6.42 | 5.72 | 5.61 | 6.12 | 5.04 | 3.52 |
| d27 | 0.77 | 0.77 | 0.77 | 0.77 | 0.77 | 0.77 |
| IH | 1.92 | 2.73 | 3.00 | 1.92 | 2.73 | 3.00 |
| ω | 7.08 | 6.73 | 4.26 | 7.29 | 7.05 | 4.43 |

Unit focal length

| f1 = 68.65 | f2 = −26.01 | f3 = 15.88 | f4 = −13.76 | f5 = 19.45 |
|---|---|---|---|---|

Example 7

| Unit mm | | | | | |
|---|---|---|---|---|---|
| Surface data | | | | | |
| Surface no. | r | d | nd | vd | ER |
| Object plane | ∞ | ∞ | | | |
| 1 | −11.701 | 2.79 | 1.88300 | 40.76 | 2.0965 |
| 2 | −15.802 | 0.30 | | | 2.156 |
| 3 | 42.274 | 1.71 | 1.49700 | 81.61 | 2.1142 |
| 4 | −9.698 | 0.70 | 1.88300 | 40.76 | 2.01 |
| 5 | −13.684 | Variable | | | 2.0974 |
| 6 | −13.944 | 1.48 | 1.92286 | 18.90 | 2.0974 |
| 7 | −6.064 | 0.70 | 1.80100 | 34.97 | 2.2253 |
| 8 | 27.196 | Variable | | | 2.3294 |
| 9 | 34.781 | 2.30 | 1.78800 | 47.37 | 5.6313 |
| 10 | −24.168 | 3.65 | | | 5.6898 |
| 11 | 14.811 | 3.00 | 1.72916 | 54.68 | 5.1501 |
| 12 | −15.411 | 1.20 | 1.92286 | 18.90 | 4.8761 |
| 13 | 229.642 | Variable | | | 4.5686 |
| 14 | −19.258 | 0.70 | 1.49700 | 81.61 | 4.1099 |
| 15 | 9.619 | Variable | | | 3.9054 |
| 16 | 82.597 | 3.00 | 1.69680 | 55.53 | 4.2179 |
| 17 | −6.836 | 0.70 | 1.56883 | 56.36 | 4.2416 |
| 18 | −33.232 | Variable | | | 4.1506 |
| 19 | ∞ | 1.00 | 1.52113 | 66.54 | |

-continued

| Unit mm | | | | | |
|---|---|---|---|---|---|
| 20 | ∞ | 0.50 | | | |
| 21 | ∞ | 14.20 | 1.51633 | 64.14 | |
| 22 | ∞ | 1.00 | | | |
| Image plane | ∞ | | | | |

Zoom data
Zoom ratio 2.45

| | WE1 | ST1 | TE1 | WE2 | ST2 | TE2 |
|---|---|---|---|---|---|---|
| f | 15.50 | 24.33 | 37.98 | 15.42 | 23.92 | 35.91 |
| FNO. | 4.41 | 6.93 | 10.81 | 4.39 | 6.81 | 10.22 |
| FB | 20.00 | 20.00 | 20.00 | 20.00 | 20.00 | 20.00 |
| LTL | 65.53 | 65.53 | 65.53 | 65.53 | 65.53 | 65.53 |
| d5 | 1.60 | 8.00 | 13.99 | 1.60 | 8.00 | 13.99 |
| d8 | 14.00 | 7.59 | 1.61 | 14.00 | 7.59 | 1.61 |
| d13 | 2.13 | 3.46 | 4.40 | 2.29 | 3.88 | 5.52 |
| d15 | 5.57 | 4.24 | 3.30 | 5.41 | 3.82 | 2.18 |
| d18 | 3.30 | 3.30 | 3.30 | 3.30 | 3.30 | 3.30 |
| IH | 1.92 | 2.73 | 3.00 | 1.92 | 2.73 | 3.00 |
| ω | 7.19 | 6.46 | 4.43 | 7.27 | 6.58 | 4.47 |

Unit focal length

| f1 = 35.13 | f2 = −13.07 | f3 = 12.13 | f4 = −12.77 | f5 = 22.87 |
|---|---|---|---|---|

Example 8

| Unit mm | | | | | |
|---|---|---|---|---|---|
| Surface data | | | | | |
| Surface no. | r | d | nd | vd | ER |
| Object plane | ∞ | ∞ | | | |
| 1 | 50.358 | 1.83 | 1.57135 | 52.95 | 3.8019 |
| 2 | 14.675 | 1.94 | | | 3.5814 |
| 3 | 16.999 | 1.78 | 1.80400 | 46.57 | 3.5442 |
| 4 | −29.018 | 0.70 | 1.69895 | 30.13 | 3.4172 |
| 5 | 70.056 | Variable | | | |
| 6 | −39.988 | 0.70 | 1.88300 | 40.76 | 3.3325 |
| 7 | 14.043 | 1.76 | 1.84666 | 23.78 | 3.4295 |
| 8 | 62.753 | Variable | | | 3.5483 |
| 9 | 79.109 | 2.42 | 1.88300 | 40.76 | 7.6446 |
| 10 | −38.911 | 0.30 | | | 7.7223 |
| 11 | 28.814 | 4.00 | 1.69680 | 55.53 | 7.5858 |
| 12 | −21.528 | 0.70 | 2.00330 | 28.27 | 7.3319 |
| 13 | −390.775 | 0.30 | | | 7.2042 |
| 14 | 16.073 | 0.80 | 1.72825 | 28.46 | 6.9075 |
| 15 | 10.936 | 3.78 | 1.48749 | 70.23 | 6.5115 |
| 16 | −173.628 | Variable | | | 6.1797 |
| 17 | −50.070 | 0.70 | 1.54814 | 45.79 | 5.1843 |
| 18 | 10.428 | Variable | | | 4.7986 |
| 19 | 1839.511 | 3.03 | 1.49700 | 81.61 | 4.7871 |
| 20 | −14.622 | 0.30 | | | 4.7816 |
| 21 | 14.953 | 3.57 | 1.80100 | 34.97 | 4.4519 |
| 22 | −8.710 | 0.70 | 1.74400 | 44.78 | 3.9885 |
| 23 | −31.819 | 0.56 | | | 3.5903 |
| 24 | −21.100 | 1.00 | 2.00330 | 28.27 | 3.2453 |
| 25 | −20.588 | 0.31 | | | 3.0496 |
| 26 | −18.715 | 1.00 | 1.84666 | 23.78 | 2.8381 |
| 27 | 12.652 | Variable | | | 2.5147 |
| 28 | ∞ | 1.00 | 1.52113 | 66.54 | |
| 29 | ∞ | 0.50 | | | |

-continued

Unit mm

| | | | | |
|---|---|---|---|---|
| 30 | ∞ | 0.70 | 1.51633 | 64.14 |
| 31 | ∞ | 0.50 | | |
| Image plane | ∞ | | | |

Zoom data
Zoom ratio 1.97

| | WE1 | ST1 | TE1 | WE2 | ST2 | TE2 |
|---|---|---|---|---|---|---|
| f | 15.79 | 21.34 | 31.14 | 15.50 | 20.58 | 28.60 |
| FNO. | 2.42 | 3.26 | 4.76 | 2.37 | 3.15 | 4.38 |
| FB | 3.39 | 3.39 | 3.39 | 3.39 | 3.39 | 3.39 |
| LTL | 64.75 | 64.75 | 64.75 | 64.75 | 64.75 | 64.75 |
| d5 | 0.68 | 9.03 | 19.44 | 0.68 | 9.03 | 19.44 |
| d8 | 19.56 | 11.21 | 0.80 | 19.56 | 11.21 | 0.80 |
| d16 | 2.95 | 3.41 | 3.53 | 3.30 | 4.06 | 5.02 |
| d18 | 5.98 | 5.52 | 5.40 | 5.64 | 4.87 | 3.91 |
| d27 | 0.69 | 0.69 | 0.69 | 0.69 | 0.69 | 0.69 |
| IH | 1.92 | 2.73 | 3.00 | 1.92 | 2.73 | 3.00 |
| ω | 7.01 | 7.33 | 5.37 | 7.18 | 7.60 | 5.58 |

Unit focal length

| f1 = 63.55 | f2 = −25.88 | f3 = 14.54 | f4 = −15.60 | f5 = 24.66 |
|---|---|---|---|---|

Example 9

Unit mm

Surface data

| Surface no. | r | d | nd | vd | ER |
|---|---|---|---|---|---|
| Object plane | ∞ | ∞ | | | |
| 1 | 97.896 | 1.37 | 1.69895 | 30.13 | 3.1746 |
| 2 | 15.202 | 2.03 | | | 3.0305 |
| 3 | 16.965 | 1.72 | 1.69680 | 55.53 | 3.0133 |
| 4 | 52.126 | 1.32 | 1.88300 | 40.76 | 2.8922 |
| 5 | −115.435 | Variable | | | |
| 6 | −32.291 | 0.70 | 1.71999 | 50.23 | 2.8547 |
| 7 | 10.846 | 1.59 | 1.80518 | 25.42 | 2.9563 |
| 8 | 27.963 | Variable | | | 3.042 |
| 9 | 50.985 | 3.00 | 1.88300 | 40.76 | 6.6735 |
| 10 | −52.856 | 0.30 | | | 6.7707 |
| 11 | 17.820 | 4.00 | 1.69680 | 55.53 | 6.7128 |
| 12 | −22.230 | 0.70 | 1.80518 | 25.42 | 6.3974 |
| 13 | 129.859 | 0.50 | | | 6.1327 |
| 14 | 9.526 | 1.05 | 2.00330 | 28.27 | 5.6208 |
| 15 | 6.583 | 2.37 | 1.49700 | 81.61 | 4.946 |
| 16 | 9.602 | Variable | | | 4.5772 |
| 17 | −65.368 | 0.70 | 1.88300 | 40.76 | 4.3026 |
| 18 | 38.537 | Variable | | | 4.2419 |
| 19 | 15.191 | 3.89 | 1.88300 | 40.76 | 4.1943 |
| 20 | −8.424 | 0.71 | 1.69895 | 30.13 | 3.8693 |
| 21 | −120.958 | 1.78 | | | 3.518 |
| 22 | −10.009 | 0.70 | 1.60300 | 65.44 | 2.9368 |
| 23 | −39.319 | Variable | | | 2.8197 |
| 24 | ∞ | 1.00 | 1.52113 | 66.54 | |
| 25 | ∞ | 0.50 | | | |

-continued

Unit mm

| | | | | |
|---|---|---|---|---|
| 26 | ∞ | 0.70 | 1.51633 | 64.14 |
| 27 | ∞ | 0.50 | | |
| Image plane | ∞ | | | |

Zoom data
Zoom ratio 1.97

| | WE1 | ST1 | TE1 | WE2 | ST2 | TE2 |
|---|---|---|---|---|---|---|
| f | 14.82 | 20.01 | 29.23 | 14.73 | 19.76 | 28.07 |
| FNO. | 2.82 | 3.80 | 5.56 | 2.80 | 3.76 | 5.34 |
| FB | 4.4 | 4.4 | 4.4 | 4.4 | 4.4 | 4.4 |
| LTL | 58.97 | 58.97 | 58.97 | 58.97 | 58.97 | 58.97 |
| d5 | 0.80 | 6.52 | 13.32 | 0.80 | 6.52 | 13.32 |
| d8 | 16.97 | 10.07 | 1.70 | 16.97 | 10.07 | 1.70 |
| d16 | 2.94 | 4.12 | 5.69 | 3.65 | 5.44 | 8.72 |
| d18 | 5.43 | 5.43 | 5.43 | 4.72 | 4.11 | 2.40 |
| d23 | 1.70 | 1.70 | 1.70 | 1.70 | 1.70 | 1.70 |
| IH | 1.92 | 2.73 | 3.00 | 1.92 | 2.73 | 3.00 |
| ω | 7.48 | 7.84 | 5.81 | 7.59 | 7.98 | 5.90 |

Unit focal length

| f1 = 57.42 | f2 = −22.84 | f3 = 16.10 | f4 = −27.21 | f5 = 19.70 |
|---|---|---|---|---|

Example 10

Unit mm

Surface data

| Surface no. | r | d | nd | vd | ER |
|---|---|---|---|---|---|
| Object plane | ∞ | ∞ | | | |
| 1 | −22.658 | 1.22 | 1.84666 | 23.78 | 2.0433 |
| 2 | −19.356 | 0.70 | 1.72916 | 54.68 | 2.0208 |
| 3 | −41.746 | Variable | | | |
| 4 | −41.115 | 0.70 | 1.74400 | 44.78 | 2.1194 |
| 5 | 11.855 | 1.39 | 1.84666 | 23.78 | 2.2168 |
| 6 | 43.022 | Variable | | | 2.3211 |
| 7 | −4768.339 | 1.72 | 1.88300 | 40.76 | 4.9867 |
| 8 | −26.537 | 0.30 | | | 5.1186 |
| 9 | 14.483 | 3.72 | 1.69680 | 55.53 | 5.1716 |
| 10 | −23.133 | 0.70 | 1.80100 | 34.97 | 4.8623 |
| 11 | 50.004 | 1.66 | | | 4.696 |
| 12 | 20.733 | 1.04 | 1.80518 | 25.42 | 4.4401 |
| 13 | 7.893 | 2.39 | 1.49700 | 81.61 | 4.1436 |
| 14 | 216.268 | Variable | | | 4.0382 |
| 15 | −26.879 | 0.70 | 1.57135 | 52.95 | 3.7403 |
| 16 | 18.692 | 1.40 | 1.49700 | 81.61 | 3.7112 |
| 17 | 38.492 | Variable | | | 3.6958 |
| 18 | 21.558 | 2.55 | 1.88300 | 40.76 | 3.9797 |
| 19 | −11.937 | 1.28 | 1.67003 | 47.23 | 3.8679 |
| 20 | −23.978 | 2.43 | | | 3.657 |
| 21 | −11.454 | 0.70 | 1.80610 | 40.92 | 2.8551 |
| 22 | −61.840 | Variable | | | 2.7989 |
| 23 | ∞ | 1.00 | 1.52113 | 66.54 | |
| 24 | ∞ | 0.50 | | | |
| 25 | ∞ | 0.70 | 1.51633 | 64.14 | |
| 26 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 16.83 | 23.03 | 33.19 | 16.80 | 22.91 | 32.54 |
| FNO. | 4.37 | 5.98 | 8.61 | 4.36 | 5.94 | 8.44 |

-continued

| Unit mm | | | | | | |
|---|---|---|---|---|---|---|
| FB | 6.80 | 6.80 | 6.80 | 6.80 | 6.80 | 6.80 |
| LTL | 57.72 | 57.72 | 57.72 | 57.72 | 57.72 | 57.72 |
| d3 | 0.87 | 2.76 | 0.60 | 0.87 | 2.76 | 0.60 |
| d6 | 13.00 | 6.75 | 2.40 | 13.00 | 6.75 | 2.40 |
| d14 | 2.85 | 7.21 | 13.72 | 3.45 | 8.37 | 16.25 |
| d17 | 9.61 | 9.61 | 9.61 | 9.00 | 8.45 | 7.08 |
| d22 | 4.10 | 4.10 | 4.10 | 4.10 | 4.10 | 4.10 |
| IH | 1.92 | 2.73 | 3.00 | 1.92 | 2.73 | 3.00 |
| ω | 6.57 | 6.77 | 5.1 | 6.62 | 6.78 | 5.05 |

| Unit focal length | | | | |
|---|---|---|---|---|
| f1 = | f2 = | f3 = | f4 = | f5 = |
| −76.70 | −34.19 | 15.33 | −25.77 | 23.22 |

Example 11

| Unit mm | | | | | |
|---|---|---|---|---|---|
| Surface data | | | | | |
| Surface no. | r | d | nd | vd | ER |
| Object plane | ∞ | ∞ | | | |
| 1 | −21.178 | 3.22 | 1.78472 | 25.68 | 2.5649 |
| 2 | −7.724 | 0.70 | 1.80100 | 34.97 | 2.5147 |
| 3 | −44.445 | Variable | | | |
| 4 | −122.035 | 0.70 | 1.64769 | 33.79 | 2.8235 |
| 5 | 11.154 | 1.48 | 1.84666 | 23.78 | 2.9494 |
| 6 | 26.103 | Variable | | | 3.0346 |
| 7 | 52.481 | 2.13 | 1.88300 | 40.76 | 5.7172 |
| 8 | −41.724 | 0.50 | | | 5.8138 |
| 9 | 18.406 | 4.00 | 1.72916 | 54.68 | 5.8218 |
| 10 | −12.515 | 0.70 | 1.80100 | 34.97 | 5.584 |
| 11 | 426.149 | 0.50 | | | 5.3616 |
| 12 | 13.314 | 1.38 | 1.84666 | 23.78 | 5.0843 |
| 13 | 7.199 | 2.36 | 1.49700 | 81.61 | 4.5175 |
| 14 | 13.206 | Variable | | | 4.2508 |
| 15 | −14.222 | 1.80 | 1.80610 | 40.92 | 4.0243 |
| 16 | −9.402 | 0.30 | | | 4.1312 |
| 17 | −9.991 | 0.70 | 1.80100 | 34.97 | 4.0109 |
| 18 | −47.325 | Variable | | | 4.0802 |
| 19 | 18.792 | 4.00 | 1.88300 | 40.76 | 4.2257 |
| 20 | −35.258 | 4.80 | | | 3.9079 |
| 21 | −11.793 | 0.70 | 1.58913 | 61.14 | 2.5052 |
| 22 | −38.866 | Variable | | | 2.422 |
| 23 | ∞ | 1.00 | 1.52113 | 66.54 | |
| 24 | ∞ | 0.50 | | | |
| 25 | ∞ | 0.70 | 1.51633 | 64.14 | |
| 26 | ∞ | 0.50 | | | |
| Image plane | ∞ | | | | |

| Zoom data | | | | | | |
|---|---|---|---|---|---|---|
| Zoom ratio 1.97 | | | | | | |
| | WE1 | ST1 | TE1 | WE2 | ST2 | TE2 |
| f | 14.82 | 20.09 | 29.23 | 14.81 | 20.03 | 28.68 |
| FNO. | 3.21 | 4.36 | 6.34 | 3.21 | 4.34 | 6.22 |
| FB | 3.20 | 3.20 | 3.20 | 3.20 | 3.20 | 3.20 |
| LTL | 55.69 | 55.69 | 55.69 | 55.69 | 55.69 | 55.69 |
| d3 | 1.86 | 3.46 | 0.50 | 1.86 | 3.46 | 0.50 |
| d6 | 11.30 | 5.37 | 1.70 | 11.30 | 5.37 | 1.70 |
| d14 | 3.45 | 7.79 | 14.42 | 4.24 | 9.28 | 17.76 |
| d18 | 5.92 | 5.92 | 5.92 | 5.13 | 4.42 | 2.57 |
| d22 | 0.50 | 0.50 | 0.50 | 0.50 | 0.50 | 0.50 |

-continued

| Unit mm | | | | | | |
|---|---|---|---|---|---|---|
| IH | 1.92 | 2.73 | 3.00 | 1.92 | 2.73 | 3.00 |
| ω | 7.48 | 7.80 | 5.83 | 7.52 | 7.79 | 5.79 |

| Unit focal length | | | | |
|---|---|---|---|---|
| f1 = | f2 = | f3 = | f4 = | f5 = |
| −50.61 | −50.98 | 15.17 | −31.07 | 20.03 |

Example 12

| Unit mm | | | | | |
|---|---|---|---|---|---|
| Surface data | | | | | |
| Surface no. | r | d | nd | vd | ER |
| Object plane | ∞ | ∞ | | | |
| 1 | ∞ | Variable | | | |
| 2 | −15.186 | 0.70 | 1.65160 | 58.55 | 3.3171 |
| 3 | −25.413 | 1.85 | 1.92286 | 18.90 | 3.4536 |
| 4 | −8.959 | 0.70 | 1.74077 | 27.79 | 3.6622 |
| 5 | 78.034 | Variable | | | 3.8687 |
| 6* | 22.697 | 2.75 | 1.86400 | 40.58 | 7.5733 |
| 7* | −110.383 | 0.30 | | | 7.524 |
| 8 | 28.492 | 2.37 | 1.88300 | 40.76 | 7.4179 |
| 9 | −226.154 | 0.70 | 1.84666 | 23.78 | 7.2081 |
| 10 | 54.929 | 0.50 | | | 6.9947 |
| 11 | 41.913 | 0.70 | 1.78472 | 25.68 | 6.8682 |
| 12 | 10.000 | 4.25 | 1.49700 | 81.61 | 6.408 |
| 13 | −36.869 | Variable | | | 6.3082 |
| 14* | −102.480 | 0.70 | 1.49700 | 81.61 | 5.259 |
| 15* | 22.944 | Variable | | | 5.06 |
| 16* | 10.714 | 2.93 | 1.86400 | 40.58 | 4.3437 |
| 17* | −18.892 | 1.34 | | | 3.9099 |
| 18 | −13.977 | 0.70 | 1.84666 | 23.78 | 2.8753 |
| 19 | 15.140 | Variable | | | 2.6101 |
| 20 | ∞ | 1.00 | 1.52113 | 66.54 | |
| 21 | ∞ | 0.50 | | | |
| 22 | ∞ | 0.70 | 1.51633 | 64.14 | |
| 23 | ∞ | 0.50 | | | |
| Image plane | ∞ | | | | |

Aspherical surface data

6th surface
k = 0.000
A4 = 1.56124e−05, A6 = −2.06956e−07, A8 = 1.93432e−09
7th surface
k = 0.000
A4 = 4.47269e−05, A6 = −2.03015e−07, A8 = 1.63014e−09
14th surface
k = 0.000
A4 = 2.96339e−04, A6 = −2.20324e−06, A8 = −5.05449e−08
15th surface
k = 0.000
A4 = 3.23483e−04, A6 = −8.71583e−08, A8 = −9.72206e−08
16th surface
k = 0.000
A4 = 1.37092e−04, A6 = 4.76919e−06, A8 = 4.53901e−08
17th surface
k = 0.000
A4 = 3.49049e−04, A6 = 4.76193e−06, A8 = −1.38785e−07

| Zoom data | | | | | | |
|---|---|---|---|---|---|---|
| Zoom ratio 1.97 | | | | | | |
| | WE1 | ST1 | TE1 | WE2 | ST2 | TE2 |
| f | 15.83 | 21.37 | 31.22 | 15.78 | 21.21 | 30.41 |
| FNO. | 2.40 | 3.24 | 4.73 | 2.39 | 3.21 | 4.61 |

-continued

Unit mm

| | | | | | | |
|---|---|---|---|---|---|---|
| FB | 3.57 | 3.57 | 3.57 | 3.57 | 3.57 | 3.57 |
| LTL | 55.50 | 55.50 | 55.50 | 55.50 | 55.50 | 55.50 |
| d1 | 0.50 | 2.38 | 0.53 | 0.50 | 2.38 | 0.53 |
| d5 | 12.25 | 6.37 | 1.11 | 12.25 | 6.37 | 1.11 |
| d13 | 4.67 | 8.67 | 15.79 | 5.49 | 10.20 | 19.27 |
| d15 | 14.02 | 14.02 | 14.02 | 13.20 | 12.49 | 10.54 |
| d19 | 0.87 | 0.87 | 0.87 | 0.87 | 0.87 | 0.87 |
| IH | 1.92 | 2.73 | 3.00 | 1.92 | 2.73 | 3.00 |
| ω | 6.98 | 7.31 | 5.45 | 7.07 | 7.38 | 5.48 |

Unit focal length

| | | | |
|---|---|---|---|
| f1 = −23.64 | f2 = 15.87 | f3 = −37.54 | f4 = 25.43 |

Example 13

Unit mm

Surface data

| Surface no. | r | d | nd | vd | ER |
|---|---|---|---|---|---|
| Object plane | ∞ | ∞ | | | |
| 1 | ∞ | Variable | | | |
| 2 | −13.458 | 0.70 | 1.65160 | 58.55 | 2.6317 |
| 3 | −28.440 | 1.68 | 2.00330 | 28.27 | 2.7626 |
| 4 | −9.419 | 0.70 | 1.74400 | 44.78 | 2.9604 |
| 5 | 72.451 | Variable | | | 3.1106 |
| 6 | 77.090 | 2.50 | 1.88300 | 40.76 | 6.1987 |
| 7 | −37.883 | 0.30 | | | 6.3526 |
| 8 | 20.290 | 3.66 | 1.88300 | 40.76 | 6.3884 |
| 9 | −20.984 | 0.70 | 2.00330 | 28.27 | 6.1423 |
| 10 | 133.018 | 0.50 | | | 5.9413 |
| 11 | 34.761 | 0.70 | 1.80518 | 25.42 | 5.7814 |
| 12 | 10.000 | 3.20 | 1.49700 | 81.61 | 5.4534 |
| 13 | −95.858 | Variable | | | 5.3292 |
| 14 | −26.653 | 0.70 | 1.49700 | 81.61 | 4.9066 |
| 15 | 46.021 | Variable | | | 4.848 |
| 16 | 15.796 | 2.98 | 1.88300 | 40.76 | 4.7269 |
| 17 | −27.199 | 0.65 | | | 4.4424 |
| 18 | 64.690 | 1.87 | 1.88300 | 40.76 | 3.8855 |
| 19 | −69.859 | 0.85 | | | 3.4297 |
| 20 | −14.212 | 0.70 | 2.00330 | 28.27 | 3.0379 |
| 21 | 33.756 | Variable | | | 2.868 |
| 22 | ∞ | 1.00 | 1.52113 | 66.54 | |
| 23 | ∞ | 0.50 | | | |
| 24 | ∞ | 0.70 | 1.51633 | 64.14 | |
| 25 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 15.00 | 20.25 | 29.58 | 14.97 | 20.14 | 29.03 |
| FNO. | 2.88 | 3.89 | 5.69 | 2.88 | 3.87 | 5.58 |
| FB | 5.24 | 5.24 | 5.24 | 5.24 | 5.24 | 5.24 |
| LTL | 55.50 | 55.50 | 55.50 | 55.50 | 55.50 | 55.50 |
| d1 | 0.50 | 2.47 | 0.77 | 0.50 | 2.47 | 0.77 |
| d5 | 12.17 | 6.33 | 1.10 | 12.17 | 6.33 | 1.10 |
| d13 | 2.95 | 6.83 | 13.76 | 3.64 | 8.10 | 16.63 |
| d15 | 12.26 | 12.26 | 12.26 | 11.58 | 10.99 | 9.39 |
| d21 | 2.53 | 2.53 | 2.53 | 2.53 | 2.53 | 2.53 |

-continued

Unit mm

| | | | | | | |
|---|---|---|---|---|---|---|
| IH | 1.92 | 2.73 | 3.00 | 1.92 | 2.73 | 3.00 |
| ω | 7.38 | 7.71 | 5.72 | 7.45 | 7.75 | 5.69 |

Unit focal length

| | | | |
|---|---|---|---|
| f1 = −23.46 | f2 = 15.55 | f3 = −33.75 | f4 = 24.74 |

Example 14

Unit mm

Surface data

| Surface no. | r | d | nd | vd | ER |
|---|---|---|---|---|---|
| Object plane | ∞ | ∞ | | | |
| 1 | ∞ | Variable | | | |
| 2 | −15.377 | 0.70 | 1.65160 | 58.55 | 3.3301 |
| 3 | −27.198 | 1.95 | 1.92286 | 18.90 | 3.4683 |
| 4 | −9.548 | 0.70 | 1.74077 | 27.79 | 3.6949 |
| 5 | 88.939 | Variable | | | 3.8968 |
| 6* | 25.628 | 3.70 | 1.86400 | 40.58 | 10.0456 |
| 7* | −106.838 | 0.30 | | | 9.8648 |
| 8 | 24.960 | 2.80 | 1.88300 | 40.76 | 9.546 |
| 9 | 90.710 | 0.70 | 1.92286 | 18.90 | 9.1817 |
| 10 | 43.112 | 0.50 | | | 8.8772 |
| 11 | 41.186 | 0.70 | 1.78472 | 25.68 | 8.7174 |
| 12 | 10.458 | 5.87 | 1.49700 | 81.61 | 7.8289 |
| 13 | −36.682 | Variable | | | 7.6298 |
| 14* | −27.511 | 0.70 | 1.49700 | 81.61 | 6.5662 |
| 15* | 55.846 | Variable | | | 6.2581 |
| 16* | 15.056 | 3.81 | 1.86400 | 40.58 | 4.0958 |
| 17* | −30.579 | 1.17 | | | 3.4197 |
| 18 | −9.630 | 0.70 | 1.74400 | 44.78 | 2.8508 |
| 19 | −78.286 | Variable | | | 2.6936 |
| 20 | ∞ | 1.00 | 1.52113 | 66.54 | |
| 21 | ∞ | 0.50 | | | |
| 22 | ∞ | 0.70 | 1.51633 | 64.14 | |
| 23 | ∞ | 0.50 | | | |
| Image plane | ∞ | | | | |

Aspherical surface data

6th surface
k = 0.000
A4 = 2.26725e−05, A6 = −1.73779e−07, A8 = 1.92954e−09
7th surface
k = 0.000
A4 = 4.29948e−05, A6 = −1.52980e−07, A8 = 1.81960e−09
14th surface
k = 0.000
A4 = 4.90793e−04, A6 = −4.73942e−06, A8 = −1.47932e−08
15th surface
k = 0.000
A4 = 4.71622e−04, A6 = −2.41039e−06, A8 = −6.25820e−08
16th surface
k = 0.000
A4 = 1.41479e−04, A6 = 5.42759e−06, A8 = −1.57504e−07
17th surface
k = 0.000
A4 = 7.55269e−06, A6 = 1.05908e−05, A8 = −7.52831e−07

Zoom data
Zoom ratio 2.65

| | WE1 | ST1 | TE1 | WE2 | ST2 | TE2 |
|---|---|---|---|---|---|---|
| f | 15.83 | 25.92 | 41.95 | 15.77 | 25.60 | 39.93 |
| FNO. | 2.40 | 3.93 | 6.36 | 2.39 | 3.88 | 6.05 |
| FB | 3.22 | 3.22 | 3.22 | 3.22 | 3.22 | 3.22 |

-continued

| Unit mm | | | | | | |
|---|---|---|---|---|---|---|
| LTL | 67.67 | 67.67 | 67.67 | 67.67 | 67.67 | 67.67 |
| d1 | 0.60 | 6.58 | 3.97 | 0.60 | 6.58 | 3.97 |
| d5 | 20.41 | 8.32 | 1.13 | 20.41 | 8.32 | 1.13 |
| d13 | 2.83 | 8.94 | 18.75 | 3.35 | 10.37 | 22.85 |
| d15 | 16.32 | 16.32 | 16.32 | 15.80 | 14.89 | 12.21 |
| d19 | 0.52 | 0.52 | 0.52 | 0.52 | 0.52 | 0.52 |
| IH | 1.92 | 2.73 | 3.00 | 1.92 | 2.73 | 3.00 |
| ω | 7.03 | 6.06 | 4.06 | 7.17 | 6.20 | 4.15 |

Unit focal length f1 = −24.31    f2 = 16.97    f3 = −36.87    f4 = 34.22

Next, the values of conditional expressions (1) to (15) in each example are shown below.

| Conditional expression | Example 1 | Example 2 | Example 3 |
|---|---|---|---|
| (1) $f_L/f_{Lw}$ | 1.97 | 1.97 | 1.97 |
| (2) $|(y_{w7d'} - y_{w7d})/y_{w7d}| \times 100$ | 0.25 | 0.35 | 0.51 |
| (3) $|(y_{t5d'} - y_{t5d})/y_{t5d}| \times 100$ | 0.05 | 0.14 | 0.28 |
| (4) $|\beta_{ctw}|$ | 1.79 | 1.33 | 1.34 |
| (5) $f_{fc}/f_{Lw}$ | −1.00 | −0.90 | −0.91 |
| (6) $d_{pg}/d_{fc}$ | 8.93 | 4.73 | 17.24 |
| (7) $d_{ng}/d_{pg}$ | 0.34 | 0.19 | 0.20 |
| (8) $\varphi_{fc}/\varphi_{L1}$ | 1.76 | 1.66 | 1.37 |
| (9) $f_{ng}/f_{pg}$ | −1.19 | −1.45 | −1.74 |
| (10) $f_{ng}/f_{Lt}$ | −0.49 | −0.72 | −0.83 |
| (11) $|\beta_{ctl}|/|\beta_{ctw}|$ | 0.98 | 0.97 | 0.98 |
| (12) $\varphi_{L1}/f_{lt}$ | 0.07 | 0.11 | 0.12 |
| (13) $(r_{fcff} + r_{fcfb})/(r_{fcff} - r_{fcfb})$ | 0.29 | 0.68 | 0.92 |
| (14) $(r_{If} + r_{Ib})/(r_{If} - r_{Ib})$ | −1.15 | −0.51 | 0.09 |
| (15) $|(y_{w7d'} - y_{w7d})/P|/(1/N)$ | 75.02 | 105.18 | 152.38 |

| Conditional expression | Example 4 | Example 5 | Example 6 |
|---|---|---|---|
| (1) $f_L/f_{Lw}$ | 1.97 | 1.97 | 2.50 |
| (2) $|(y_{w7d'} - y_{w7d})/y_{w7d}| \times 100$ | 0.48 | 0.37 | 0.63 |
| (3) $|(y_{t5d'} - y_{t5d})/y_{t5d}| \times 100$ | 0.30 | 0.19 | 0.25 |
| (4) $|\beta_{ctw}|$ | 1.18 | 1.68 | 1.58 |
| (5) $f_{fc}/f_{Lw}$ | −1.12 | −0.82 | −0.87 |
| (6) $d_{pg}/d_{fc}$ | 15.12 | 4.50 | 18.08 |
| (7) $d_{ng}/d_{pg}$ | 0.24 | 0.21 | 0.19 |
| (8) $\varphi_{fc}/\varphi_{L1}$ | 1.54 | 1.71 | 1.57 |
| (9) $f_{ng}/f_{pg}$ | −1.68 | −1.56 | −1.64 |
| (10) $f_{ng}/f_{Lt}$ | −0.80 | −0.74 | −0.66 |
| (11) $|\beta_{ctl}|/|\beta_{ctw}|$ | 0.94 | 0.96 | 0.97 |
| (12) $\varphi_{L1}/f_{lt}$ | 0.12 | 0.11 | 0.10 |
| (13) $(r_{fcff} + r_{fcfb})/(r_{fcff} - r_{fcfb})$ | 1.72 | 0.45 | 0.83 |
| (14) $(r_{If} + r_{Ib})/(r_{If} - r_{Ib})$ | 0.50 | −1.23 | 1.70 |
| (15) $|(y_{w7d'} - y_{w7d})/P|/(1/N)$ | 144.29 | 109.78 | 186.46 |

| Conditional expression | Example 7 | Example 8 | Example 9 |
|---|---|---|---|
| (1) $f_L/f_{Lw}$ | 2.45 | 1.97 | 1.97 |
| (2) $|(y_{w7d'} - y_{w7d})/y_{w7d}| \times 100$ | 0.29 | 0.54 | 0.40 |
| (3) $|(y_{t5d'} - y_{t5d})/y_{t5d}| \times 100$ | 0.09 | 0.36 | 0.16 |
| (4) $|\beta_{ctw}|$ | 2.86 | 1.38 | 0.60 |
| (5) $f_{fc}/f_{Lw}$ | −0.82 | −0.99 | −1.84 |
| (6) $d_{pg}/d_{fc}$ | 14.50 | 17.57 | 17.03 |
| (7) $d_{ng}/d_{pg}$ | 0.22 | 0.20 | 0.19 |
| (8) $\varphi_{fc}/\varphi_{L1}$ | 1.96 | 1.36 | 1.36 |
| (9) $f_{ng}/f_{pg}$ | −1.08 | −1.78 | −1.42 |
| (10) $f_{ng}/f_{Lt}$ | −0.34 | −0.83 | −0.78 |
| (11) $|\beta_{ctl}|/|\beta_{ctw}|$ | 0.93 | 0.97 | 1.00 |
| (12) $\varphi_{L1}/f_{lt}$ | 0.06 | 0.12 | 0.11 |
| (13) $(r_{fcff} + r_{fcfb})/(r_{fcff} - r_{fcfb})$ | 0.33 | 0.66 | 0.26 |
| (14) $(r_{If} + r_{Ib})/(r_{If} - r_{Ib})$ | −1.52 | 0.19 | −1.68 |
| (15) $|(y_{w7d'} - y_{w7d})/P|/(1/N)$ | 86.76 | 162.91 | 121.79 |

| Conditional expression | Example 10 | Example 11 | Example 12 |
|---|---|---|---|
| (1) $f_L/f_{Lw}$ | 1.97 | 1.97 | 1.97 |
| (2) $|(y_{w7d'} - y_{w7d})/y_{w7d}| \times 100$ | 0.15 | 0.16 | 0.19 |
| (3) $|(y_{t5d'} - y_{t5d})/y_{t5d}| \times 100$ | 0.07 | 0.06 | 0.01 |
| (4) $|\beta_{ctw}|$ | 0.93 | 0.56 | 0.61 |
| (5) $f_{fc}/f_{Lw}$ | −1.53 | −2.10 | −2.37 |
| (6) $d_{pg}/d_{fc}$ | 5.50 | 4.13 | 16.53 |
| (7) $d_{ng}/d_{pg}$ | 0.18 | 0.34 | 0.28 |
| (8) $\varphi_{fc}/\varphi_{L1}$ | 1.83 | 1.57 | 1.59 |
| (9) $f_{ng}/f_{pg}$ | −2.23 | −3.36 | −1.49 |
| (10) $f_{ng}/f_{Lt}$ | −1.03 | −1.73 | −0.76 |
| (11) $|\beta_{ctl}|/|\beta_{ctw}|$ | 1.00 | 1.00 | 1.00 |
| (12) $\varphi_{L1}/f_{lt}$ | 0.06 | 0.09 | 0.11 |
| (13) $(r_{fcff} + r_{fcfb})/(r_{fcff} - r_{fcfb})$ | −0.18 | −1.86 | 0.63 |
| (14) $(r_{If} + r_{Ib})/(r_{If} - r_{Ib})$ | −1.45 | −1.87 | −0.04 |
| (15) $|(y_{w7d'} - y_{w7d})/P|/(1/N)$ | 44.80 | 47.67 | 58.22 |

| Conditional expression | Example 13 | Example 14 |
|---|---|---|
| (1) $f_L/f_{Lw}$ | 1.97 | 2.65 |
| (2) $|(y_{w7d'} - y_{w7d})/y_{w7d}| \times 100$ | 0.15 | 0.32 |
| (3) $|(y_{t5d'} - y_{t5d})/y_{t5d}| \times 100$ | 0.07 | 0.07 |
| (4) $|\beta_{ctw}|$ | 0.66 | 0.94 |
| (5) $f_{fc}/f_{Lw}$ | −2.25 | −2.33 |
| (6) $d_{pg}/d_{fc}$ | 16.51 | 20.81 |
| (7) $d_{ng}/d_{pg}$ | 0.27 | 0.23 |
| (8) $\varphi_{fc}/\varphi_{L1}$ | 1.86 | 1.97 |
| (9) $f_{ng}/f_{pg}$ | −1.51 | −1.43 |
| (10) $f_{ng}/f_{Lt}$ | −0.79 | −0.58 |
| (11) $|\beta_{ctl}|/|\beta_{ctw}|$ | 1.00 | 1.00 |
| (12) $\varphi_{L1}/f_{lt}$ | 0.09 | 0.08 |
| (13) $(r_{fcff} + r_{fcfb})/(r_{fcff} - r_{fcfb})$ | −0.27 | −0.34 |
| (14) $(r_{If} + r_{Ib})/(r_{If} - r_{Ib})$ | −0.41 | −1.28 |
| (15) $|(y_{w7d'} - y_{w7d})/P|/(1/N)$ | 45.87 | 97.44 |

Figure 31:
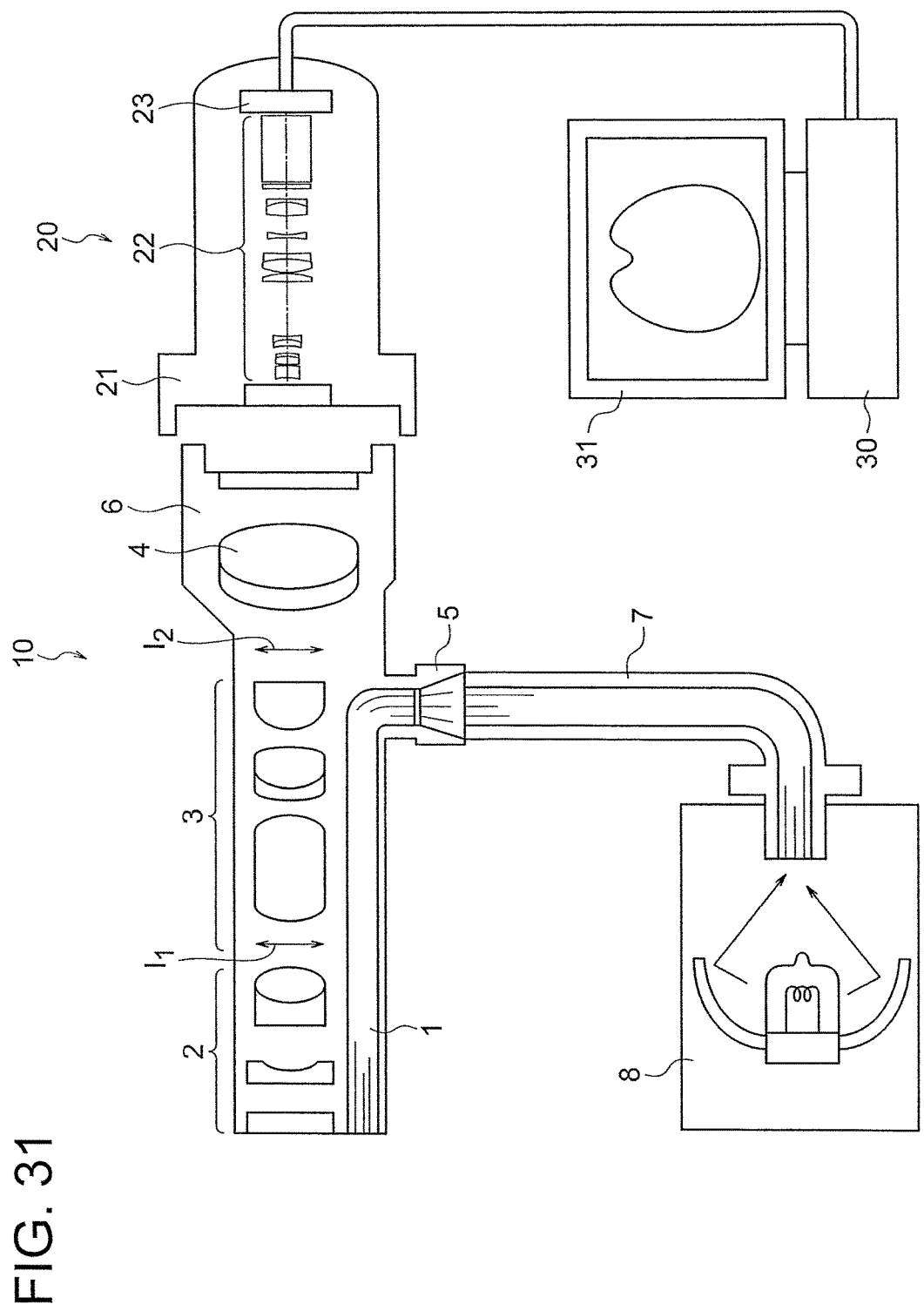
FIG. 31 is a diagram showing how a zoom image pickup apparatus of the present embodiment is connected to an optical instrument.

As to how the zoom image pickup apparatus of the present embodiment is connected to an optical instrument is shown in FIG. 31. FIG. 31 shows a case in which an optical instrument is a rigid endoscope.

A rigid endoscope 10 includes a scope-side light guide 1, an objective lens 2, a relay lens 3, an eyepiece 4, and an optical element 5. The eyepiece 4 is disposed in an eyepiece portion 6 of the rigid endoscope 10. Moreover, a light-source apparatus 8 is connected to the rigid endoscope 10 via a light guiding cable 7.

Light emerged from the light-source apparatus 8 is transmitted up to an incidence portion of the scope-side light guide 1 by the light guiding cable 7. Here, the light guiding cable 7 and the scope-side light guide 1 are either connected directly or connected via the optical element 5. The optical element 5 is an element which converts an NA of light emerged from the light guiding cable 7.

Illumination light incident on the scope-side light guide 1 is transmitted to a front end of the rigid endoscope 10. The Illumination light is radiated to an object from the front end of the rigid endoscope 10.

An object image $I_1$ is formed by the objective lens 2. The object image $I_1$ is relayed by the relay lens 3, and an object image $I_2$ is formed at a predetermined position. A user is capable of observing visually the object through the eyepiece portion 6.

In a case of acquiring an image of an object, a zoom image pickup apparatus 20 of the present embodiment is to be connected to the eyepiece portion 6. The zoom image pickup apparatus 20 includes a mount portion 21, a zoom lens 22, and an image pickup element 23. In FIG. 31, the zoom lens according to the example 1 is used for the zoom lens 22. Since the zoom lens according to the example 1 is an optical system suitable for a type in which image pickup is carried out by using three image pickup elements (three-plate type), a prism is disposed prior to the image pickup element 23. By using the zoom lens of another example, it is possible to use a type in which image pickup is carried out by using one image pickup element (single-plate type).

As the mount portion 21, a mount such as a mount of screw type and a mount of bayonet type is to be used. Even for the eyepiece portion 6, by using a mount such as the mount of screw type and the mount of bayonate type, it is possible to connect the rigid endoscope 10 and the image pickup apparatus 20.

By the rigid endoscope 10 and the zoom image pickup apparatus 20 being connected, light from an object is incident from the eyepiece lens 4 to the zoom lens 22 via the mount portion 21. The light incident on the zoom lens 22 is formed as an image by the zoom lens 22, and an image of the object is formed at an image forming position. The image pickup element 23 being disposed at the image forming position, the object image is picked up by the image pickup element 23. In such manner, it is possible to acquire an image of the object.

The image of the object is sent to a processing unit 30. In the processing unit 30, various processing is carried out according to the requirement. The image of the object is eventually displayed on a television monitor 31.

In the display of the image of the object, as shown in FIG. 31, an arrangement may be made such that a side corresponding to an upper portion of the unit, of a peripheral portion of an image observed becomes a caved-in image. For this, a projection may be provided to a part of an aperture of a field stop of the rigid endoscope. When such an arrangement is made, a relationship of an image achieved by light rays passing through the eyepiece portion and the upper portion of the unit becomes easily understandable.

By devising a method for disposing a fiber bundle in a case of a flexible endoscope, it is possible to achieve similar effect. Moreover, in a telescope and a microscope, it is preferable to use a field stop having a similar shape. By disposing the bundle, an arrangement may be made such that a side corresponding to an upper portion of the unit, of a peripheral portion of an image observed becomes caved-in image. A relationship of an image achieved by light rays passing through the eyepiece portion and the upper portion of the unit becomes easily understandable.

The size of the object image $I_2$ is determined by the objective lens 2 and the relay lens 3. Therefore, in the zoom image pickup apparatus 20, an image of a predetermined size is formed on the image pickup element 23 by the zoom lens 22. Consequently, the size of the image formed on the image pickup element 23 varies according to the magnification of the zoom lens.

A size of a light receiving surface of the image pickup element being constant, in a telescope, an image larger than the light receiving surface is formed on the light receiving surface of the image pickup element 23. In this case, since a part of the object image 12 is captured, an image in which a part of an object has been enlarged is acquired.

At the wide angle end, on the light receiving surface of the image pickup element 23, the object image $I_2$ is formed to be accommodated in a longitudinal width of the light receiving surface. At this time, in a short-side direction, a peripheral portion of the object image $I_2$ runs off the light receiving surface. Consequently, an image displayed on the television monitor 31 has four corners cut, such as an image having a portrait-oriented oval shape as an outer shape.

In this example, the zoom lens according to the present embodiment has been used for the zoom lens 22. Therefore, an image of a size desired by the user is achieved. In this case, it is possible to achieve an image in which aberrations are corrected favorably. Furthermore, the variation in the image height being small at the time of focusing, it is possible to achieve an image with no uncomfortable feeling all the time.

According to the present invention, it is possible to provide a zoom image pickup apparatus in which aberrations are corrected favorably, and the variation in the image height is small at the time of focusing.

As described above, the present invention is suitable for a zoom image pickup apparatus in which aberrations are corrected favorably and the variation in the image height is small at the time of focusing.

What is claimed is:

1. A zoom image pickup apparatus, comprising:
a mount portion;
a zoom lens which forms an image of light incident from the mount portion; and
an image pickup element which is disposed at an image forming position,
wherein:
the zoom lens includes a plurality of fixed lens units, and a plurality of zooming lens units,
the zoom lens includes a focusing lens unit as one of the plurality of fixed lens units or as one of the plurality of zooming lens units,
at a time of zooming from a wide angle to a telephoto end, the plurality of fixed lens units are fixed, and the plurality of zooming lens units move,
the plurality of fixed lens units include a nearest lens unit which is positioned nearest to object of the zoom lens,
the following conditional expressions (1) and (2) are satisfied:

$$1.5 < f_{Lt}/f_{Lw} \qquad (1), \text{ and}$$

$$|(y_{w7d} - y_{w7d'})/y_{w7d}| \times 100 < 0.66 \qquad (2)$$

where:
a side of the mount portion is an object side and a side of the image pickup element is an image side,
each of $f_{Lt}$ and $f_{Lw}$ is a focal length of the zoom lens when focused to a first object, $f_{Lt}$ denotes a focal length at the telephoto end, and $f_{Lw}$ denotes a focal length at the wide angle end,
each of $y_{w7d}$ and $y_{w7d'}$ is a height of a first predetermined light ray at a position at which the first predetermined light ray intersects an image plane, $y_{w7d}$ denotes a light-ray height when focused to the first object, and $y_{w7d'}$ denotes a light-ray height in a defocused state,
the defocused state is a state in which the focusing lens unit is moved by $\Delta_{s1}$ when focused to the first object, $$\Delta_{s1} = f_{Lw} \times 0.005,$$

the first predetermined light ray is a light ray with an angle of view of 7 degrees at the wide angle end, which passes through a center of a lens surface positioned nearest to object of the zoom lens,
the first object is an object when an object-point distance is 1000 mm, and the object-point distance is a distance to the object from the lens surface positioned nearest to object of the zoom lens, and at the wide angle end when focused to the first object, the following conditional expression (16) is satisfied:

$$\phi_{L1} < \phi_{ZL} \quad (16)$$

where:
 $\phi_{L1}$ denotes an effective diameter of a lens surface positioned nearest to object of the nearest lens unit, which is the lens surface positioned nearest to object of the zoom lens,
 $\phi_{ZL}$ denotes an effective diameter of a lens surface of at least one of the plurality of the zooming lens units, and
 the effective diameter is a maximum diameter of a range on a target lens surface, through which a light ray contributing to image formation passes.

2. The zoom image pickup apparatus according to claim 1, wherein the following conditional expression (3) is satisfied:

$$|(y_{t5d'} - y_{t5d})/y_{t5d}| \times 100 < 0.66 \quad (3)$$

where:
 each of $y_{t5d'}$ and $y_{t5d}$ is a height of a second predetermined light ray at a position at which the second predetermined light ray intersects the image plane, $y_{t5d}$ denotes a light-ray height when focused to the first object, and $y_{t5d'}$ denotes a light-ray height in the defocused state, and
 the second predetermined light ray is a light ray with an angle of view of 5 degrees at the telephoto end, which passes through the center of the lens surface nearest to object of the zoom lens.

3. The zoom image pickup apparatus according to claim 1, wherein:
 the focusing lens unit is one of the plurality of zooming lens units, and
 at least one of the plurality of zooming lens units is positioned on an object side of the focusing lens unit.

4. The zoom image pickup apparatus according to claim 1, wherein the following conditional expression (4) is satisfied:

$$0.55 < |\beta_{ctw}| < 5 \quad (4)$$

where:

$\beta_{ctw} = (1 - \beta_{fcw} \times \beta_{fcw}) \times \beta_{w'} \times \beta_{w'}$, each of $\beta_{fcw}$ and $\beta_{w'}$ is a lateral magnification at the wide angle end when focused to the first object, $\beta_{fcw}$ denotes a lateral magnification of the focusing lens unit, and $\beta_{w'}$ denotes a lateral magnification of a lens unit positioned on an image side of the focusing lens unit,
 $\beta_{ctw} = (1 - \beta_{fcw} \times \beta_{fcw})$ when the focusing lens unit is positioned nearest to image,
 the first object is the object when the object-point distance is 1000 mm, and
 the object-point distance is the distance to the object from the lens surface positioned nearest to object of the zoom lens.

5. The zoom image pickup apparatus according to claim 1, wherein the following conditional expression (5) is satisfied:

$$-6 < f_{fc}/k_{Lw} < -0.4 \quad (5)$$

where:
 $f_{fc}$ denotes a focal length of the focusing lens unit,
 $f_{Lw}$ denotes the focal length at the wide angle end of the zoom lens when focused to the first object,
 the first object is the object when the object-point distance is 1000 mm, and
 the object-point distance is the distance to the object from the lens surface positioned nearest to object of the zoom lens.

6. The zoom image pickup apparatus according to claim 1, wherein the following conditional expression (6) is satisfied:

$$2 < d_{pg}/d_{fc} < 25 \quad (6)$$

where:
 each of $d_{pg}$ and $d_{fc}$ is a thickness on an optical axis of a lens unit,
 $d_{pg}$ denotes a thickness of a lens unit having a largest positive refractive power from among thicknesses of lens units positioned on an object side of the focusing lens unit, and
 $d_{fc}$ denotes a thickness of the focusing lens unit.

7. The zoom image pickup apparatus according to claim 1, wherein a lens unit having a negative refractive power which satisfies the following conditional expression (7) is positioned on an object side of a lens unit having a positive refractive power:

$$0.1 < d_{ng}/d_{pg} < 0.9 \quad (7)$$

where:
 each of $d_{ng}$ and $d_{pg}$ is a thickness on an optical axis of a lens unit,
 $d_{ng}$ denotes a thickness of a lens unit having a largest negative refractive power from among thicknesses of lens units positioned on an object side of the focusing lens unit, and
 $d_{pg}$ denotes a thickness of a lens unit having a largest positive refractive power from among the thicknesses of the lens units positioned on the object side of the focusing lens unit.

8. The zoom image pickup apparatus according to claim 1, wherein the following conditional expression (8) is satisfied:

$$1 < \phi_{fc}/\phi_{L1} < 3 \quad (8)$$

where:
 each of $\phi_{fc}$ and $\phi_{L1}$ is an effective diameter at the wide angle end when focused to the first object,
 $\phi_{fc}$ denotes an effective diameter of a lens surface positioned nearest to object of the focusing lens unit,
 $\phi_{L1}$ denotes the effective diameter of the lens surface positioned nearest to object of the nearest lens unit, which is the lens surface positioned nearest to object of the zoom lens,
 the first object is the object when the object-point distance is 1000 mm,
 the object-point distance is the distance to the object from the lens surface positioned nearest to object of the zoom lens, and
 the effective diameter is the maximum diameter of a range on a target lens surface, through which a light ray contributing to image formation passes.

9. The zoom image pickup apparatus according to claim 1, wherein the following conditional expression (9) is satisfied:

$$-6 < f_{ng}/f_{pg} < -0.5 \quad (9)$$

where:
- $f_{ng}$ denotes a focal length of a lens having a largest negative refractive power from among focal lengths of lens units positioned on an object side of the focusing lens unit, and
- $f_{pg}$ denotes a focal length of a lens having a largest positive refractive power from among the focal lengths of the lens units positioned on the object side of the focusing lens unit.

10. The zoom image pickup apparatus according to claim 1, wherein the following conditional expression (10) is satisfied:

$$-4 < f_{ng}/f_{Lt} < -0.2 \quad (10)$$

where:
- $f_{ng}$ denotes a focal length of a lens unit having a largest negative refractive power from among focal lengths of lens units positioned on an object side of the focusing lens unit,
- $f_{Lt}$ denotes the focal length at the telephoto end of the zoom lens when focused to the first object,
- the first object is the object when the object-point distance is 1000 mm, and
- the object-point distance is the distance to the object from the lens surface positioned nearest to object of the zoom lens.

11. The zoom image pickup apparatus according to claim 1, wherein:
only the focusing lens unit moves at a time of focusing, and
the following conditional expression (11) is satisfied:

$$0.7 < |\beta_{ctt}|/|\beta_{ctw}| < 2 \quad (11)$$

where:

$$\beta_{ctt} = (1 - \beta_{fct} \times \beta_{fct}) \times \beta_t' \times \beta_t',$$

$$\beta_{ctw} = (1 - \beta_{fcw} \times \beta_{fcw}) \times \beta_w' \times \beta_w',$$

- each of $\beta_{fct}$ and $\beta_t'$ is a lateral magnification at the telephoto end when focused to the first object, $\beta_{fct}$ denotes a lateral magnification of the focusing lens unit, and $\beta_t'$ denotes a lateral magnification of a lens unit positioned on an image side of the focusing lens unit,
- each of $\beta_{fcw}$ and $\beta_w'$ is a lateral magnification at the wide angle end when focused to the first object, $\beta_{fcw}$ denotes a lateral magnification of the focusing lens unit, and $\beta_w'$ denotes a lateral magnification of a lens unit positioned on the image side of the focusing lens unit,
- the first object is the object when the object-point distance is 1000 mm, and
- the object-point distance is the distance to the object from the lens surface positioned nearest to object of the zoom lens.

12. The zoom image pickup apparatus according to claim 1, wherein the following conditional expression (12) is satisfied:

$$0.03 < \phi_{L1}/f_{Lt} < 0.2 \quad (12)$$

where:
- $\phi_{L1}$ is the effective diameter of the lens surface positioned nearest to object of the nearest lens unit, which is the lens surface positioned nearest to object of the zoom lens, and denotes an effective diameter at the wide angle end when focused to the first object,
- $f_{Lt}$ denotes the focal length at the telephoto end of the zoom lens when focused to the first object,
- the first object is the object when the object-point distance is 1000 mm,
- the object-point distance is the distance to the object from the lens surface positioned nearest to object of the zoom lens, and
- the effective diameter is the maximum diameter of a range on a target lens surface, through which a light ray contributing to image formation passes.

13. The zoom image pickup apparatus according to claim 1, wherein:
the focusing lens unit has a negative refractive power, and
the plurality of fixed lens units include at least one lens unit having a negative refractive power.

14. The zoom image pickup apparatus according to claim 1, wherein:
a rearmost lens unit is disposed nearest to image, and
the rearmost lens unit includes a positive lens which is disposed nearest to object, and a negative lens which is disposed nearest to image.

15. The zoom image pickup apparatus according to claim 1, wherein the focusing lens unit is a wobbling lens unit which undergoes a wobbling operation along an optical axis by a small amount of movement with respect to an amount of movement at a time of focusing.

16. The zoom image pickup apparatus according to claim 1, wherein an overall length of the zoom lens is fixed.

17. The zoom image pickup apparatus according to claim 1, wherein the following conditional expression (13) is satisfied:

$$-5 < (r_{fcff} + r_{fcfb})/(r_{fcff} - r_{fcfb}) < 5 \quad (13)$$

where:
- $r_{fcff}$ denotes a radius of curvature of an object-side lens surface of a lens positioned nearest to object in the focusing lens unit, and
- $r_{fcfb}$ denotes a radius of curvature of an image-side lens surface of a lens positioned nearest to image in the focusing lens unit.

18. The zoom image pickup apparatus according to claim 1, wherein the following conditional expression (14) is satisfied:

$$-5 < (r_{1f} + r_{1b})/(r_{1f} - r_{1b}) < 5 \quad (14)$$

where:
- $r_{1f}$ denotes a radius of curvature of an object-side lens surface of a lens positioned nearest to image, and
- $r_{1b}$ denotes a radius of curvature of an image-side lens surface of the lens positioned nearest to image.

19. A zoom image pickup apparatus, comprising:
a mount portion;
a zoom lens which forms an image of light incident from the mount portion; and
an image pickup element which is disposed at an image forming position,
wherein:
the zoom lens includes, in order from an object side, a first lens unit having a positive refractive power, a second lens unit having a negative refractive power, a third lens unit having a positive refractive power, a fourth lens unit having a negative refractive power, and a fifth lens unit having a positive refractive power,
the fourth lens unit is a focusing lens unit,
at a time of zooming from a wide angle end to a telephoto end, only the second lens unit and the fourth lens unit move, and the first lens unit, the third lens unit, and the fifth lens unit are fixed, and at the wide angle end when focused to a first object, the following conditional expression (16') is satisfied:

$$\phi_{L1} < \phi_{3GL1} \quad (16')$$

where:
- $\phi_{L1}$ denotes an effective diameter of a lens surface positioned nearest to object of the zoom lens,
- $\phi_{3GL1}$ denotes an effective diameter of a lens surface positioned nearest to object of the third lens unit,
- the effective diameter is a maximum diameter of a range on a target lens surface, through which a light ray contributing to image formation passes,
- the first object is an object when an object-point distance is 1000 mm, and
- the object-point distance is a distance to the object from the lens surface positioned nearest to object of the zoom lens.

20. A zoom image pickup apparatus, comprising:
a mount portion;
a zoom lens which forms an image of light incident from the mount portion; and
an image pickup element which is disposed at an image forming position,
wherein:
the zoom lens includes, in order from an object side, a first lens unit, a second lens unit having a negative refractive power, a third lens unit having a positive refractive power, a fourth lens unit having a negative refractive power, and a fifth lens unit having a positive refractive power,
the fourth lens unit is a focusing lens unit, and
at a time of zooming from a wide angle end to a telephoto end, only the second lens unit and the third lens unit move, and the first lens unit, the fourth lens unit, and the fifth lens unit are fixed.

21. A zoom image pickup apparatus, comprising:
a mount portion;
a zoom lens which forms an image of light incident from the mount portion; and
an image pickup element which is disposed at an image forming position,
wherein:
the zoom lens includes, in order from an object side, a first lens unit having a negative refractive power, a second lens unit having a positive refractive power, a third lens unit having a negative refractive power, and a fourth lens unit having a positive refractive power,
the third lens unit is a focusing lens unit, and
at a time of zooming from a wide angle end to a telephoto end, only the first lens unit and the second lens unit move, and the third lens unit and the fourth lens unit are fixed.

22. A zoom image pickup apparatus, comprising:
a mount portion;
a zoom lens which forms an image of light incident from the mount portion; and
an image pickup element which is disposed at an image forming position,
wherein:
the zoom lens includes a plurality of fixed lens units, and a plurality of zooming lens units,
the zoom lens includes a focusing lens unit, at a time of zooming from a wide angle end to a telephoto end, the plurality of fixed lens units are fixed, and the plurality of zooming lens units move,
the plurality of fixed lens units includes a nearest lens unit which is positioned nearest to object of the zoom lens,
the following conditional expressions (1) and (15) are satisfied:

$$1.5 < f_{Lt}/k_{Lw} \quad (1), \text{ and}$$

$$|(y_{w7d} - y_{w7d'})/P|/(1/N) < 192 \quad (15)$$

where:
- a side of the mount portion is an object side and a side of the image pickup element is an image side,
- each of $f_{Lt}$ and $f_{Lw}$ is a focal length of the zoom lens when focused to a first object, $f_{Lt}$ denotes a focal length at the telephoto end, and $f_{Lw}$ denotes a focal length at the wide angle end,
- each of $y_{w7d}$ and $y_{w7d'}$ is a height of a first predetermined light ray at a position at which the first predetermined light ray intersects an image plane, $y_{w7d}$ denotes a light-ray height when focused to the first object, and $y_{w7d'}$ denotes a light-ray height in a defocused state, here
- the defocused state is a state in which the focusing lens unit is moved by $\Delta_{s2}$ when focused to the first object, $$\Delta_{s2} = 10 \times P,$$

$$0.0008 < P < 0.005,$$

$$0.05 < 1/N < 1,$$

where:
- N denotes the number of pixels (unit millions of pixels) of the image pickup element,
- P denotes a pixel pitch (unit mm) of the image pickup element,
- the first predetermined light ray is a light ray with an angle of view of 7 degrees at the wide angle end, which passes through a center of a lens surface positioned nearest to object of the zoom lens,
- the first object is an object when an object-point distance is 1000 mm, and
- the object-point distance is a distance to the object from the lens surface positioned nearest to object of the zoom lens, and at the wide angle end when focused to the first object, the following conditional expression (16) is satisfied:

$$\phi_{L1} < \phi_{ZL} \quad (16)$$

where:
- $\phi_{L1}$ denotes an effective diameter of a lens surface positioned nearest to object of the nearest lens unit, which is the lens surface positioned nearest to object of the zoom lens,
- $\phi_{ZL}$ denotes an effective diameter of a lens surface of at least one of the plurality of the zooming lens units, and
- the effective diameter is the maximum diameter of a range on a target lens surface, through which a light ray contributing to image formation passes.

* * * * *